US011105880B2

(12) United States Patent
Nishikawa

(10) Patent No.: US 11,105,880 B2
(45) Date of Patent: *Aug. 31, 2021

(54) DISTANCE MEASURING DEVICE AND DISTANCE MEASURING METHOD

(71) Applicants:Kabushiki Kaisha Toshiba, Tokyo (JP); Toshiba Electronic Devices & Storage Corporation, Tokyo (JP)

(72) Inventor: Masaki Nishikawa, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/687,855

(22) Filed: Nov. 19, 2019

(65) Prior Publication Data

US 2020/0081088 A1  Mar. 12, 2020

Related U.S. Application Data

(63) Continuation of application No. 15/923,169, filed on Mar. 16, 2018, now Pat. No. 10,502,808.

(30) Foreign Application Priority Data

Jan. 25, 2018 (JP) .............................. JP2018-010400
Feb. 8, 2018 (JP) .............................. JP2018-020766

(51) Int. Cl.
*G01S 1/04* (2006.01)
*G01S 13/82* (2006.01)
(Continued)

(52) U.S. Cl.
CPC ............ *G01S 1/045* (2013.01); *G01S 13/825* (2013.01); *G01S 13/84* (2013.01);
(Continued)

(58) Field of Classification Search
CPC ........ G01S 1/045; G01S 13/825; G01S 13/84; G01S 13/08; G07C 9/00309
(Continued)

(56) References Cited

U.S. PATENT DOCUMENTS 7,061,369 B2   6/2006  Bergerhoff
8,644,768 B2   2/2014  Kluge et al.
(Continued)

FOREIGN PATENT DOCUMENTS

EP   2204669 A1   7/2010
JP   08-166443 A  6/1996
(Continued)

OTHER PUBLICATIONS

Partial European Search Report dated Oct. 19, 2018 in corresponding European Patent Application No. 18162247.3.

*Primary Examiner* — Ayodeji O Ayotunde
(74) *Attorney, Agent, or Firm* — White & Case LLP

(57) ABSTRACT

A distance measuring device according to an embodiment includes a first device including a first transceiver configured to transmit a first known signal and a second known signal and receive a third known signal corresponding to the first known signal and a fourth known signal corresponding to the second known signal, a second device including a second transceiver configured to transmit the third known signal and the fourth known signal and receive the first and second known signals and a calculating section configured to calculate a distance between the first device and the second device on a basis of phases of the first to fourth known signals, and the first transceiver and the second transceiver transmit/receive the first and third known signals one time each and transmit/receive the second and fourth known signals one time each, performing transmission/reception a total of four times.

1 Claim, 23 Drawing Sheets

(51) Int. Cl.
*G07C 9/00* (2020.01)
*G01S 13/84* (2006.01)
(52) U.S. Cl.
CPC ............... *G07C 9/00309* (2013.01); *G07C 2009/00555* (2013.01); *G07C 2209/63* (2013.01)
(58) Field of Classification Search
USPC .......................................................... 342/458
See application file for complete search history.

(56) References Cited

U.S. PATENT DOCUMENTS

| | | |
|---|---|---|
| 8,965,301 B2 | 2/2015 | Kluge et al. |
| 10,502,808 B2 * | 12/2019 | Nishikawa ............... G01S 13/84 |
| 2007/0206176 A1 | 9/2007 | Yang et al. |
| 2010/0167662 A1 | 7/2010 | Kluge et al. |
| 2018/0267154 A1 | 9/2018 | Ootaka et al. |

FOREIGN PATENT DOCUMENTS

| | | |
|---|---|---|
| WO | 0201247 A2 | 1/2002 |
| WO | 03052455 A1 | 6/2003 |

\* cited by examiner

DISTANCE MEASURING DEVICE AND DISTANCE MEASURING METHOD

CROSS-REFERENCE TO RELATED APPLICATIONS

This application is a continuation of application Ser. No. 15/923,169 filed on Mar. 16, 2018 and is based upon and claims the benefit of priority from the prior Japanese Patent Applications No. 2018-010400 filed on Jan. 25, 2018 and No. 2018-020766 filed on Feb. 8, 2018; the entire contents of which are incorporated herein by reference.

FIELD

Embodiments of the present invention relate generally to a distance measuring device and a distance measuring method.

BACKGROUND

In recent years, keyless entry for facilitating unlocking and locking of a car has been adopted in many cars. This technique performs unlocking and locking of a door using communication between a key of an automobile and the automobile. Further, in recent years, a smart entry system that makes it possible to perform, with a smart key, unlocking and locking of a door lock and start an engine without touching a key has been also adopted.

However, a lot of incidents occur in which an attacker intrudes into communication between a key and an automobile and steals the automobile. As measures against the attack (so-called relay attack), a measure for measuring the distance between the key and the automobile and, when determining that the distance is equal to or larger than a predetermined distance, prohibiting control of the automobile by communication is examined.

As a distance measuring technique, many techniques exist, such as a two-frequency CW (continuous wave) scheme, an FM (frequency modulated) CW scheme, a Doppler scheme, and a phase detection scheme. In general, in distance measurement, a distance from a measuring device to a target object is calculated by providing a transmitter and a receiver in the same housing of the measuring device, hitting a radio wave emitted from the transmitter against the target object, and detecting a reflected wave of the radio wave with the receiver.

However, when taking into account a relatively small reflection coefficient of the target object, limitation on output power due to the Radio Law, and the like, in the distance measuring technique for measuring a distance using the reflected wave, a measurable distance is relatively small and the technique is insufficient to be used in the measures against the relay attack.

DETAILED DESCRIPTION

A distance measuring device according to an embodiment is a distance measuring device that calculates a distance between a first device and a second device, at least one of which is movable, on a basis of phases of first to fourth known signals transmitted at a plurality of carrier frequencies, the first device including a first reference signal source and a first transceiver configured to transmit the first known signal corresponding to a first carrier frequency and the second known signal corresponding to a second carrier frequency different from the first carrier frequency and receive the third known signal corresponding to the first carrier frequency and the fourth known signal corresponding to the second carrier frequency, using an output of the first reference signal source, in which the second device includes a second reference signal source configured to operate independently from the first reference signal source and a second transceiver configured to transmit the third known signal corresponding to the first carrier frequency and the fourth known signal corresponding to the second carrier frequency and receive the first known signal and the second known signal using an output of the second reference signal source, the first or second device includes a first phase detector configured to detect phases of the third and fourth known signals received by the first transceiver, the first or second device includes a second phase detector configured to detect phases of the first and second known signals received by the second transceiver, the first or second device includes a calculating section configured to calculate a distance between the first device and the second device on a basis of a phase difference between the third and fourth known signals detected by the first phase detector and a phase difference between the first and second known signals detected by the second phase detector, and the first transceiver and the second transceiver transmit/receive the first known signal and the third known signal corresponding to the first known signal one time each and transmit/receive the second known signal and the fourth known signal corresponding to the second known signal one time each, performing transmission/reception a total of four times.

Embodiments of the present invention are explained below in detail with reference to the drawings.

First Embodiment

Figure 1:
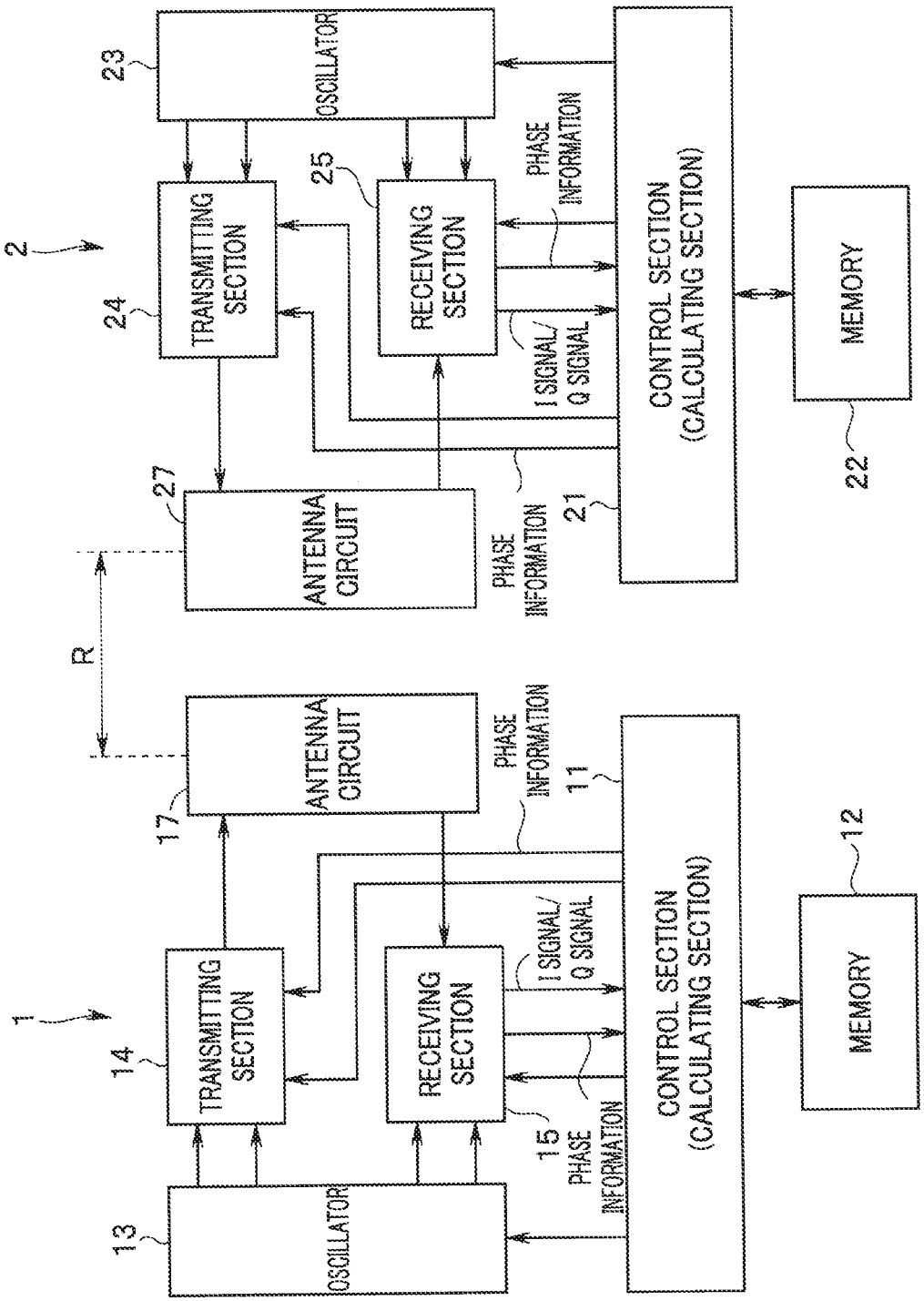
FIG. 1 is a block diagram showing a distance measuring system in which a distance measuring device according to a first embodiment of the present invention is adopted.

FIG. 1 is a block diagram showing a distance measuring system in which a distance measuring device according to a first embodiment of the present invention is adopted.

In the present embodiment, an example is explained in which a phase detection scheme for detecting a phase of an unmodulated carrier is adopted and communication-type distance measurement for calculating a distance between respective devices through communication between the respective devices is adopted. In a general phase detection scheme for detecting a phase of a reflected wave, a measurable distance is relatively short as explained above. Therefore, in the present embodiment, the communication-type distance measurement for performing communication between devices is adopted. However, since respective transmitters of the respective devices independently operate from each other, initial phases of transmitted radio waves from the respective transmitters are different from each other. An accurate distance cannot be calculated by the phase detection scheme in the past for calculating a distance according to a phase difference. Therefore, in the present embodiment, as explained below, phase information calculated by reception of one device is transmitted to the other device to make it possible to calculate an accurate distance in the other device.

In adopting such a distance measuring technique, the present embodiment is intended to allow a communication time period required for distance measurement to be shortened as in the case of a four-times repeated alternating sequence which is described later. A basic configuration of a communication type distance measuring technique adopted in the present embodiment is explained below with reference to FIG. 2A to FIG. 15.

<Basic Configuration of Communication Type Distance Measuring Technique>

First, in order to explain distance measurement according to a phase detection scheme adopted in the present embodiment, the principle of distance measurement by the phase detection scheme for detecting a phase using a reflected wave and problems of the distance measurement are explained with reference to the explanatory diagrams of FIGS. 2A and 2B.

(Phase Detection Scheme)

In the phase detection scheme, for distance measurement, signals having two frequencies deviating from a center angular frequency $\omega_{C1}$ by an angular frequency $\pm\omega_{B1}$ are transmitted. In a distance measuring device that measures a distance using a reflected wave, a transmitter and a receiver are provided in the same housing. A transmission signal (a radio wave) emitted from the transmitter is reflected on a target object and a reflected wave of the radio wave is received by the receiver.

Figure 2A:
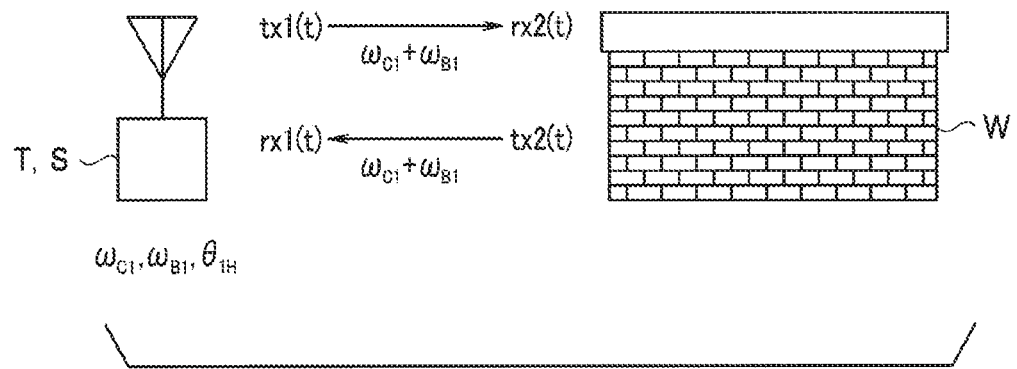
FIG. 2A is an explanatory diagram for explaining the principle of distance measurement by a phase detection scheme for detecting a phase of a reflected wave and problems of the distance measurement.
Figure 2B:
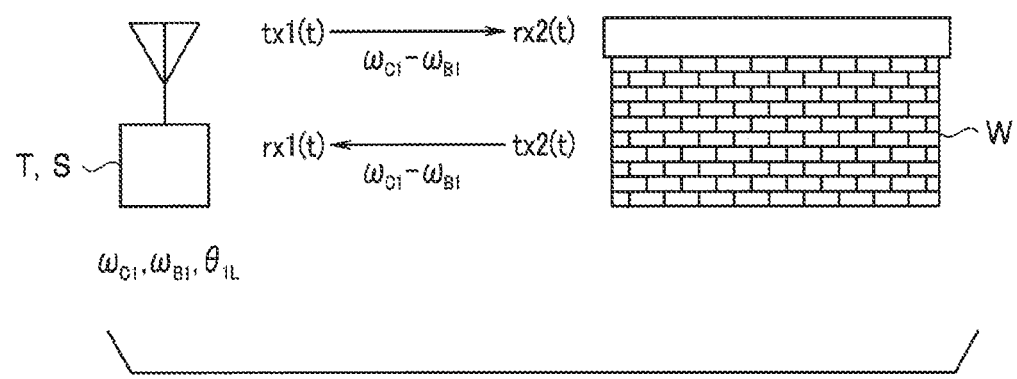
FIG. 2B is an explanatory diagram for explaining the principle of the principle of distance measurement by a phase detection scheme for detecting a phase of a reflected wave and the problems of the distance measurement.

FIGS. 2A and 2B show this state. A radio wave emitted from a transmitter T is reflected by a wall W and received by a receiver S. Note that for ease of description, description is given assuming that a phase of radio wave will not change when the radio wave is reflected by the wall W.

As shown in FIG. 2A, an angular frequency of a radio wave emitted from the transmitter is represented as $\omega_{C1}+\omega_{B1}$ and an initial phase is represented as $\theta_{1H}$. In this case, a transmission signal (a transmission wave) $tx1(t)$ emitted from the transmitter is represented by the following Equation (1):

$$tx1(t)=\cos\{((\omega_{C1}+\omega_{B1})t+\theta_{1H}\} \quad (1)$$

The transmission signal reaches a target object (a wall W) apart from the transmitter by a distance R [m] with a delay time $\tau_1$ and is reflected and received by the receiver. Since the speed of the radio wave is equal to the speed of light $c(=3\times10^8$ m/s), $\tau_1=(R/c)$ [seconds]. The signal received by the receiver delays by $2\tau_1$ with respect to the emitted signal.

Therefore, a received signal (a received wave) $rx1(t)$ of the receiver is represented by the following Equations (2) and (3):

$$rx1(t)=\cos\{(\omega_{C1}+\omega_{B1})t+\theta_{1H}-\theta_{2\times H\tau1}\} \quad (2)$$

$$\theta_{2\times H\tau1}=(\omega_{C1}+\omega_{B1})2\tau_1 \quad (3)$$

That is, the transmission signal is received by the receiver with a phase shift of a multiplication result ($\theta_{2\times H\tau1}$) of the delay time and the transmission angular frequency.

Similarly, as shown in FIG. 2B, the transmission signal $tx1(t)$ and the received signal $rx1(t)$ in the case in which an angular frequency $\omega_{C1}-\omega_{B1}$ is used are represented by the following Equations (4) to (6) with an initial phase set to $\theta_{1L}$:

$$tx1(t)=\cos\{(\omega_{C1}+\omega_{B1})t+\theta_{1L}\} \quad (4)$$

$$rx1(t)=\cos\{(\omega_{C1}+\omega_{B1})t+\theta_{1L}-\theta_{2\times L\tau1}\} \quad (5)$$

$$\theta_{2\times L\tau1}=(\omega_{C1}-\omega_{B1})2\tau_1 \quad (6)$$

When a phase shift amount that occurs until the transmission signal having the angular frequency $\omega_{C1}+\omega_{B1}$ is received is represented as $\theta_{H1}(t)$ and a phase shift amount that occurs until the transmission signal having the angular frequency $\omega_{C1}-\omega_{B1}$ is received is represented as $\theta_{L1}(t)$, a difference between phase shifts of the two received waves is represented by the following Equation (7) obtained by subtracting Equation (6) from Equation (3):

$$\theta_{H1}(t)-\theta_{L1}(t)=(\theta_{2\times H\tau1}-\theta_{2\times L\tau1})=2\omega_{B1}\times 2\tau_1 \quad (7)$$

where, $\tau_1=R/c$. Since the differential frequency $\omega_{B1}$ is known, if the difference between the phase shift amounts of the two received waves is measured, the distance R can be calculated as follows from a measurement result:

$$R=c\times(\theta_{2\times H\tau1}-\theta_{2\times L\tau1})/(4\omega_{B1})$$

Incidentally, in the above explanation, the distance R is calculated taking into account only the phase information. Amplitude is examined below concerning a case in which a transmission wave having the angular frequency $\omega_{C1}+\omega_{B1}$ is used. The transmission wave indicated by Equation (1) described above delays by a delay amount $\tau_1=R/c$ at a point in time when the transmission wave reaches a target object away from the transmitter by the distance R. Amplitude is attenuated by attenuation L1 corresponding to the distance R. The transmission wave changes to a wave $rx2(t)$ represented by the following Equation (8):

$$rx2(t)=L_1\times\cos\{(\omega_{C1}+\omega_{B1})t+\theta_{1H}-(\omega_{C1}+\omega_{B1})\tau_1\} \quad (8)$$

Further, the transmission wave is attenuated by attenuation $L_{RFL}$ when the transmission wave is reflected from the target object. A reflected wave $tx2(t)$ in the target object is represented by the following Equation (9):

$$tx2(t)=L_{RFL}\times L_1\times\cos\{(\omega_{C1}+\omega_{B1})t+\theta_{1H}-\theta_{1H}(\omega_{C1}+\omega_{B1})\tau_1\} \quad (9)$$

The received signal rx1(t) received by the receiver is delayed by a delay amount $\tau_1=R/c$ [seconds] from the target object. Amplitude is attenuated by attenuation L1 corresponding to the distance R. Therefore, the received signal is represented by the following Equation (10):

$$rx1(t)=L_1\times L_{RFL}\times L_1\times\cos\{(\omega_{C1}+\omega_{B1})t+\theta_{1H}-2(\omega_{C1}+\omega_{B1})\tau_1\} \quad (10)$$

In this way, the transmission signal from the transmitter is attenuated by $L_1\times L_{RFL}\times L_1$ until the transmission signal reaches the receiver. Signal amplitude that can be emitted from the transmitter in distance measurement needs to conform to the Radio Law according to an applied frequency. For example, a specific frequency in a 920 MHz band involves limitation to suppress transmission signal power to 1 mW or less. From the viewpoint of a signal-to-noise ratio of the received signal, it is necessary to suppress attenuation between transmission and reception in order to accurately measure a distance. However, as explained above, since attenuation is relatively large in the distance measurement for measuring a distance using a reflected wave, a distance that can be accurately measured is short.

Therefore, as explained above, in the present embodiment, by transmitting and receiving signals between the two devices without using a reflected wave, attenuation is reduced by $L_{RFL}\times L_1$ to increase the distance that can be accurately measured.

However, the two devices are apart from each other by the distance R and cannot share the same reference signal. In general, it is difficult to synchronize the transmission signal with a local oscillation signal used for reception. That is, between the two devices, deviation occurs in a signal frequency and an initial phase is unknown. Problems in distance measurement performed using such an asynchronous transmission wave are explained.

(Problems in the Case of Asynchronization)

In the distance measuring system in the present embodiment, in distance measurement between two objects, two devices (a first device and a second device) that emit carrier signals (transmission signals) asynchronously from each other are disposed in the positions of the respective objects and the distance R between the two devices is calculated. In the present embodiment, carrier signals having two frequencies deviating from a center angular frequency $\omega_{C1}$ by the angular frequency $\pm\omega_{B1}$ are transmitted in the first device. Carrier signals having two frequencies deviating from the center angular frequency $\omega_{C2}$ by an angular frequency $\pm\omega_{B2}$ are transmitted in the second device.

Figure 3A:
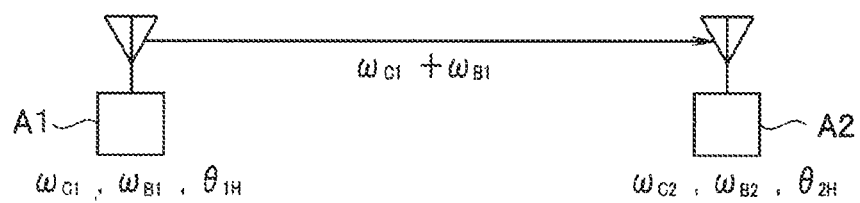
FIG. 3A is an explanatory diagram for explaining problems of the distance measurement by the phase detection scheme.
Figure 3B:
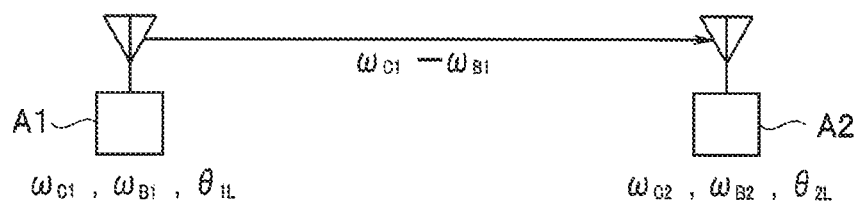
FIG. 3B is an explanatory diagram for explaining the problems of the distance measurement by the phase detection scheme.

FIGS. 3A and 3B are explanatory diagrams for explaining problems in the case in which the phase detection scheme is simply applied between two devices A1 and A2. First, it is assumed that a transmission signal of the device A1 is received by the device A2. A local oscillator of the device A1 generates a signal having a frequency necessary for generating, in a heterodyne scheme, two transmission waves having carrier angular frequencies $\omega_{C1}+\omega_{B1}$ and $\omega_{C1}-\omega_{B1}$. The device A1 transmits two transmission waves having the angular frequencies. A local oscillator of the device A2 generates a signal having a frequency necessary for generating, in a heterodyne scheme, two transmission waves having carrier angular frequencies $\omega_{C2}+\omega_{B2}$ and $\omega_{C2}-\omega_{B2}$. The device A2 performs reception in the heterodyne scheme using the signal generated by the local oscillator of the device A2.

The distance between the transceivers is represented as 2R to correspond to the distance in the case in which the reflected wave is used. Initial phases of a transmission signal having the angular frequency $\omega_{C1}+\omega_{B1}$ and a transmission signal having the angular frequency $\omega_{C1}-\omega_{B1}$ transmitted from the device A1 are respectively represented as $\theta_{1H}$ and $\theta_{1L}$. Initial phases of two signals having the angular frequencies $\omega_{C2}+\omega_{B2}$ and $\omega_{C2}-\omega_{B2}$ of the device A2 are respectively represented as $\theta_{2H}$ and $\theta_{2L}$.

First, a phase is considered concerning the transmission signal having the angular frequency $\omega_{C1}+\omega_{B1}$. The transmission signal represented by Equation (1) described above is output from the device A1. The received signal $rx2(t)$ in the device A2 is represented by the following Equation (11):

$$rx2(t)=\cos\{(\omega_{C1}+\omega_{B1})t+\theta_{1H}-\theta_{2\times H\tau 1}\} \quad (11)$$

The device A2 multiplies together two signals $\cos\{(\omega_{C2}+\omega_{B2})t+\theta_{2H}\}$ and $\sin\{(\omega_{C2}+\omega_{B2})t+\theta_{2H}\}$ and a received wave of Equation (11) to thereby separates the received wave into an in-phase component (an I signal) and a quadrature component (a Q signal). A phase of the received wave (hereinafter referred to as detected phase or simply referred to as phase) can be easily calculated from the I and Q signals. That is, a detected phase $\theta_{H1}(t)$ is represented by the following Equation (12). Note that, in the following Equation (12), since a term of harmonics near an angular frequency $\omega_{C1}+\omega_{C2}$ is removed during demodulation, the term is omitted.

$$\theta_{H1}(t)=\tan^{-1}(Q(t)/I(t))=-\{(\omega_{C1}-\omega_{C2})t+(\omega_{B1}-\omega_{B2})t+\theta_{1H}-\theta_{2\times H\tau 1}\} \quad (12)$$

Similarly, when the transmission signal having the angular frequency $\omega_{C1}-\omega_{B1}$ is transmitted from the device A1, a detected phase $\theta_{L1}(t)$ calculated from the I and Q signals obtained in the device A2 is represented by the following Equation (13). Note that, in the following Equation (13), since a term of harmonics near the angular frequency $\omega_{C1}+\omega_{C2}$ is removed during demodulation, the term is omitted.

$$\theta_{L1}(t)=\tan^{-1}(Q(t)/I(t))=-\{(\omega_{C1}-\omega_{C2})t-(\omega_{B1}-\omega_{B2})t+\theta_{1L}-\theta_{2L}-\theta_{2\times L\tau 1}\} \quad (13)$$

A phase difference between these two detected phases (hereinafter referred to as detected phase difference or simply referred to as phase difference) $\theta_{H1}(t)-\theta_{L1}(t)$ is represented by the following Equation (14):

$$\theta_{H1}(t)-\theta_{L1}(t)=-2(\omega_{B1}-\omega_{B2})t+(\theta_{1H}-\theta_{1L})-(\theta_{2H}-\theta_{2L})+(\theta_{2\times H\tau 1}-\theta_{2\times L\tau 1}) \quad (14)$$

In the distance measuring device in the past that measures a distance using a reflected wave, the device A1 and the device A2 are the same device and share the local oscillator. Therefore, the following Equations (15) to (17) are satisfied:

$$\omega_{B1}=\omega_{B2} \quad (15)$$

$$\theta_{1H}=\theta_{2H} \quad (16)$$

$$\theta_{1L}=\theta_{2L} \quad (17)$$

When Equations (15) to (17) hold, Equation (14) is equal to Equation (7) described above. The distance R between the device A1 and the device A2 can be calculated according to a phase difference calculated by I and Q demodulation processing for the received signal in the device A2.

However, since the device A1 and the device A2 are provided to be separated from each other and the local oscillators operate independently from each other, Equations (15) to (17) described above are not satisfied. In this case, unknown information such as a difference between initial phases is included in Equation (14). A distance cannot be correctly calculated.

(Basic Distance Measuring Method of the Embodiment)

The signals having the two angular frequencies explained above transmitted by the first device are received in the second device and phases of the respective signals are calculated. The signals having the two angular frequencies explained above transmitted by the second device are received in the first device and phases of the respective signals are calculated. Further, phase information is transmitted from either one of the first device and the second device to the other. In the present embodiment, as explained below, the distance R between the first device and the second device is calculated by adding up a phase difference between the two signals calculated by the reception of the first device and a phase difference between the two signals calculated by the reception of the second device. Note that the phase information may be the I and Q signals or may be information concerning phases calculated from the I and Q signals or may be information concerning a difference between phases calculated from two signals having different frequencies.

(Configuration)

In FIG. 1, the first device 1 (hereinafter referred to as device 1 as well) and the second device 2 (hereinafter referred to as device 2 as well) are disposed to be separated from each other by the distance R. At least one of the device 1 and the device 2 is movable. The distance R changes according to the movement. A control section 11 is provided in the device 1. The control section 11 controls respective sections of the device 1. The control section 11 is configured of a processor including a CPU. The control section 11 may operate according to a computer program stored in a memory 12 and control the respective sections.

An oscillator 13 is controlled by the control section 11 and generates oscillation signals (local signals) having two frequencies on a basis of a reference oscillator incorporated in the oscillator 13. The respective oscillation signals from the oscillator 13 are supplied to a transmitting section 14 and a receiving section 15. Angular frequencies of the oscillation signals generated by the oscillator 13 are set to angular frequencies necessary for generating two waves of $\omega_{C1}+\omega_{B1}$ and $\omega_{C1}-\omega_{B1}$ as angular frequencies of transmission waves of the transmitting section 14. Note that when the oscillator 13 is constructed of a plurality of oscillators, each of the oscillators is oscillated in synchronization with an output of a common reference oscillator.

The transmitting section 14 can be configured of, for example, a quadrature modulator. The transmitting section 14 is controlled by the control section 11 to be capable of outputting two transmission waves of a transmission signal having the angular frequency $\omega_{C1}+\omega_{B1}$ and a transmission signal having the angular frequency $\omega_{C1}-\omega_{B1}$. The transmission waves from the transmitting section 14 are supplied to an antenna circuit 17.

The antenna circuit 17 includes one or more antennas and can transmit the transmission waves transmitted from the transmitting section 14. The antenna circuit 17 receives transmission waves from the device 2 explained below and supplies received signals to the receiving section 15.

The receiving section 15 can be configured of, for example, a quadrature demodulator. The receiving section 15 is controlled by the control section 11 to be capable of receiving and demodulating a transmission wave from the device 2 using, for example, signals having angular frequencies $\omega_{C1}$ and $\omega_{B1}$ from the oscillator 13 and separating and outputting an in-phase component (an I signal) and a quadrature component (a Q signal) of the received wave.

A configuration of the device 2 is the same as the configuration of the device 1. That is, a control section 21 is provided in the second device. The control section 21 controls respective sections of the device 2. The control section 21 is configured of a processor including a CPU. The control section 21 may operate according to a computer program stored in a memory 22 and control the respective sections.

An oscillator 23 is controlled by the control section 21 to generate oscillation signals having two frequencies on a basis of a reference oscillator incorporated in the oscillator 23. The respective oscillation signals from the oscillator 23 are supplied to a transmitting section 24 and a receiving section 25. Angular frequencies of the oscillation signals generated by the oscillator 23 are set to angular frequencies necessary for generating two waves of $\omega_{C2}+\omega_{B2}$ and $\omega_{C2}-\omega_{B2}$ as angular frequencies of transmission waves of the transmitting section 24.

Note that when the oscillator 23 is constructed of a plurality of oscillators, each of the oscillators is oscillated in synchronization with an output of a common reference oscillator.

The transmitting section 24 can be configured of, for example, a quadrature modulator. The transmitting section 24 is controlled by the control section 21 to be capable of outputting two transmission waves of a transmission signal having an angular frequency $\omega_{C2}+\omega_{B2}$ and a transmission signal having an angular frequency $\omega_{C2}-\omega_{B2}$. The transmission waves from the transmitting section 24 are supplied to an antenna circuit 27.

The antenna circuit 27 includes one or more antennas and can transmit the transmission waves transmitted from the transmitting section 24. The antenna circuit 27 receives transmission waves from the device 1 and supplies received signals to the receiving section 25.

The receiving section 25 can be configured of, for example, a quadrature demodulator. The receiving section 25 is controlled by the control section 21 to be capable of receiving and demodulating a transmission wave from the device 1 using, for example, signals having angular frequencies $\omega_{C2}$ and $\omega_{B2}$ from the oscillator 23 and separating and outputting an in-phase component (an I signal) and a quadrature component (a Q signal) of the received wave.

Figure 4:
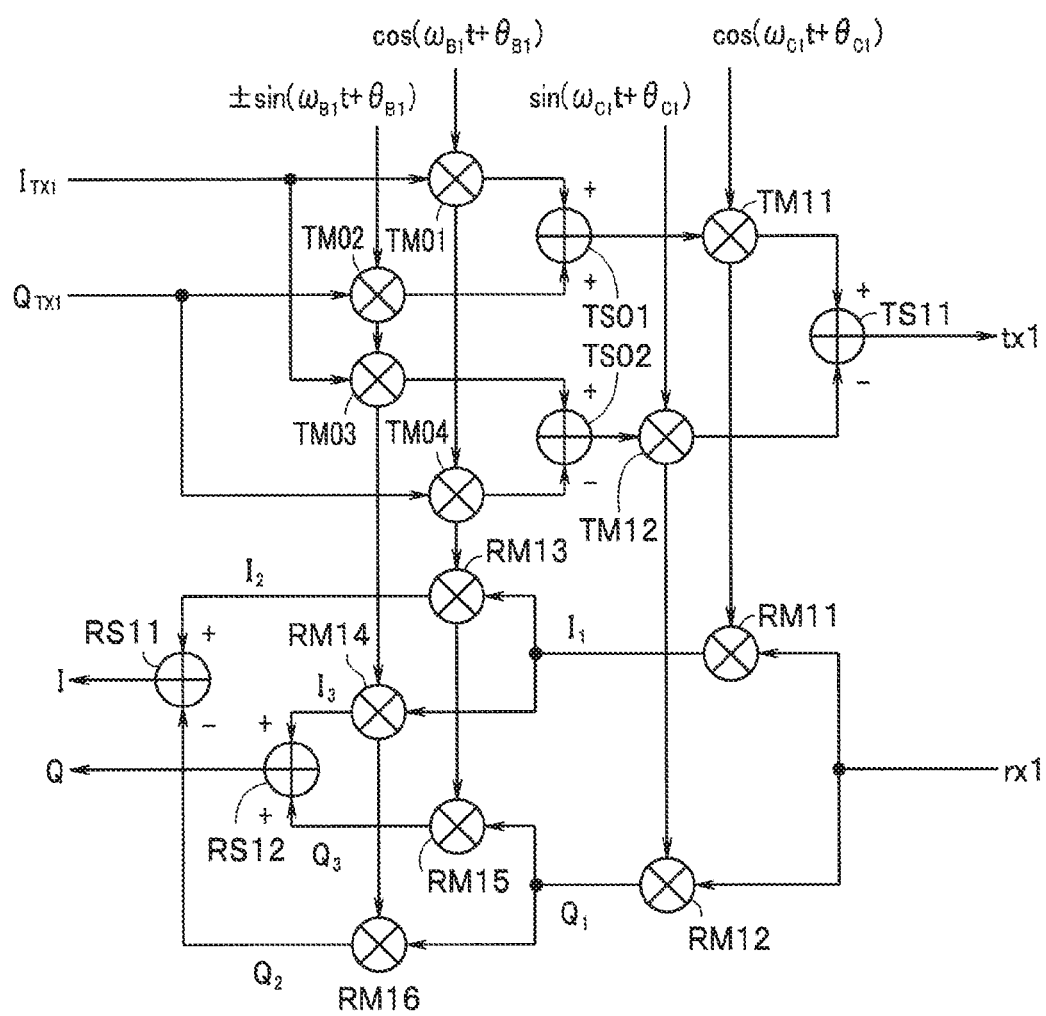
FIG. 4 is a circuit diagram showing an example of specific configurations of a transmitting section 14 and a receiving section 15 shown in FIG. 1.
Figure 5:
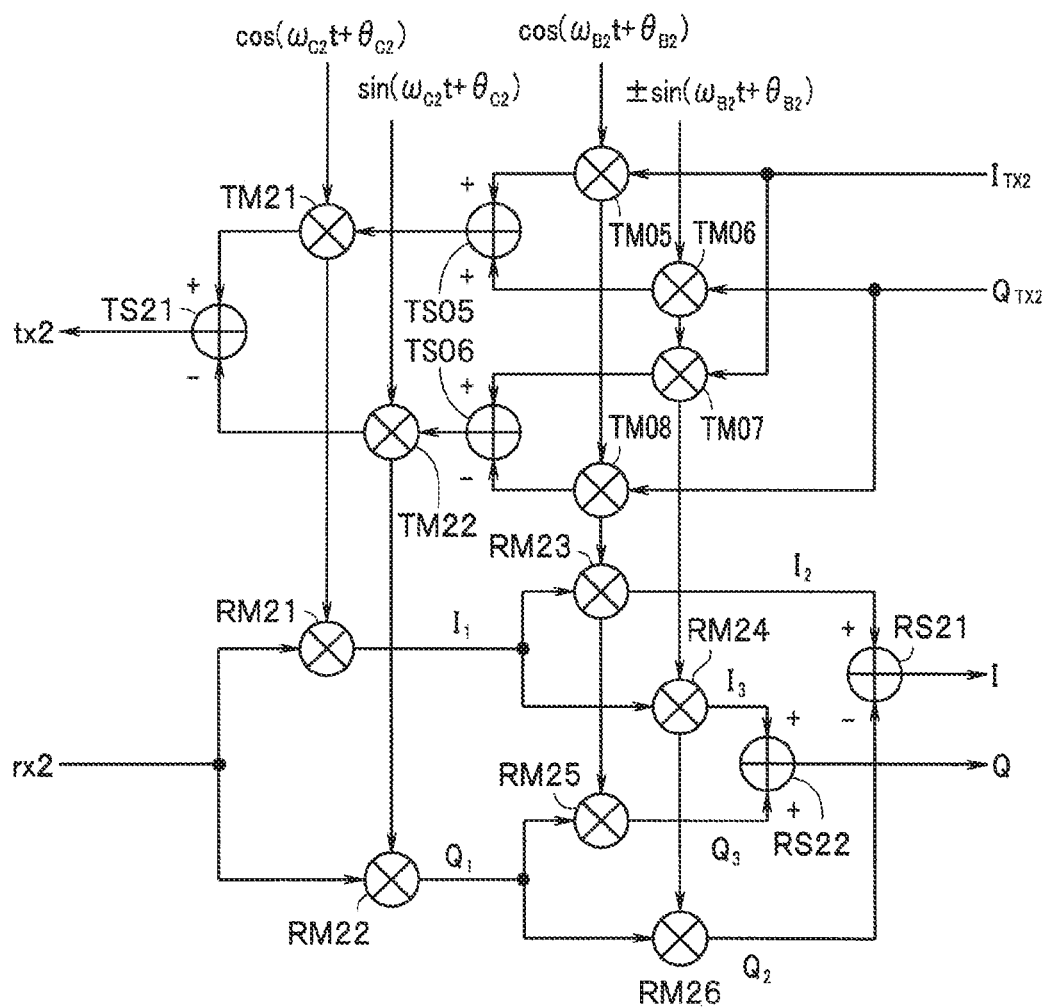
FIG. 5 is a circuit diagram showing an example of specific configuration of a transmitting section 24 and a receiving section 25 shown in FIG. 1.

FIG. 4 is a circuit diagram showing an example of specific configurations of the transmitting section 14 and the receiving section 15 shown in FIG. 1. FIG. 5 is a circuit diagram showing an example of specific configurations of the transmitting section 24 and the receiving section 25 shown in FIG. 1. FIGS. 4 and 5 show a transceiver of an image suppression scheme. However, the transceiver is not limited to the configuration.

Note that a configuration of the image suppression scheme is publicly known. As characteristics of the image suppression scheme, when a higher angular frequency band is demodulated centering on a local angular frequency for a high frequency, that is, $\omega_{C2}$ or $\omega_{C2}$, a signal in a lower angular frequency band is attenuated and, when a lower angular frequency band is demodulated, a signal in a higher angular frequency band is attenuated. This filtering effect is due to signal processing. The same applies to transmission. When the higher angular frequency band is demodulated centering on $\omega_{C1}$ or $\omega_{C2}$, $\sin(\omega_{B1}t+\theta_{B1})$ or $\sin(\omega_{B2}t+\theta_{B2})$ shown in FIGS. 4 and 5 is used. When the lower angular frequency band is demodulated, $-\sin(\omega_{B1}t+\theta_{B1})$ or $-\sin(\omega_{B2}+\theta_{B2})$ shown in FIGS. 4 and 5 is used. The frequency band demodulated is decided by change of such polarity. Note that $\theta_{B1}$ or $\theta_{B2}$ represents a phase of each angular frequency, that is, an initial phase when $t=0$. The same applies to $\theta_{C1}$ and $\theta_{C2}$.

Note that, in a receiver of the image suppression scheme, a term of harmonics near the angular frequency $\omega_{C1}-\omega_{C2}$ is removed during demodulation. Therefore, in an operation explained below, this term is omitted.

The transmitting section 14 is configured of multipliers TM01 to TM04, TM11 and TM12 and an adder TS01, TS02 and TS11. An input signal $I_{TX1}$ is supplied to the multipliers TM01 and TM03, and an input signal $Q_{TX1}$ is supplied to the multipliers TM02 and TM04. The multipliers TM01 and TM04 receive $\cos(\omega_{B1}t+\theta_{B1})$ from the oscillator 13 and the multipliers TM02 and TM03 receive any one of $\pm\sin(\omega_{B1}t+\theta_{B1})$ from the oscillator 13.

The multipliers TM01 to TM04, TM11 and TM12 multiply two inputs respectively, the adder TS01 adds up the multiplication results of the multipliers TM01 and TM02 and outputs the addition result to the multiplier TM11, and the adder TS02 subtracts the multiplication result of the TM04 from the multiplication result of the multiplier TM03 and outputs the subtraction result to the multiplier TM12.

The multiplier TM11 receives $\cos(\omega_{C1}t+\theta_{C1})$ from the oscillator 13 and the multiplier TM12 receives $\sin(\omega_{C1}t+\theta_{C1})$ from the oscillator 13.

The multipliers TM11 and TM12 respectively multiply together the two inputs and give multiplication results to the adder TS11. The adder TS11 adds up outputs of the multipliers TM11 and TM12 and outputs an addition result as a transmission wave tx1.

The receiving section 15 is configured of multipliers RM11 to RM16 and adders RS11 and RS12. A transmission wave of the device 2 is input to the multipliers RM11 and RM12 via the antenna circuit 17 as a received signal rx1. Oscillation signals having the angular frequency $\omega_{C1}$ and phases 90 degrees different from each other are respectively given to the multipliers RM11 and RM12 from the oscillator 13. The multiplier RM11 multiplies together the two inputs and gives a multiplication result to the multipliers RM13 and RM14. The multiplier RM12 multiplies together the two inputs and gives a multiplication result to the multipliers RM15 and RM16.

An oscillation signal having the angular frequency (a local angular frequency for baseband processing) $\omega_{B1}$ is given to the multipliers RM13 and RM15 from the oscillator 13. The multiplier RM13 multiplies together the two inputs and gives a multiplication result to the adder RS11. The multiplier RM14 multiplies together the two inputs and gives a multiplication result to the adder RS12.

An oscillation signal having the angular frequency $\omega_{B1}$ or an inverted signal of the oscillation signal, that is, a signal orthogonal to the oscillation signal having the angular frequency $\omega_{B1}$ given to the multiplier RM13 is given to the multipliers RM14 and RM16 from the oscillator 13. The multiplier RM14 multiplies together the two inputs and gives a multiplication result to the adder RS12. The multiplier RM16 multiplies together the two inputs and gives a multiplication result to the adder RS11.

The adder RS11 subtracts outputs of the multipliers RM13 and RM16 and outputs an addition result as an I signal. The adder RS12 adds up outputs of the multipliers RM14 and RM15 and outputs an addition result as a Q signal. The I and Q signals from the receiving section 15 are supplied to the control section 11.

The circuits shown in FIGS. 4 and 5 are the same circuit. That is, in FIG. 5, the configurations of the multipliers TM05 to TM08, TM21, TM22, and RM21 to RM26 and the adders TS05, TS06, TS21, RS21, and RS22 are respectively the same as the configurations of the multipliers TM01 to TM04, TM11, TM12, and RM11 to RM16 and the adders TS01, TS02, TS11, RS11, and RS12 shown in FIG. 4. The configurations are only different in that, since the frequency and the phase of the oscillating signal of the oscillator 23 are different from the frequency and the phase of the oscillating signal of the oscillator 13, in FIG. 5 is that $I_{TX2}$ and $Q_{TX2}$ are supplied as inputs, a local angular frequency for baseband $\omega_{B2}$ is input instead of the angular frequency $\omega_{B1}$ in FIG. 4 and $\omega_{C2}$ is input instead of the angular frequency $\omega_{C1}$ in FIG.

4. The I and Q signals from the receiving section 25 are supplied to the control section 21.

In the present embodiment, the control section 11 of the device 1 controls the transmitting section 14 to transmit two transmission waves having angular frequencies $\omega_{C1}+\omega_{B1}$ and $\omega_{C1}-\omega_{B1}$ via the antenna circuit 17.

On the other hand, the control section 21 of the device 2 controls the transmitting section 24 to transmit two transmission waves having angular frequencies $\omega_{C2}+\omega_{B2}$ and $\omega_{C2}-\omega_{B2}$ via the antenna circuit 27.

The control section 11 of the device 1 controls the receiving section 15 to receive the two transmission waves from the device 2 and acquires the I and Q signals. The control section 11 calculates a difference between two phases calculated from the I and Q signals respectively obtained by two received signals.

Similarly, the control section 21 of the device 2 controls the receiving section 25 to receive the two transmission waves from the device 1 and acquires the I and Q signals. The control section 21 calculates a difference between two phases calculated from the I and Q signals respectively obtained by two received signals.

In the present embodiment, the control section 11 of the device 1 gives phase information based on the acquired I and Q signals to the transmitting section 14 and causes the transmitting section 14 to transmit the phase information. Note that, as explained above, as the phase information, for example, a predetermined initial value may be given. The phase information may be I and Q signals calculated from the two received signals, may be information concerning phases calculated from the I and Q signals, or may be information concerning a difference between the phases.

For example, the control section 11 may generate I and Q signals based on phase information of a received signal having an angular frequency $\omega_{B2}$ and supplies the I and Q signals respectively to the multipliers TM11 and TM12 to transmit the phase information.

During the output of the oscillation signal having the angular frequency $\omega_{B1}$, the control section 11 may generate I and Q signals obtained by adding phase information of the received signal having the angular frequency $\omega_{B2}$ to an initial phase of the oscillation signal having angular frequency $\omega_{B1}$ and supply the I and Q signals respectively to the multipliers TM11 and TM12 to transmit the phase information.

The receiving section 25 of the device 2 receives the phase information transmitted by the transmitting section 14 via the antenna circuit 27. The receiving section 25 demodulates a received signal and obtains I and Q signals of the phase information. The I and Q signals are supplied to the control section 21. The control section 21 obtains, according to the phase information from the receiving section 25, a value including the phase difference acquired by the control section 11 of the device 1. The control section 21 functioning as a calculating section adds up the phase difference obtained by the reception result of the receiving section 25 and the phase difference based on the phase information transmitted from the device 2 to calculate the distance R between the first device 1 and the second device 2.

Note that, in FIG. 1, an example is shown in which both of the first device 1 and the second device 2 have a function of transmitting phase information and a function of giving received phase information to the control section and calculating the distance R. However, it is sufficient that one of the first device 1 and the second device 2 has the function of transmitting phase information and the other has the function of giving received phase information to the control section and calculating the distance R.

(Basic Operation of Communication Type Distance Measurement)

Figure 6:
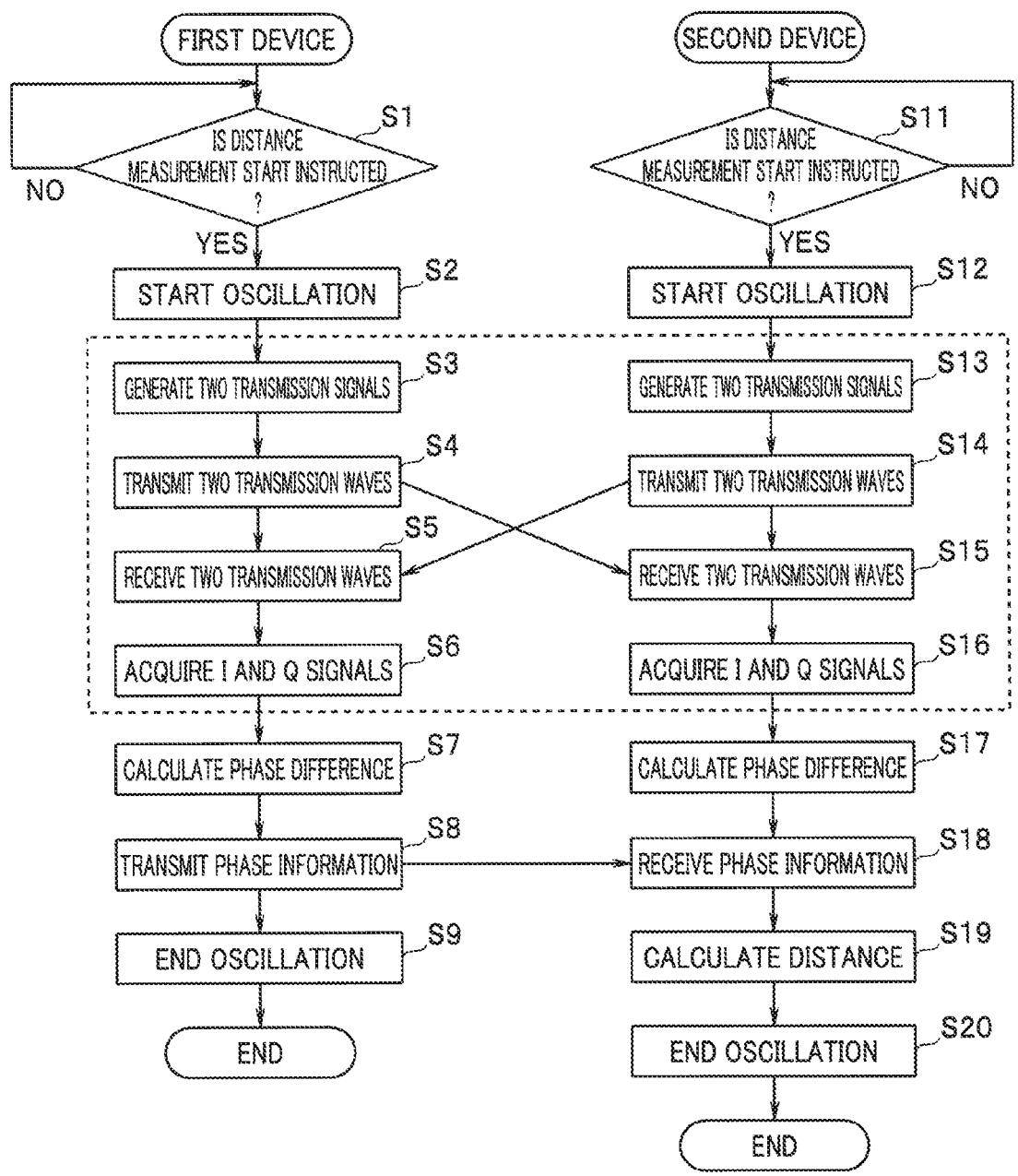
FIG. 6 is a flowchart for explaining operation in the first embodiment.

An operation in such communication type distance measurement is explained using a case where the device 2 calculates a distance as an example and with reference to a flowchart of FIG. 6. In FIG. 6, an operation of the device 1 is shown on a left side and an operation of the device 2 is shown on a right side. In FIG. 6, an arrow connecting steps of the devices 1 and 2 indicates that communication is performed between the devices 1 and 2. Note that steps S4, S5, S14, and S15 are substantially simultaneously executed.

In step S1, the control section 11 of the device 1 determines whether an instruction for a distance measurement start is received. When the instruction for the distance measurement start is received, the control section 11 controls the oscillator 13 to start an output of a necessary oscillation signal. In step S11, the control section 21 of the device 2 determines whether an instruction for a distance measurement start is received. When the instruction for the distance measurement start is received, the control section 21 controls the oscillator 23 to start an output of a necessary oscillation signal.

Note that, as explained below, in step S9, the control section 11 ends oscillation. In step S20, the control section 21 ends oscillation. Control of a start and an end of oscillation in the control sections 11 and 21 indicates that oscillation of the oscillators 13 and 23 is not stopped during transmission and reception periods for distance measurement. Actual start and end timings of the oscillation are not limited to the flow shown in FIG. 6. In a period in which the oscillation of the oscillators 13 and 23 continues, initial phases of the respective oscillators 13 and 23 are not set anew.

The control section 11 of the device 1 generates two transmission signals in step S3 and causes the antenna circuit 17 to transmit the transmission signals as transmission waves (step S4). The control section 21 of the device 2 generates two transmission signals in step S13 and causes the antenna circuit 27 to transmit the transmission signals as transmission waves (step S14).

It is assumed that an initial phase of an oscillation signal having the frequency $\omega_{C1}$ output from the oscillator 13 of the device 1 is $\theta_{c1}$ and an initial phase of an oscillation signal having the frequency $\omega_{B1}$ is $\theta_{B1}$. Note that, as explained above, the initial phases $\theta_{c1}$ and $\theta_{B1}$ are not set anew as long as the oscillation of the oscillator 13 continues.

Note that it is assumed that an initial phase of an oscillation signal having the frequency $\omega_{C2}$ output from the oscillator 23 of the device 2 is $\theta_{c2}$ and an initial phase of an oscillation signal having the frequency $\omega_{B2}$ is $\theta_{B2}$. The initial phases $\theta_{c2}$ and $\theta_{B2}$ are not set anew as long as the oscillation of the oscillator 23 continues.

Note that, when simultaneous transmission and simultaneous reception of two frequencies are assumed, two wireless sections shown in FIG. 4 are necessary in the device 1 and two wireless sections shown in FIG. 5 are necessary in the device 2. Alternatively, a radio of a superheterodyne scheme or the like is used. However, the respective oscillators use the same radio section.

(Transmission and Reception of a Transmission Wave Having the Angular Frequency $\omega_{C1}+\omega_{B1}$ from the Device 1)

Now in FIG. 4, assuming that $I_{TX1}=1$ and $Q_{TX1}=0$, that is, an IQ signal with a radius 1 and a phase 0 degrees is given, two transmission waves having the angular frequencies $\omega_{C1}+\omega_{B1}$ and $\omega_{C1}-\omega_{B1}$ are output from the device 1 by the multipliers TM11 and TM12, and the adder TS11 configuring the transmitting section 14. The transmission signal tx1($t$) having the angular frequency $\omega_{C1}+\omega_{B1}$ is represented by the following Equation (18):

$$tx1(t) = \\ \cos(\omega_{C1}t+\theta_{C1})\cos(\omega_{B1}t+\theta_{B1}) - \sin(\omega_{C1}t+\theta_{c1})\sin(\omega_{B1}t+\theta_{B1}) = \\ \cos\{(\omega_{C1}+\omega_{B1})t+\theta_{C1}+\theta_{B1}\} \quad (18)$$

When the distance between the devices 1 and 2 is represented as R and a delay until a transmission wave from the device 1 is received by the device 2 is represented as $\tau_1$, the received signal rx2($t$) of the device 2 can be represented by the following Equations (19) and (20):

$$rx2(t) = \cos\{(\omega_{C1}+\omega_{B1})(t-\tau_1)+\theta_{C1}+\theta_{B1}\} = \\ \cos\{(\omega_{C1}+\omega_{B1})t+\theta_{C1}+\theta_{B1}-\theta_{\tau H1}\} \quad (19)$$

$$\theta_{\tau H1} = (\omega_{C1}+\omega_{B1})\tau_1 \quad (20)$$

The received signal rx2($t$) is received by the antenna circuit 27 and supplied to the receiving section 25. In the receiver shown in FIG. 5, the received signal rx2($t$) is input to the multipliers RM21 and RM22. Subsequently, signals in respective nodes of the receiver shown in FIG. 5 are sequentially calculated. Outputs of the multipliers RM21, RM23, and RM24 are respectively represented as $I_1(t)$, $I_2(t)$, and $I_3(t)$, outputs of the multipliers RM22, RM26, and RM25 are respectively represented as $Q_1(t)$, $Q_2(t)$, and $Q_3(t)$, and outputs of the adders RS21 and RS22 are respectively represented as I(t) and Q(t). The outputs are represented by the following Equations (21) to (26):

$$I_1(t)=\cos(\omega_{C2}t+\theta_{C2})\times\cos\{(\omega_{C1}+\omega_{B1})t+\theta_{c1}+\theta_{B1}-\theta_{\tau H1}\} \quad (21)$$

$$Q_1(t)=\sin(\omega_{C2}t+\theta_{C2})\times\cos\{(\omega_{C1}+\omega_{B1})t+\theta_{c1}+\theta_{B1}-\theta_{\tau H1}\} \quad (22)$$

$$I_2(t)=I_1(t)\times\cos(\omega_{B2}t+\theta_{B2}) \quad (23)$$

$$Q_2(t)=Q_1(t)\times\sin(\omega_{B2}t+\theta_{B2}) \quad (24)$$

$$I_3(t)=I_1(t)\times\sin(\omega_{B2}t+\theta_{B2}) \quad (25)$$

$$Q_3(t)=Q_1(t)\times\cos(\omega_{B2}t+\theta_{B2}) \quad (26)$$

An output I(t) of the adder RS21 is I(t)=$I_2(t)+Q_2(t)$. An output Q(t) of the adder RS22 is Q(t)=$I_3(t)-Q_3(t)$. A phase $\theta_{H1}(t)$ obtained from I(t) and Q(t) is represented by the following Equation (27):

$$\theta_{H1}(t)=\tan^{-1}(Q(t)/I(t))=-\{(\omega_{C1}-\omega_{C2})t+(\omega_{B1}-\omega_{B2})t+\theta_{C1}-\theta_{C2}+\theta_{B1}-\theta_{B2}-\theta_{\tau H1}\} \quad (27)$$

(Transmission and Reception of a Transmission Wave Having the Angular Frequency $\omega_{C2}+\omega_{B2}$ from the Device 2)

Similarly, $I_{TX2}=1$ and $Q_{TX2}=0$ are assumed in FIG. 5. In this case, when the signal tx2($t$) having the angular frequency $\omega_{C2}+\omega_{B2}$ transmitted from the device 2 is received by the device 1 after a delay $\tau_2$, a phase $\theta_{H2}(t)$ obtained from the signals I(t) and Q(t) detected by the device 1 is calculated.

$$tx2(t) = \\ \cos(\omega_{C2}t+\theta_{C2})\cos(\omega_{B2}t+\theta_{B2}) - \sin(\omega_{C2}t+\theta_{c2})\sin(\omega_{B2}t+\theta_{B2}) = \\ \cos\{(\omega_{C2}+\omega_{B2})t+\theta_{C2}+\theta_{B2}\} \quad (28)$$

$$rx1(t) = \cos\{(\omega_{C2}+\omega_{B2})(t-\tau_2)+\theta_{C2}+\theta_{B2}\} = \\ \cos\{(\omega_{C2}+\omega_{B2})t+\theta_{C2}+\theta_{B2}-\theta_{\tau H2}\} \quad (29)$$

$$\theta_{\tau H2} = (\omega_{C2}+\omega_{B2})\tau_2 \quad (30)$$

The received signal rx1($t$) is received by the antenna circuit 17 and supplied to the receiving section 15. In the receiver shown in FIG. 4, the received signal rx1($t$) is input to the multipliers RM11 and RM12. Subsequently, signals in respective nodes of the receiver shown in FIG. 4 are sequentially calculated. Outputs of the multipliers RM11, RM13, and RM14 are respectively represented as $I_1(t)$, $I_2(t)$, and $I_3(t)$, outputs of the multipliers RM12, RM16, and RM15 are respectively represented as $Q_1(t)$, $Q_2(t)$, and $Q_3(t)$, and outputs of the adders RS11 and RS12 are respectively represented as I(t) and Q(t). The outputs are represented by the following Equations (31) to (36):

$$I_1(t)=\cos(\omega_{C1}t+\theta_{C1})\times\cos\{(\omega_{C2}+\omega_{B2})t+\theta_{c2}+\theta_{B2}-\theta_{\tau H2}\} \quad (31)$$

$$Q_1(t)=\sin(\omega_{C1}t+\theta_{C1})\times\cos\{(\omega_{C2}+\omega_{B2})t+\theta_{c2}+\theta_{B2}-\theta_{\tau H2}\} \quad (32)$$

$$I_2(t)=I_1(t)\times\cos(\omega_{B1}t+\theta_{B1}) \quad (33)$$

$$Q_2(t)=Q_1(t)\times\sin(\omega_{B1}t+\theta_{B1}) \quad (34)$$

$$I_3(t)=I_1(t)\times\sin(\omega_{B1}t+\theta_{B1}) \quad (35)$$

$$Q_3(t)=Q_1(t)\times\cos(\omega_{B1}t+\theta_{B1}) \quad (36)$$

An output I(t) of the adder RS11 is I(t)=$I_2(t)+Q_2(t)$. An output Q(t) of the adder RS12 is Q(t)=$I_3(t)-Q_3(t)$. A phase $\theta_{H2}(t)=\tan^{-1}(Q(t)/I(t))$ obtained from I(t) and Q(t) is represented by the following Equation (37):

$$\theta_{H2}(t)=(\omega_{C1}-\omega_{C2})t+(\omega_{B1}-\omega_{B2})t+\theta_{C1}-\theta_{C2}+\theta_{B1}-\theta_{B2}+\theta_{\tau H2} \quad (37)$$

(Transmission and Reception of a Transmission Wave Having the Angular Frequency $\omega_{C1}-\omega_{B1}$ from the Device 1)

The signal tx1($t$) having the angular frequency $\omega_{C1}-\omega_{B1}$ transmitted from the device 1 is calculated in the same manner $$tx1(t) = \\ \cos(\omega_{C1}t+\theta_{C1})\cos(\omega_{B1}t+\theta_{B1}) + \sin(\omega_{C1}t+\theta_{c1})\sin(\omega_{B1}t+\theta_{B1}) = \\ \cos\{(\omega_{C1}-\omega_{B1})t+\theta_{C1}-\theta_{B1}\} \quad (38)$$

Since the distance between the devices 1 and 2 is R and the delay time is $\tau_1$, the received signal rx2($t$) in the device 2 is represented by the following Equations (39) and (40):

$$rx2(t) = \cos\{(\omega_{C1}-\omega_{B1})(t-\tau_1)+\theta_{C1}-\theta_{B1}\} \\ = \cos\{(\omega_{C1}-\omega_{B1})t+\theta_{C1}-\theta_{B1}-\theta_{\tau L1}\} \quad (39)$$

$$\theta_{\tau L1} = (\omega_{C1}-\omega_{B1})\tau_1 \quad (40)$$

Signals of the respective nodes of the device 2 can be represented by the following Equations (43) to (47):

$$I_1(t)=\cos(\omega_{C2}t+\theta_{C2})\times\cos\{(\omega_{C1}-\omega_{B1})t+\theta_{c1}-\theta_{B1}-\theta_{\tau L1}\} \quad (41)$$

$$Q_1(t)=\sin(\omega_{C2}t+\theta_{C2})\times\cos\{(\omega_{C1}-\omega_{B1})t+\theta_{c1}-\theta_{B1}-\theta_{\tau L1}\} \quad (42)$$

$$I_2(t)=I_1(t)\times\cos(\omega_{B2}t+\theta_{B2}) \quad (43)$$

$$Q_2(t)=Q_1(t)\times\{-\sin(\omega_{B2}t+\theta_{B2})\} \quad (44)$$

$$I_3(t)=I_1(t)\times\{-\sin(\omega_{B2}t+\theta_{B2})\} \quad (45)$$

$$Q_3(t)=Q_1(t)\times\cos(\omega_{B2}t+\theta_{B2}) \quad (46)$$

A phase $\theta_{L1}(t)=\tan^{-1}(Q(t)/I(t))$ detected by the device 2 from $I(t)=I_2(t)-Q_2(t)$ obtained from the adder RS21 and $Q(t)=I_3(t)+Q_3(t)$ obtained from the adder RS22 is represented by the following Equation (47):

$$\theta_{L1}(t)=\tan^{-1}(Q(t)/I(t))=-\{(\omega_{C1}-\omega_{C2})t-(\omega_{B1}-\omega_{B2})t+\theta_{C1}-\theta_{C2}-(\theta_{B1}-\theta_{B2})-\theta_{\tau L1}\} \quad (47)$$

(Transmission and Reception of a Transmission Wave Having the Angular Frequency $\omega_{C2}-\omega_{B2}$ from the Device 2)

Similarly, when the signal $tx2(t)$ having the angular frequency $\omega_{C2}-\omega_{B2}$ transmitted from the device 2 is received by the device 1 after a delay $\tau_2$, a phase $\theta_{L2}(t)$ obtained from $I(t)$ and $Q(t)$ detected by the device 1 is calculated.

$$tx2(t) = \quad (48)$$
$$\cos(\omega_{C2}t+\theta_{C2})\cos(\omega_{B2}t+\theta_{B2})+\sin(\omega_{C2}t+\theta_{C2})\sin(\omega_{B2}t+\theta_{B2}) =$$
$$\cos\{(\omega_{C2}-\omega_{B2})t+\theta_{C2}-\theta_{B2}\}$$

$$rx1(t) = \cos\{(\omega_{C2}-\omega_{B2})(t-\tau_2)+\theta_{C2}-\theta_{B2}\} = \quad (49)$$
$$\cos\{(\omega_{C2}-\omega_{B2})t+\theta_{C2}-\theta_{B2}-\theta_{\tau L2}\}$$

$$\theta_{\tau L2} = (\omega_{C2}-\omega_{B2})\tau_2 \quad (50)$$

Signals of the respective nodes of the device 1 can be represented by the following Equations (53) to (57):

$$I_1(t)=\cos(\omega_{C1}t+\theta_{C1})\times\cos\{(\omega_{C2}-\omega_{B2})t+\theta_{C2}-\theta_{B2}-\theta_{\tau L2}\} \quad (51)$$

$$Q_1(t)=\sin(\omega_{C1}t+\theta_{C1})\times\cos\{(\omega_{C2}-\omega_{B2})t+\theta_{C2}-\theta_{B2}-\theta_{\tau L2}\} \quad (52)$$

$$I_2(t)=I_1(t)\times\cos(\omega_{B1}t+\theta_{B1}) \quad (53)$$

$$Q_2(t)=Q_1(t)\times\{-\sin(\omega_{B1}t+\theta_{B1})\} \quad (54)$$

$$I_3(t)=I_1(t)\times\{-\sin(\omega_{B1}t+\theta_{B1})\} \quad (55)$$

$$Q_3(t)=Q_1(t)\times\cos(\omega_{B1}t+\theta_{B1}) \quad (56)$$

A phase $\theta_{L2}(t)=\tan^{-1}\{Q(t)/I(t)\}$ detected by the device 1 from $I(t)=I_2(t)-Q_2(t)$ obtained from the adder RS11 and $Q(t)=I_3(t)+Q_3(t)$ obtained from the adder RS12 is represented by the following Equation (57):

$$\theta_{L2}(t)=(\omega_{C1}-\omega_{C2})t-(\omega_{B1}-\omega_{B2})t+\theta_{C1}-\theta_{C2}-(\theta_{B1}-\theta_{B2})+\theta_{\tau L2} \quad (57)$$

In step S6 in FIG. 6, the control section 11 of the device 1 acquires the I and Q signals received by the receiving section 15. In step S7, the control section 11 calculates the phases $\theta_{\tau H2}(t)$ and $\theta_{\tau L2}(t)$ represented by Equation (37) and (57) described above. In step S16 in FIG. 6, the control section 21 of the device 2 acquires the I and Q signals received by the receiving section 25. In step S17, the control section 21 calculates the phases $\theta_{\tau H1}(t)$ and $\theta_{\tau L1}(t)$ represented by Equation (27) and (47) described above.

The control section 11 gives acquired phase information to the transmitting section 14 and causes the transmitting section 14 to transmit the phase information (step S8). For example, the control section 11 supplies the I and Q signals based on the phase information instead of the oscillation signals supplied to the multipliers TM11 and TM12 shown in FIG. 4. As described later, the phase information are given to $I_T$, QT signals in FIG. 50 and FIG. 51. Note that another transmitter for transmitting the phase information may be used.

In step S18, the control section 21 of the device 2 receives the phase information from the device 1. As explained above, the phase information may be the I and Q signals from the receiving section 15 of the device 1, may be information concerning phases obtained from the I and Q signals, or may be information concerning a difference between the phases.

In step S19, the control section 21 performs an operation of the following Equation (58) to calculate a distance. The following Equation (58) is an equation for adding up a difference between Equation (27) and Equation (47) and a difference between Equation (37) and Equation (57).

$$\{\theta_{H1}(t)-\theta_{L1}(t)\}+\{\theta_{H2}(t)-\theta_{L2}(t)\}=(\theta_{\tau H1}-\theta_{\tau L1})+(\theta_{\tau H2}-\theta_{\tau L2}) \quad (58)$$

The following Equations (59) and (60) hold:

$$\theta_{\tau H1}-\theta_{\tau L1}=(\omega_{C1}+\omega_{B1})\tau_1-(\omega_{C1}-\omega_{B1})\tau_1=2\omega_{B1}\tau_1 \quad (59)$$

$$\theta_{\tau H2}-\theta_{\tau L2}=(\omega_{C2}+\omega_{B2})\tau_2-(\omega_{C2}-\omega_{B2})\tau_2=2\omega_{B2}\tau_2 \quad (60)$$

The delays $\tau_1$ and $\tau_2$ of radio waves between the devices 1 and 2 are the same irrespective of a traveling direction. Therefore, the following Equation (61) is obtained from Equations (58) to (60):

$$\{\theta_{H1}(t)-\theta_{L1}(t)\}+\{\theta_{H2}(t)-\theta_{L2}(t)\} = \quad (61)$$
$$(\theta_{\tau H1}-\theta_{\tau L1})+(\theta_{\tau H2}-\theta_{\tau L2})=2\times(\omega_{B1}+\omega_{B2})\tau_1$$

Since $\tau_1=(R/c)$, Equation (61) described above indicates that a value proportional to a double of the distance R is calculated by addition of a phase difference between two frequencies by the I and Q signals detected by the device 2 and a phase difference between two frequencies by the I and Q signals detected by the device 1. In general, the angular frequency $\omega_{B1}$ by the oscillator 13 of the device 1 and the angular frequency $\omega_{B2}$ by the oscillator 13 of the device 2 can be matched with an error in the order of several ten ppm. Therefore, the distance R by Equation (61) described above can be calculated at resolution of equal to or higher than at least approximately 1 m.

In step S9, the control section 11 stops the oscillator 13. In step S20, the control section 21 stops the oscillator 23. Note that, as explained above, the control sections 11 and 21 only have to continue the oscillation in a period of transmission and reception in steps S4, S5, S14, and S15. Start and end timings of the oscillation of the oscillators 13 and 23 are not limited to the example shown in FIG. 6.

(Calculation of a Distance by a Residue of $2\pi$)

Incidentally, when the addition of the phase differences detected by the device 1 and the device 2 is performed, a result of the addition is sometimes negative values or larger than $2\pi$ [rad]. In this case, it is possible to calculate a correct distance R with respect to a detected phase by calculating a residue of $2\pi$.

Figure 7:
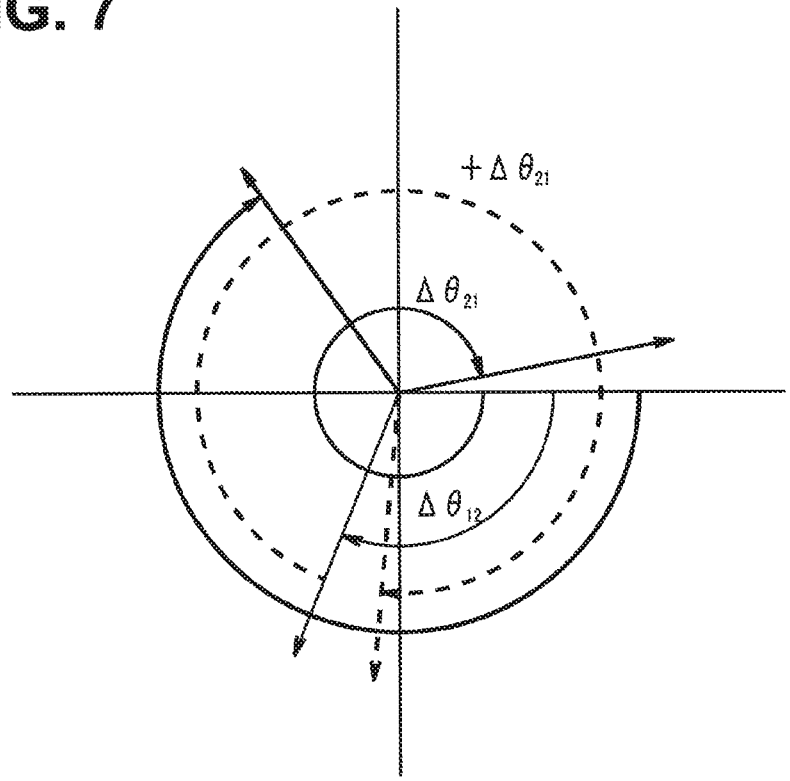
FIG. 7 is an explanatory diagram for explaining a method of calculating a distance using a system of residue.
Figure 8:
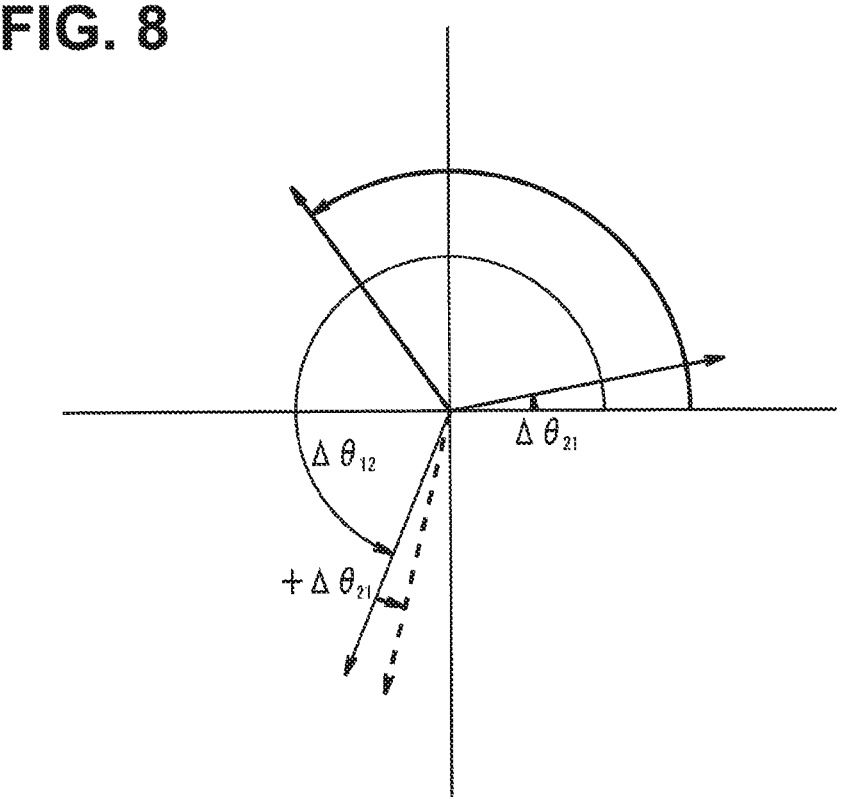
FIG. 8 is an explanatory diagram for explaining the method of calculating a distance using the system of residue.

FIGS. 7 and 8 are explanatory diagrams for explaining a method of calculating a distance using a system of residue.

For example, when R=11 m and $\omega_{B1}=\omega_{B2}=2\pi\times 5$ MHz, a detected phase difference $\Delta\theta_{12}$ obtained by the device 1 and a detected phase difference $\Delta\theta_{21}$ obtained by the device 2 are respectively as represented by the following Equations (62) and (63):

$$\Delta\theta_{12}=\theta_{\tau H1}-\theta_{\tau L1}=-1.8849 \text{ [rad]} \quad (62)$$

$$\Delta\theta_{21}=\theta_{\tau H2}-\theta_{\tau L2}=-6.0737 \text{ [rad]} \quad (63)$$

The following Equation (61a) is obtained from Equation (61) described above:

$$(1/2)[\{\Delta\theta_{12}\}+\{\Delta\theta_{21}\}]=(\omega_{B1}+\omega_{B2})(R/c) \quad (61a)$$

FIG. 7 shows a phase relation between Equations (62) and (63) described above. A phase of a sum of $\Delta\theta_{21}$ indicated by an arrow on inner most side and $\Delta\theta_{12}$ indicated by a second arrow from the inner side rotating in a clockwise direction on a basis of a phase 0 degree is indicated by a third arrow from the inner side. A half angle of this phase is a phase of a thick line indicated by an arrow on the outermost side.

From Equation (61a), $-0.3993=(\omega_{B1}+\omega_{B2})(R/c)$ is obtained. When this equation is solved, R=−19 m. It is seen that a distance cannot be correctly calculated because a detected phase difference is larger than −π(rad).

Therefore, in the present embodiment, in such a case, as shown in FIG. 8, 2π is added to both of $\Delta\theta_{12}$ and $\Delta\theta_{21}$. That is, a phase of a sum of $2\pi+\Delta\theta_{21}$ indicated by an arrow on inner most side and $2\pi+\Delta\theta_{12}$ indicated by a second arrow from the inner side rotating in a counterclockwise direction on a basis of the phase 0 degree is a phase indicated by a third arrow from the inner side. A half angle of this phase is a phase of a thick line indicated by an arrow on the outermost side.

$$2\pi+(\Delta\theta_{12}+\Delta\theta_{21})/2=2.3008$$

From Equation (61a), R is calculated as R=11 m.

Consequently, in the present embodiment, when the detected phase differences are added up, a residue of 2π only has to be calculated to calculate the distance R. Note that the method of using the residue of 2π in the phase addition is applicable in other embodiments.

(Selection from a Plurality of Distance Candidates)

Incidentally, a detected phase difference exceeding 2π cannot be detected. Therefore, a plurality of distance candidates are present with respect to a calculated detected phase difference. As a method of selecting a correct distance from the plurality of distance candidates, a method of transmitting three transmission waves having different angular frequencies and a method of determining a distance according to received power exist.

Figure 9:
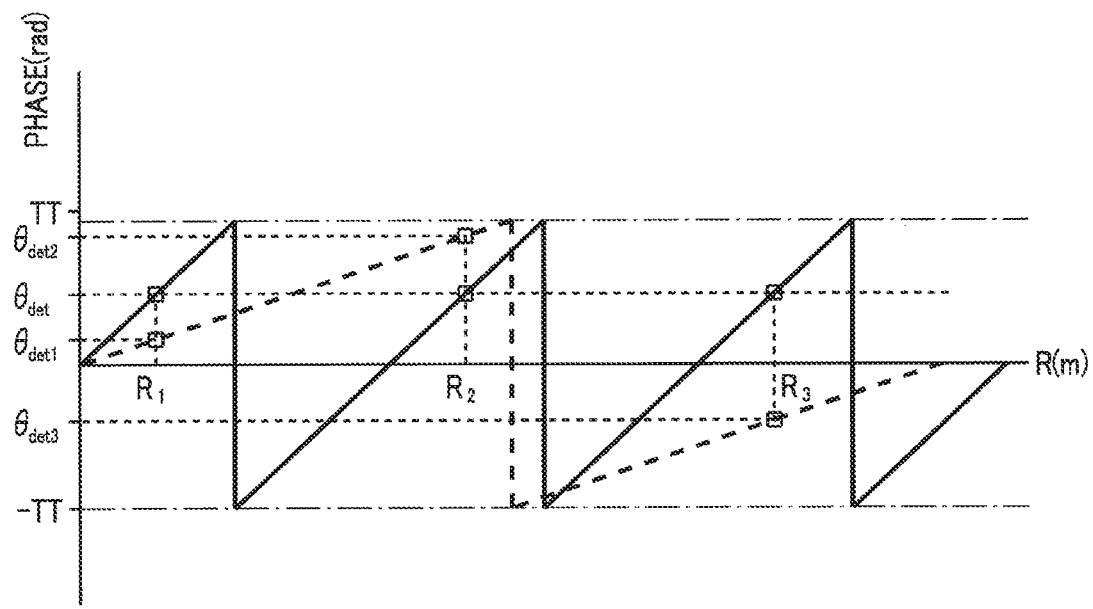
FIG. 9 is an explanatory diagram showing an example in which a distance is plotted on the horizontal axis and a phase is plotted on the vertical axis, in which three wave signals having different angular frequencies each other are transmitted.

FIG. 9 is an explanatory diagram showing an example in which a distance is plotted on the horizontal axis and a phase is plotted on the vertical axis and three transmission waves having different angular frequencies are transmitted.

Since $\tau_1=(R/c)$, the following Equation (64) is obtained from Equation (61) described above:

$$(1/2)\times\{(\theta_{\tau H1}-\theta_{\tau L1})+(\theta_{\tau H2}-\theta_{\tau L2})\}=(\omega_{B1}+\omega_{B2})\times(R/c) \quad (64)$$

When a left side is described as $\theta_{det}$, a relation between the distance R and $\theta_{det}$ is as indicated by a solid line in FIG. 9. However, although a sum $\theta_{det}$ of detected phase differences calculated by Equation (64) described above can take a value other than a value between −π(rad) and π(rad), the sum $\theta_{det}$ of the phase differences is a value converted into a value between −π(rad) and π(rad). In general, this is because a phase angle is displayed within a range [−π(rad), π(rad)].

Referring to FIG. 9, candidates of a distance by the sum $\theta_{det}$ of the detected phase differences include $R_1$, $R_2$, and $R_3$. The sum $\theta_{det}$ of the detected phase differences is an addition and subtraction result of phases obtained by transmission and reception of respective transmission waves having angular frequencies $\omega_{C1}+\omega_{B1}$, $\omega_{C1}-\omega_{B1}$, $\omega_{C2}+\omega_{B2}$, and $\omega_{C2}-\omega_{B2}$. However, an addition and subtraction result of phases obtained by transmission and reception of transmission waves having angular frequencies $\omega_{C1}+\omega_{B1}/Q$ and $\omega_{C2}+\omega_{B2}/Q$ is considered anew. Q is a rational number satisfying the following Expression (65):

$$Q>1 \quad (65)$$

A relation between detected phases at the new angular frequencies and the distance R can be indicated by a broken line shown in FIG. 9. To select a correct distance from the candidates $R_1$, $R_2$, and $R_3$ of the distance, a result of the detected phases obtained at the new angular frequencies is referred to. That is, if $\theta_{det}1$ is detected, the correct distance is determined as the distance $R_1$. If $\theta_{det}2$ is detected, the correct distance is determined as the distance $R_2$. Note that, if a coverage of a radio wave is kept small, the inspection by the phase aliasing is unnecessary. Note that the transmission at the different three frequencies is explained above. However, the same can be realized by transmitting different three or more frequencies.

Figure 10:
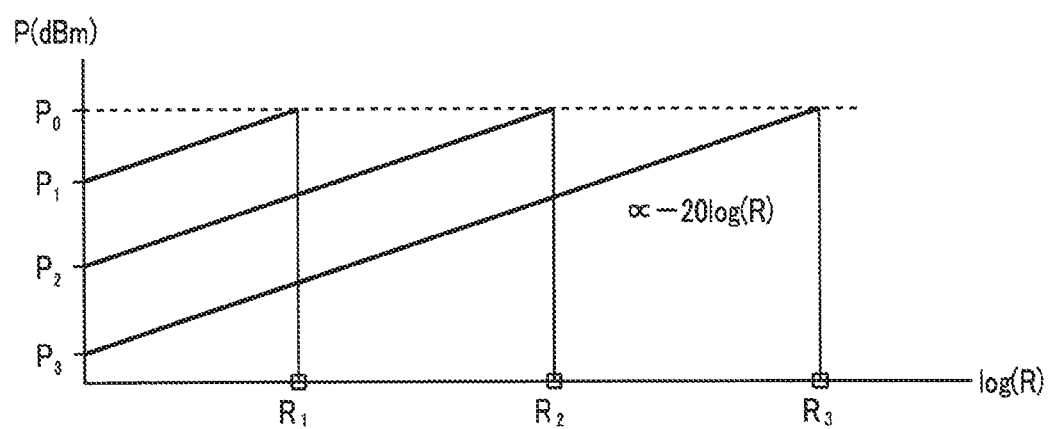
FIG. 10 is an explanatory diagram for explaining a method of selecting a correct distance through amplitude observation of a detected signal.

A method of selecting a correct distance according to amplitude observation of a detected signal is explained with reference to the explanatory diagram of FIG. 10.

In Equation (8) described above, the amplitude is attenuated at the attenuation $L_1$ according to the distance R. However, propagation attenuation in a free space is generally represented by the following Equation (66):

$$L_1=(\lambda/4\pi R)^2 \quad (66)$$

where, λ is a wavelength. According to Equation (66), if the distance R is large, the attenuation $L_1$ is also large and, if the distance R is small, the attenuation L1 is also small. FIG. 10, in which received power P is plotted on the vertical axis, shows the relationship. When it is assumed that an antenna gain of transmission and reception is 1 and transmission power is $P_0$, received power $P_1$ at the distance $R_1$ and received power $P_2$ at the distance $R_2$ are respectively represented by the following Equations (67) and (68):

$$P_1=(\lambda/4\pi R_1)^2 \times P_0 \quad (67)$$

$$P_2=(\lambda/4\pi R_2)^2 \times P_0 \quad (68)$$

It is possible to distinguish the distances $R_1$ and $R_2$ from the sum $\theta_{det}$ of the detected phase differences and the received power.

Note that, in this case, it is possible to perform sure distance measurement by using the residue of 2π in the phase addition as well.

As explained above, in the basic distance measuring method of the present embodiment, the signals having the two angular frequencies are transmitted from the first device and the second device to the second device respectively and the first device and the two phases of the two received signals having different angular frequencies are respectively calculated in the first and second devices. Any one of the first device and the second device transmits calculated phase information to the other. The device that receives the phase information accurately calculates the distance between the first device and the second device irrespective of initial phases of the oscillators of the first device and the second device according to an addition result of a phase difference between the two received signals received by the first device and a phase difference between the two received signals received by the second device. In the distance measuring system, a reflected wave is not used. The accurate distance measurement is performed by only one-way direction from the first device and the second device. It is possible to increase a measurable distance.

In the above description, Equation (61) described above for calculating a distance from addition of detected phase differences is calculated assuming that the delays $\tau_1$ and $\tau_2$ of the radio wave are the same in Equation (58) described above. However, Equation (58) is an example in the case in which transmission and reception processing is simultaneously performed in the devices 1 and 2.

However, because of the provision of the Radio Law in the country, a frequency band in which simultaneous transmission and reception cannot be performed is present. For example, a 920 MHz band is an example of the frequency band. When distance measurement is performed in such a frequency band, transmission and reception has to be performed in time series. In the present embodiment, an example adapted to such time-series transmission and reception is explained.

(Problems in the Time-Series Transmission and Reception)

When it is specified that only one wave can be transmitted and received at the same time between the devices 1 and 2, it is necessary to carry out, in time series, transmission and reception of at least four waves necessary for distance measurement. However, when the time-series transmission and reception is carried out, a phase equivalent to a delay that occurs in time series processes is added to a detected phase. A phase required for propagation cannot be calculated. A reason for this is explained by modifying Equation (58) explained above.

Figure 11A:
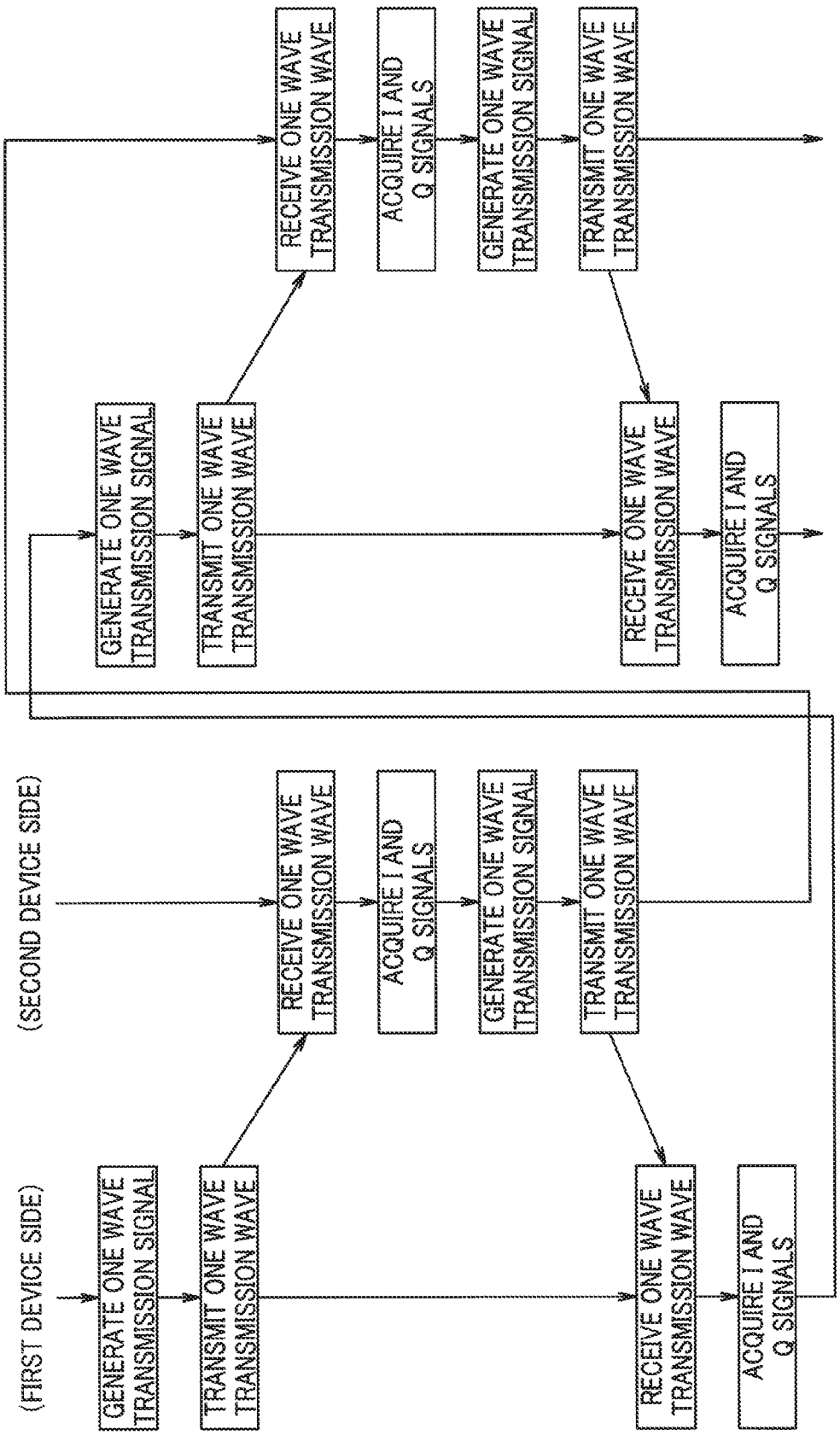
FIG. 11A is a flowchart for explaining the first embodiment.

Note that a broken line portion of FIG. 6 is substantially simultaneously executed. However, when transmission and reception of one wave is performed at a time in time series processes, the broken line portion is as shown in FIG. 11A.

As described above, in the devices 1 and 2 separated from each other by the distance R, a phase (shift amount) at the time when a signal having the angular frequency $\omega_{C1}+\omega_{B1}$ transmitted from the device 1 is detected in the device 2 is represented as $\theta_{H1}$, a phase at the time when a signal having the angular frequency $\omega_{C1}-\omega_{B1}$ transmitted from the device 1 is detected in the device 2 is represented as $\theta_{L1}$, a phase (shift amount) at the time when a signal having the angular frequency $\omega_{C2}+\omega_{B2}$ transmitted from the device 2 is detected in the device 1 is represented as $\theta_{H2}$, and a phase at the time when a signal having the angular frequency $\omega_{C2}-\omega_{B2}$ transmitted from the device 2 is detected in the device 1 is represented as $\theta_{L2}$.

Figure 11B:
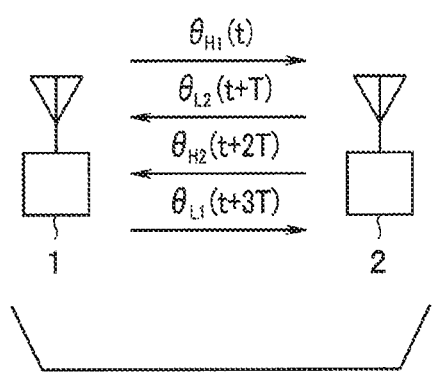
FIG. 11B is an explanatory diagram for explaining the first embodiment.
Figure 11C:
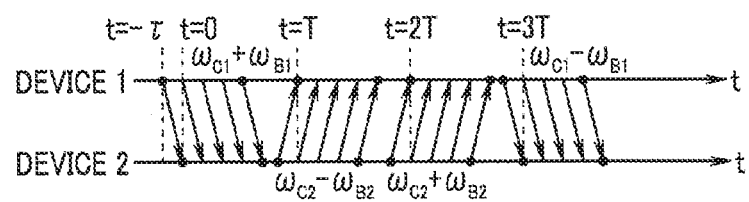
FIG. 11C is an explanatory diagram for explaining the first embodiment.

For example, phase detection order is set as $\theta_{H1}$, $\theta_{L2}$, $\theta_{H2}$, and $\theta_{L1}$. As shown in FIGS. 11B and 11C, respective transmission signals are transmitted and received while being shifted by a time T. In this case, a time period is substituted in (t) of Equations (27), (37), (47), and (57) described above. The following Equation (79) obtained by modifying Equation (58) described above holds:

$$\{\theta_{H1}(t)-\theta_{L1}(t+3T)\}+\{\theta_{H2}(t+2T)-\theta_{L2}(t+T)\}=(\theta_{\tau H1}-\theta_{\tau L1})+(\theta_{\tau H2}-\theta_{\tau L2})+(\omega_{C1}-\omega_{C2})4T \quad (79)$$

A last term of Equation (79) described above is a phase added by the time-series transmission and reception. The added phase is a multiplication result of error angular frequencies of the device 1 and the device 2 with respect to a local angular frequency between the local angular frequencies used in the device 1 and the device 2 and a delay 4T, where the local frequencies are almost the same frequencies as the RF frequencies used in the device 1 and the device 2. When a local frequency is set to 920 [MHz], a frequency error is set to 40 [ppm], and a delay T is set to 0.1 [ms], the added phase is 360°×14.7. It is seen that an error due to the added phase is too large and distance measurement cannot be correctly performed.

Figure 12A:
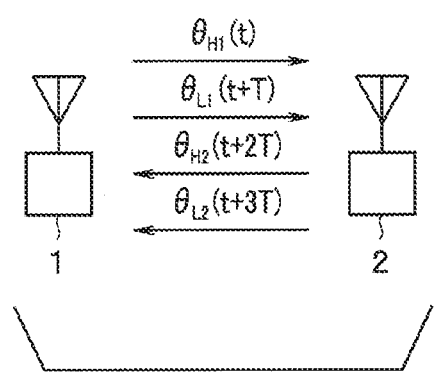
FIG. 12A is an explanatory diagram for explaining the first embodiment.
Figure 12B:
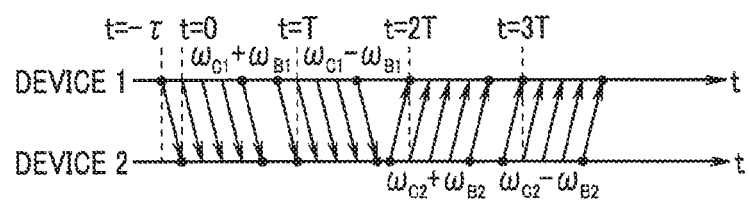
FIG. 12B is an explanatory diagram for explaining the first embodiment.

The phase detection order is set as $\theta_{H1}$, $\theta_{L1}$, $\theta_{H2}$, and $\theta_{L2}$. FIGS. 12A and 12B show an example of this case. In this case, the following Equation (80) is obtained by modifying Equation (58) described above:

$$\{\theta_{H1}(t)-\theta_{L1}(t+T)\}+\{\theta_{H2}(t+2T)-\theta_{L2}(t+3T)\}=(\theta_{\tau H1}-\theta_{\tau L1})+(\theta_{\tau H2}-\theta_{\tau L2})+(\omega_{B1}-\omega_{B2})4T \quad (80)$$

A last term of Equation (80) described above is a phase added by the time-series transmission and reception. The added phase is a multiplication result of error angular frequencies between the local angular frequencies for baseband processing used in the device 1 and the device 2 and a delay 4T, where the local frequencies for baseband processing are almost the same frequencies as the baseband frequencies used in the device 1 and the device 2. When a local frequency for baseband processing is set to 5 MHz, a frequency error is set to 40 [ppm], and the delay T is set to 0.1 [ms], the added phase is 360°×0.08=28.8°. It is seen from precedence that distance measurement can be correctly performed.

However, in this case, it depends on a system whether an error is within an allowable error of system specifications. The present embodiment presents a time-series procedure for reducing a distance error that occurs because of the time-series transmission and reception. Note that the present embodiment indicates a procedure that takes into account the regulation of transmission and reception specified by the Radio Law.

(Example of the Specific Procedure (Eight-Times Repeated Alternating Sequence))

First, an influence due to a transmission delay is considered.

The following Equation (81) is obtained by modifying Equation (58) described above:

$$\{\theta_{H1}(t)+\theta_{H2}(t)\}-\{\theta_{L1}(t)+\theta_{L2}(t)\}=(\theta_{\tau H1}+\theta_{\tau H2})-(\theta_{\tau L1}+\theta_{\tau L2}) \quad (81)$$

In the equation, $$\theta_{H1}(t)+\theta_{H2}(t)=\theta_{\tau H1}+\theta_{\tau H2} \quad (82)$$

$$\theta_{L1}(t)+\theta_{L2}(t)=\theta_{\tau L1}+\theta_{\tau L2} \quad (83)$$

In wireless communication, there is a provision that, when a signal addressed to oneself is received, a reply can be transmitted without carrier sense. According to the provision, after transmission of a signal from the device 1 to the device 2 ends, a reply is immediately transmitted from the device 2 to the device 1. To simplify an analysis, it is assumed that the device 2 transmits a reply to the device 1 after $t_0$ from the transmission by the device 1. The following Equation (84) is obtained from Equations (27) and (37):

$$\theta_{H1}(t)+\theta_{H2}(t+t_0)=\theta_{\tau H1}-\theta_{\tau H2}+\{(\omega_{B1}-\omega_{B2})+(\omega_{C1}-\omega_{C2})\}t_0 \quad (84)$$

A delay $t_0$ is a shortest time period and includes a time period in which a signal having the angular frequency $\omega_{C1}+\omega_{B1}$ is transmitted from the device 1 to the device 2, a transmission and reception timing margin, and a propagation delay. A third term and a fourth term on a right side are phase errors due to the delay $t_0$. The fourth term is particularly a problem because a frequency is high. This is referred to below.

Figure 13:
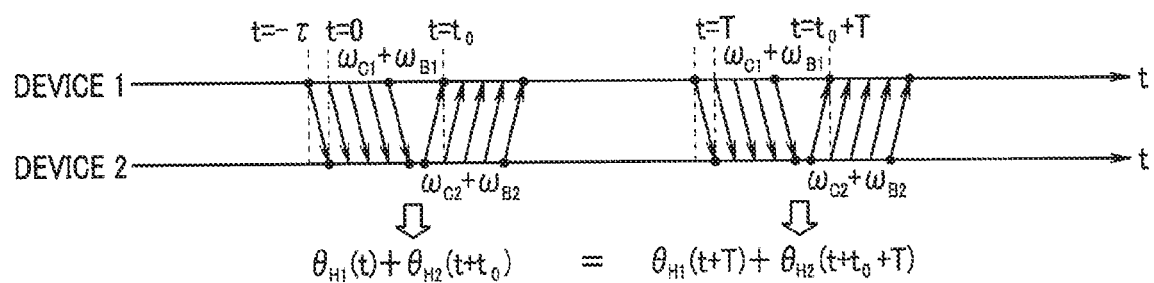
FIG. 13 is an explanatory diagram for explaining the first embodiment.

The delay T is further added to a left side of Equation (84). FIG. 13 shows such a transmission procedure. As shown in FIG. 13, an addition value of a detected phase in this case is the same irrespective of the addition of the delay T. Therefore, the following Equation (85) is obtained:

$$\theta_{H1}(t+T)+\theta_{H2}(t+t_0+T)=\theta_{\tau H1}+\theta_{\tau H2}+\{(\omega_{B1}-\omega_{B2})+(\omega_{C1}-\omega_{C2})\}t_0 \quad (85)$$

A right side of Equation (85) described above and a right side of Equation (84) described above are the same. That is, if a relative time difference is the same (in the example explained above, T), an addition result of a phase in which a signal transmitted from the device 1 is received by the device 2 and a phase in which a signal transmitted from the device 2 is received by the device 1 does not change irrespective of the delay T. That is, the addition result of the phases is a value that does not depend on the delay T.

Transmission and reception of the angular frequency $\omega_{C1}-\omega_{B1}$ signal between the device 1 and the device 2 is explained the same. That is, the following Equations (86) and (87) are obtained from Equations (47) and (57) described above:

$$\theta_{L1}(t)+\theta_{L2}(t+t_0)=\theta_{\tau L1}-\theta_{\tau L2}+\{-(\omega_{B1}\omega_{B2})+(\omega_{C1}-\omega_{C2})\}t_0 \quad (86)$$

$$\theta_{L1}(t+T)+\theta_{L2}(t+t_0+T)=\theta_{\tau L1}+\theta_{\tau L2}+\{-(\omega_{B1}-\omega_{B2})+(\omega_{C1}-\omega_{C2})\}t_0 \quad (87)$$

From the above examination, a sequence is considered in which, after transmission and reception in both directions of the angular frequency $\omega_{C1}+\omega_{B1}$ signal, transmission of reception of the angular frequency $\omega_{C1}-\omega_{B1}$ signal is performed. When a transmission start time of the angular frequency $\omega_{C1}-\omega_{B1}$ signal from the device 1 is represented as T on a basis of a transmission start time of the angular frequency $\omega_{C1}+\omega_{B1}$ signal, the following Equation (88) is obtained from Equations (84) and (87) describe above where, T>$t_0$ is assumed.

$$\theta_{H1}(t)+\theta_{H2}(t+t_0)-\{\theta_{L1}(t+T)+\theta_{L2}(t+t_0+T)\}=\theta_{\tau H1}-\theta_{\tau L1}+\theta_{\tau H2}-\theta_{\tau L2}+2(\omega_{B1}-\omega_{B2})t_0 \quad (88)$$

A last term of a left side of Equation (88) described above is a phase error due to a transmission delay. A delay error due to a received local frequency for high-frequency is cancelled by calculating a difference between the angular frequency $\omega_{C1}+\omega_{B1}$ signal and the angular frequency $\omega_{C1}-\omega_{B1}$ signal. Therefore, the phase error is, in terms of time series, multiplication of a shortest delay time $t_0$ and an error of a local angular frequency (e.g., $2\pi \times 5$ [MHz]) for a baseband processing. If the delay time $t_0$ is set small, the error is small. Therefore, depending on a value of the delay time $t_0$, practically, it is considered possible to perform distance measurement without a problem in accuracy.

A method of removing the last term of Equation (88) described above, which is a distance estimation error factor, is explained.

The following Equation (89) is obtained from Equations (27) and (37) described above:

$$\theta_{H1}(t+t_0)+\theta_{H2}(t)=\theta_{\tau H1}+\theta_{\tau H2}-\{(\omega_{B1}-\omega_{B2})+(\omega_{C1}-\omega_{C2})\}t_0 \quad (89)$$

Even if a predetermined delay D is added to a left side of Equation (89), as explained above, a value of a right side does not change. Therefore, the following Equation (90) is obtained:

$$\theta_{H1}(t+t_0+D)+\theta_{H2}(t+D)=\theta_{\tau H1}+\theta_{\tau H2}-\{(\omega_{B1}-\omega_{B2})+(\omega_{C1}-\omega_{C2})\}t_0 \quad (90)$$

When the Equations (84) and (90) are added up, the following Equation (91) is obtained:

$$\theta_{H1}(t)+\theta_{H2}(t+t_0)=\theta_{H1}(t+t_0+D)+\theta_{H2}(t+D)=2(\theta_{\tau H1}+\theta_{\tau H2}) \quad (91)$$

Figure 14:
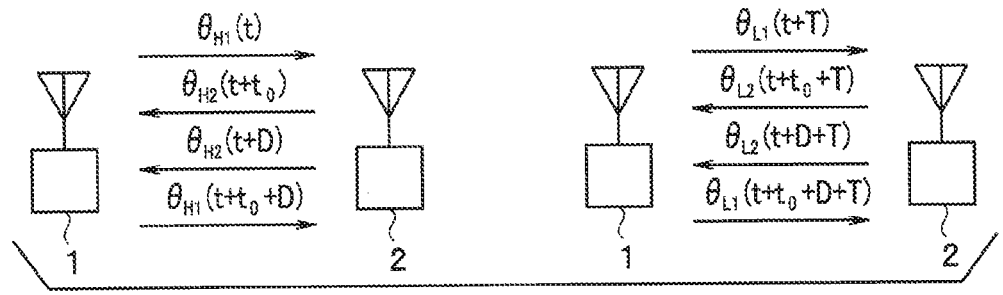
FIG. 14 is an explanatory diagram for explaining the first embodiment.

A left side of FIG. 14 shows a state of Equation (91) described above. When D=$t_0$ in Equation (91), the following Equation (92) is obtained:

$$\theta_{H1}(t)+2\theta_{H2}(t+t_0)=\theta_{H1}(t+2t_0)=2(\theta_{\tau H1}+\theta_{\tau H2}) \quad (92)$$

A right side of Equation (92) described above is only a term of a radio wave propagation delay corresponding to a distance that does not depend on time.

From Equations (47) and (57) described above, the following Equation (93) is obtained:

$$\theta_{L1}(t+t_0)+\theta_{L2}(t)=\theta_{\tau L1}+\theta_{\tau L2}-\{-(\omega_{B1}-\omega_{B2})+(\omega_{C1}-\omega_{C2})\}t_0 \quad (93)$$

Even if the predetermined delay D is added to a left side of Equation (93), a value of a right side does not change. Therefore, the following Equation (94) is obtained:

$$\theta_{L1}(t+t_0+D)+\theta_{L2}(t+D)=\theta_{\tau L1}+\theta_{\tau L2}-\{-(\omega_{B1}-\omega_{B2})+(\omega_{C1}-\omega_{C2})\}t_0 \quad (94)$$

When Equations (86) and (94) described above are added up, the following Equation (95) is obtained:

$$\theta_{L1}(t)+\theta_{L2}(t+t_0)+\theta_{L1}(t+t_0+D)+\theta_{L2}(t+D)=2(\theta_{\tau L1}+\theta_{\tau L2}) \quad (95)$$

In Equation (95), when D=$t_0$, the following Equation (96) is obtained:

$$\theta_{L1}(t)+2\theta_{L2}(t+t_0)+\theta_{L1}(t+2t_0)+\theta_{L1}(t+2t_0)=2(\theta_{\tau L1}+\theta_{\tau L2}) \quad (96)$$

A right side of Equation (96) described above is only a term of a radio wave propagation delay corresponding to a distance that does not depend on time.

Equations (92) and (96) described above mean a sequence for performing phase detection of a transmission signal of the device 1 in the device 2, performing phase detection of a transmission signal of the device 2 in the device 1 after $t_0$, and performing the phase detection of the transmission signal of the device 1 in the device 2 again after 2$t_0$. In the following explanation, the process in which transmission of the transmission signal of the device 1 and phase detection in the device 2 for the transmission signal and transmission of the transmission signal of the device 2 and phase detection in the device 1 for the transmission signal alternate and the phase detections are measured again by shifting time is referred to as "repeated alternation".

That is, the repeated alternation for respectively transmitting and receiving two carrier signals in the devices 1 and 2 and transmitting and receiving the carrier signals again at a t0 interval from the device 1 or 2 to the other device is performed. Consequently, although the order and time of the transmission are limited, it is possible to perform accurate distance measurement that does not depend on time.

Further, depending on a transmission and reception sequence of carrier signals, even if the repeated alternation is not performed at the $t_0$ interval, it is possible to perform accurate distance measurement that does not depend on time.

That is, even if a fixed delay T is added to a left side of Equation (95) described above, a right side is fixed. Therefore, the following Equation (97) is obtained:

$$\theta_{L1}(t+T)+\theta_{L2}(t+t_0+T)+\theta_{L1}(t+2t_0+D+T)+\theta_{L2}(t+D+T)=2(\theta_{\tau L1}+\theta_{\tau L2}) \quad (97)$$

The following Equation (98) is obtained from Equations (91) and (97) described above:

$$\theta_{H1}(t)+\theta_{H2}(t+t_0)+\theta_{H1}(t+t_0+D)+\theta_{H2}(t+D)-\{\theta_{L1}(t+T)+\theta_{L2}(t+t_0+T)+\theta_{L1}(t+t_0+D+T)+\theta_{L2}(t+D+T)\}= 2\{(\theta_{\tau H1}-\theta_{\tau L1})+(\theta_{\tau H2}-\theta_{\tau L2})\}=4\times(\omega_{B1}+\omega_{B2})\tau_1 \quad (98)$$

Equation (98) described above indicates a sequence for, after performing the repeated alternation of reciprocation of the angular frequencies $\omega_{C1}+\omega_{B1}$ signal and $\omega_{C2}+\omega_{B2}$ signal at the time interval D, performing the repeated alternation of reciprocation of the angular frequencies $\omega_{C1}-\omega_{B1}$ signal and $\omega_{C2}-\omega_{B2}$ signal at the time interval D after T from a measurement start. By adopting this sequence, it is possible to remove a distance estimation error factor of the last term of Equation (88) described above and perform accurate distance measurement.

Figure 15:
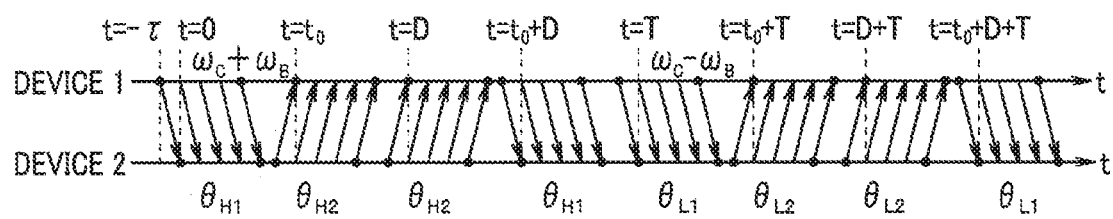
FIG. 15 is an explanatory diagram for explaining an eight-times repeated alternating sequence.

FIGS. 14 and 15 show the sequence. It is possible to extract only a propagation delay component by measuring a phase in such a sequence. That is, the control section 11 of the device 1 transmits a transmission wave having the angular frequency $\omega_{C1}+\omega_{B1}$ (hereinafter referred to as transmission wave H1A) at predetermined timing. Immediately after receiving the transmission wave H1A, the control section 21 of the device 2 transmits a transmission wave having the angular frequency $\omega_{C2}+\omega_{B2}$ (hereinafter referred to as transmission wave H2A). Further, after transmitting the transmission wave H2A, the control section 21 of the device 2 transmits a transmission wave having the angular frequency $\omega_{C2}+\omega_{B2}$ (hereinafter referred to as transmission wave H2B). After receiving the second transmission wave H2B, the control section 11 of the device 1 transmits a transmission wave having the angular frequency $\omega_{C1}+\omega_{B1}$ (hereinafter referred to as transmission wave H1B).

Further, the control section 11 transmits a transmission wave having the angular frequency $\omega_{C1}-\omega_{B1}$ (hereinafter referred to as transmission wave L1A). Immediately after receiving the transmission wave L1A, the control section 21 of the device 2 transmits a transmission wave having the angular frequency $\omega_{C2}-\omega_{B2}$ (hereinafter referred to as transmission wave L2A). Further, after transmitting the transmission wave L2A, the control section 21 of the device 2 transmits a transmission wave having the angular frequency $\omega_{C2}-\omega_{B2}$ (hereinafter referred to as transmission wave L2B). After receiving the second transmission wave L2B, the control section 11 of the device 1 transmits a transmission wave having the angular frequency $\omega_{C1}-\omega_{B1}$ (hereinafter referred to as transmission wave L1B).

In this way, as shown in FIGS. 14 and 15, the control section 21 of the device 2 acquires a phase $\theta_{H1}(t)$ based on the transmission wave H1A in a predetermined time from a predetermined reference time 0, acquires a phase $\theta_{H1}(t+t_0+D)$ based on the transmission wave H1B in a predetermined time from a time $t_0+D$, acquires a phase $\theta_{L1}(t+T)$ based on the transmission wave L1A in a predetermined time from the time T, and acquires a phase $\theta_{L1}(t+t_0+D+T)$ based on the transmission wave L1B in a predetermined time from a time $t_0+D+T$.

The control section 11 of the device 1 acquires a phase $\theta_{H2}(t+t_0)$ based on the transmission wave H2A in a predetermined time from a time $t_0$, acquires a phase $\theta_{H2}(t+D)$ based on the transmission wave H2B in a predetermined time from a time D, acquires a phase $\theta_{L2}(t+t_0+T)$ based on the transmission wave L2A in a predetermined time from a time $t_0+T$, and acquires a phase $\theta_{L2}(t+D+T)$ based on the transmission wave L2B in a predetermined time from a time $D+T$.

At least one of the devices 1 and 2 transmits phase information, that is, calculated four phases or two phase differences or an operation result of Equation (98) described above of the phase differences. The control section of the device 1 or 2, which receives the phase information, calculates a distance according to an operation of Equation (98) described above. Note that, although "calculate a phase difference" is described in steps S7 and S17 in FIG. 6, in this case, it is not always necessary to calculate a phase difference in steps S7 and S17. A phase difference may be calculated during the distance calculation in S19.

In this way, in the examples in FIG. 14 and FIG. 15, by repeatedly alternating the carrier signals from the first device and the second device, even when the carrier signals cannot be simultaneously transmitted and received, it is possible to perform accurate distance measurement. For example, the first device and the second device respectively transmit signals having two angular frequencies twice to the second device and the first device in a predetermined sequence and calculate phase differences respectively in the first and second devices. Any one of the first device and the second device transmits calculated phase information to the other. The device, which receives the phase information, calculates a distance between the first device and the second device on a basis of eight phases calculated by the first device and the second device. Consequently, the distance between the first device and the second device is accurately calculated irrespective of initial phases of the oscillators of the first device and the second device. In this way, even when signals having respective angular frequencies are not simultaneously transmitted and are transmitted and received at timings shifted from each other, it is possible to remove an error of distance estimation and perform accurate distance measurement.

Note that in the examples in FIG. 14 and FIG. 15, transmission and reception are performed four times while alternating transmission and reception directions of a carrier signal between the device 1 and the device 2, and transmission and phase detection are carried out a total of eight times at the devices 1 and 2, and hereinafter, a transmission/reception sequence of FIG. 14 and FIG. 15 is referred to as an "eight-times repeated alternating sequence."

<Transmission Sequence for Shortening Communication Time Period>

As described above, the communication type distance measuring technique adopted in the present embodiment adopts the eight-times repeated alternating sequence, and can thereby totally eliminate influences of time shifts and perform accurate distance measurement. However, in the eight-times repeated alternating sequence, the devices 1 and 2 have to transmit two waves, two times each, that is, the device 1 has to transmit waves four times and the device 2 also has to transmit waves four times, thus requiring a relatively long time for distance measurement.

(Four-Times Repeated Alternating Sequence)

Thus, the present embodiment proposes a method (four-times repeated alternating sequence) for measuring a distance in a shorter time while enabling accurate distance measurement.

Figure 16:
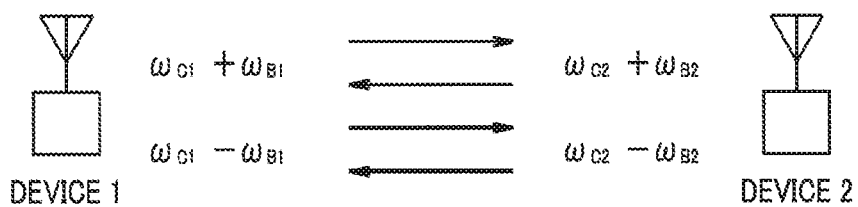
FIG. 16 is an explanatory diagram showing a transmission sequence for shortening a communication time period in the first embodiment.
Figure 17:
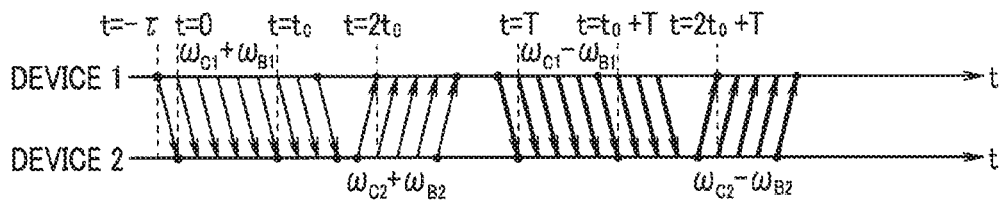
FIG. 17 is an explanatory diagram showing the transmission sequence for shortening a communication time period in the first embodiment.
Figure 18:
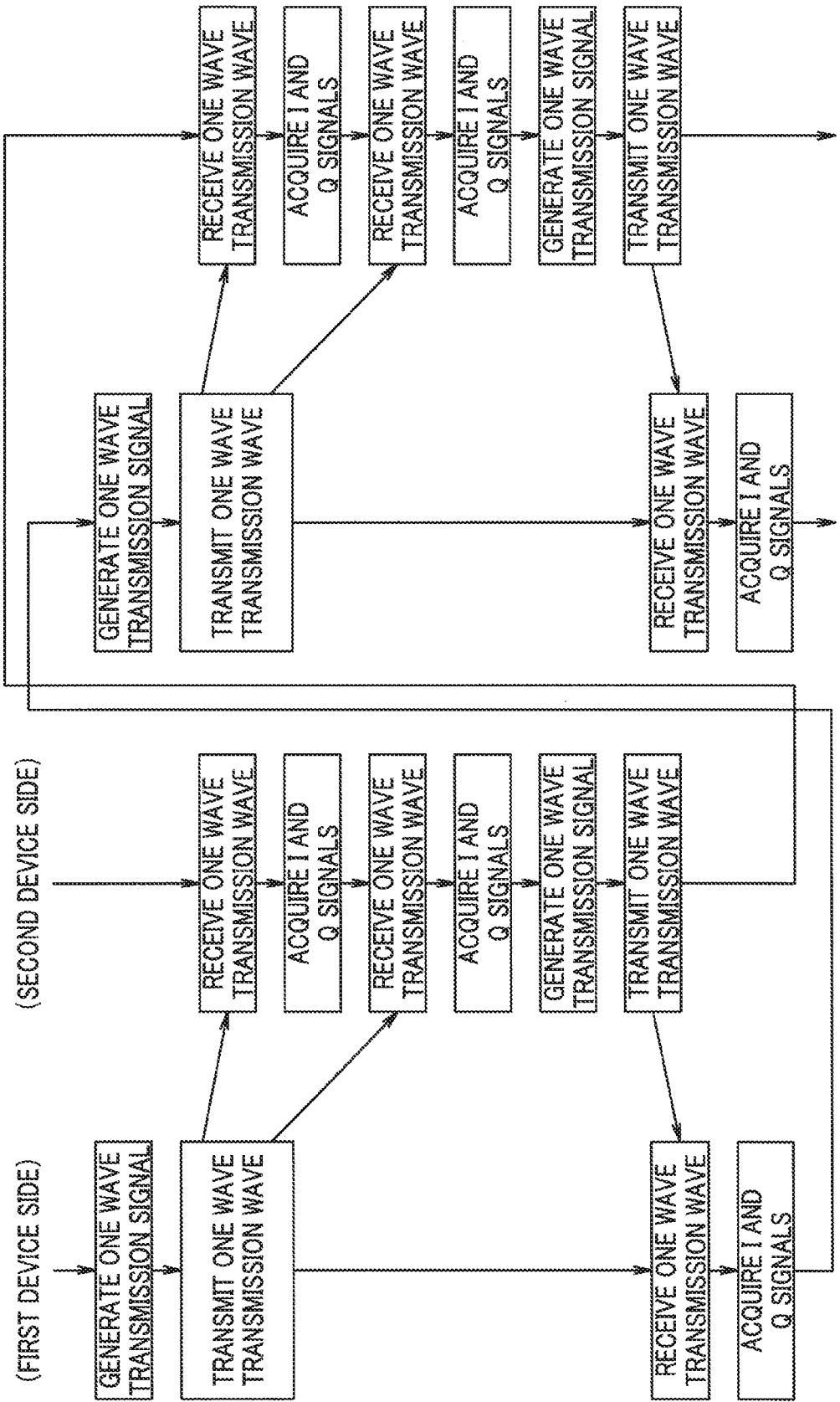
FIG. 18 is a timing chart corresponding to the sequence of FIG. 17.

FIG. 16 and FIG. 17 are explanatory diagrams showing a transmission sequence for shortening a communication time period in the present embodiment. FIG. 18 is a timing chart corresponding to the sequence of FIG. 17.

As shown in FIG. 16, in the transmission sequence, the device 1 transmits transmission wave $\omega_{C1}+\omega_{B1}$, the device 2 transmits transmission wave $\omega_{C2}+\omega_{B2}$, the device 1 generates and transmits $\omega_{C1}-\omega_{B1}$, and the device 2 generates and transmits $\omega_{C2}-\omega_{B2}$. Thus, in the transmission sequences of FIG. 16 and FIG. 17, transmission is carried out four times alternately, and so the sequence is referred to as a four-times repeated alternating sequence.

Even in the case where a four-times repeated alternating sequence is adopted, as in the case of the eight-times repeated alternating sequence, a method for carrying out accurate distance measurement by totally eliminating influences of time shifts is explained.

Equations (84) to (87) described above calculated by taking into account a time sequence transmission can be modified into the following Equations (112) to (115) respectively. That is, Equation (112) is obtained by substituting $t_0$ by $2t_0$ in Equation (84). Moreover, Equation (113) is obtained by substituting T by $t_0$ in Equation (85). Furthermore, as described above, even when a relatively identical delay is added, the addition result of the calculated phases does not change, and therefore Equation (114) is obtained by adding a predetermined delay T to the left side of Equation (86) and substituting $t_0$ by $2t_0$. Similarly, Equation (115) is obtained by substituting T by $T+t_0$ in Equation (87).

$$\theta_{H1}(t)+\theta_{H2}(t+2t_0)=\theta_{\tau H1}+\theta_{\tau H2}+2\{(\omega_{B1}-\omega_{B2})+(\omega_{C1}-\omega_{C2})\}t_0 \quad (112)$$

$$\theta_{H1}(t+t_0)+\theta_{H2}(t+2t_0)=\theta_{\tau H1}+\theta_{\tau H2}+\{(\omega_{B1}-\omega_{B2})+(\omega_{C1}-\omega_{C2})\}t_0 \quad (113)$$

$$\theta_{L1}(t+T)+\theta_{L2}(t+2t_0+T)=\theta_{\tau L1}+\theta_{\tau L2}+2\{-(\omega_{B1}-\omega_{B2})+(\omega_{C1}-\omega_{C2})\}t_0 \quad (114)$$

$$\theta_{L1}(t+t_0+T)+\theta_{L2}(t+2t_0+T)=\theta_{\tau L1}+\theta_{\tau L2}+\{-(\omega_{B1}-\omega_{B2})+(\omega_{C1}-\omega_{C2})\}t_0 \quad (115)$$

Subsequently, calculating 2×Equation (113)−Equation (112)−{2×Equation (115)−Equation (114)} gives the following Equation (116):

$$\theta_{H2}(t+2t_0)+2\theta_{H1}(t+t_0)-\theta_{H1}(t)-\{\theta_{L2}(t+2t_0+T)+2\theta_{L1}(t+t_0+T)-\theta_{L1}(t+T)\}=(\theta_{\tau H1}-\theta_{\tau L1})+(\theta_{\tau H2}-\theta_{\tau L2})=2\times(\omega_{B1}+\omega_{B2})\tau_1 \quad (116)$$

Equation (116) shows that it is possible to calculate a delay time $\tau_1$ by adding up the phase differences obtained in the devices 1 and 2. That is, Equation (116) shows that it is possible to accurately measure distance by removing a distance estimation error factor as in the case of Equation (98) that shows the aforementioned eight-times repeated alternating sequence.

Furthermore, Equation (116) shows that phases are measured a total of 6 times. That is, Equation (116) shows that it is possible to sequentially measure detected phase $\theta_{H1}(t)$ of the device 2 when time $t=0$, detected phase $\theta_{H1}(t+t_0)$ of the device 2 when time $t=t_0$, detected phase $\theta_{H2}(t+2t_0)$ of the device 1 when time $t=2t_0$, detected phase $\theta_{L1}(t+T)$ of the device 2 when time $t=T$, detected phase $\theta_{L1}(t+t_0+T)$ of the device 2 when time $t=t_0+T$ and detected phase $\theta_{L2}(t+2t_0+T)$ of the device 1 when time $t=2t_0+T$.

In this case, phases $\theta_{H1}(t)$ and $\theta_{H1}(t+t_0)$ can be measured by a single transmission sequence and phases $\theta_{L1}(t+T)$ and $\theta_{L1}(t+t_0+T)$ can be measured by a single transmission sequence.

FIG. 17 shows the sequence. Note that when the sequence of FIG. 17 is implemented, the part shown by the broken line in FIG. 6 becomes as shown, for example, in FIG. 18. In order to implement the sequence of FIG. 17, the control section 11 of the device 1 transmits a transmission wave having an angular frequency of $\omega_{C1}+\omega_{B1}$ to the device 2 at timing corresponding to $t=0$ and $t=t_0$. The control section 21 of the device 2 transmits a transmission wave having an angular frequency of $\omega_{C2}+\omega_{B2}$ at timing corresponding to $t=2t_0$ immediately after receiving the transmission wave.

Furthermore, the control section 11 of the device 1 transmits a transmission wave having an angular frequency of $\omega_{C1}-\omega_{B1}$ at timing corresponding to $t=T$ and $t=t_0+T$. The control section 21 of the device 2 transmits a transmission wave having an angular frequency of $\omega_{C2}-\omega_{B2}$ at timing corresponding to $t=2t_0+T$ immediately after receiving the transmission wave.

In this way, as shown in FIG. 17, the control section 21 of the device 2 acquires phase $\theta_{H1}(t)$ and $\theta_{H1}(t+t_0)$ on a basis of the received signal at time $t=0$ and time $t=t_0$ and acquires phases $\theta_{L1}(t+T)$ and $\theta_{L1}(t+t_0+T)$ on a basis of the received signal at time $t=T$ and time $t=t_0+T$.

Furthermore, the control section 11 of the device 1 acquires phase $\theta_{H2}(t+2t_0)$ on a basis of the received signal at time $t=2t_0$ and acquires phase $\theta_{L2}(t+2t_0+T)$ on a basis of the received signal at time $t=2t_0+T$.

One of the device 1 and the device 2 that have measured the phase in the four-times repeated alternating sequence transmits phase information acquired at the own device to the other of the device 1 and the device 2. Of the device 1 and the device 2, the device that has received the phase information calculates the distance through the operation in Equation (116) described above. In this way, it is possible to extract only the propagation delay component and perform accurate distance measurement even when the four-times repeated alternating sequence is adopted.

Figure 19:
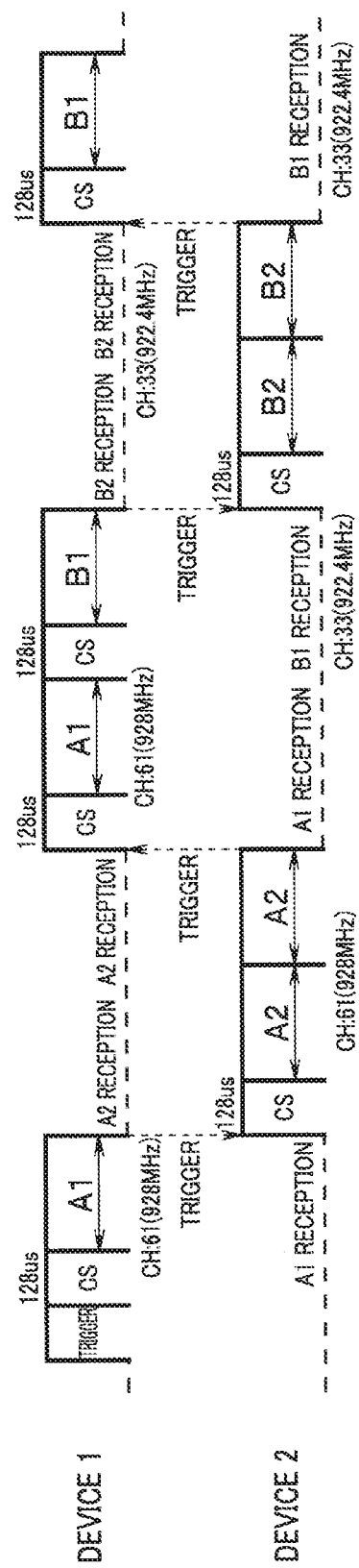
FIG. 19 is an explanatory diagram for explaining an effect of the first embodiment.
Figure 20:
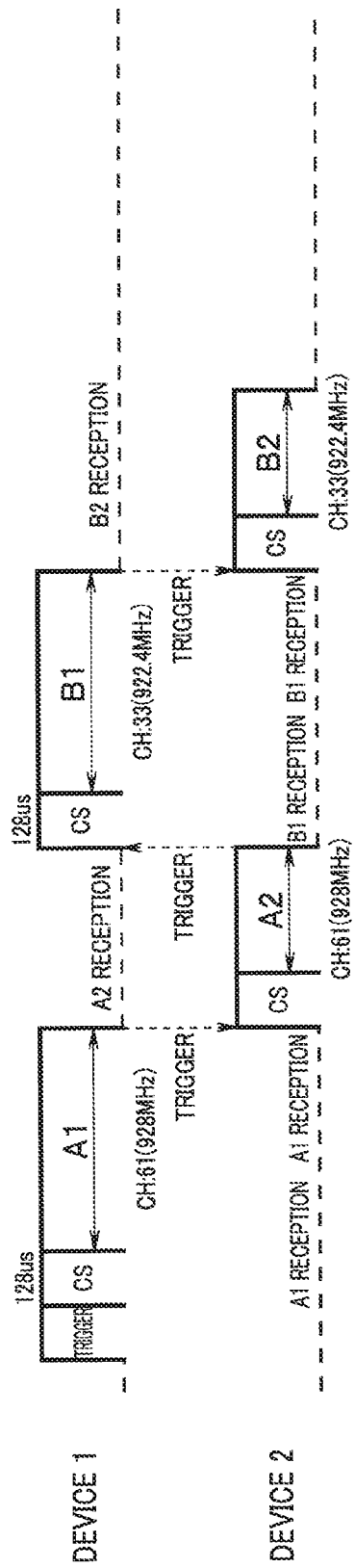
FIG. 20 is an explanatory diagram for explaining an effect of the first embodiment.

FIG. 19 and FIG. 20 are explanatory diagrams for explaining effects of the embodiment. FIG. 19 and FIG. 20 show a transmission sequence from the device 1 and the device 2 necessary for one-time distance measurement by plotting the time in the horizontal direction. FIG. 19 shows a sequence corresponding to the eight-times repeated alternating sequence of FIG. 15 and FIG. 20 shows a sequence corresponding to the four-times repeated alternating sequence of FIG. 17.

Note that FIG. 19 and FIG. 20 take into account the fact that a frequency band (sub-GHz (920 MHz band) in Japan) exists, in which simultaneous transmission/reception is prohibited by the Radio Law. Note that in FIG. 19 and FIG. 20, two transmission waves output from the device 1 are assumed to be transmission waves A1 and B1 and two transmission waves output from the device 2 are assumed to be transmission waves A2 and B2. The examples in FIG. 19 and FIG. 20 show examples where the transmission waves A1 and A2 are transmitted/received through a channel CH61 in a 928 MHz band and the transmission waves B1 and B2 are transmitted/received through a channel CH33 in a 922.4 MHz band.

In FIG. 19 showing the eight-times repeated alternating sequence, the device 1 executes carrier sensing for, for example, 128 µS (sec) and thereafter transmits the transmission wave A1. The device 2 executes carrier sensing for, for example, 128 µS (sec) after receiving the transmission wave A1 and thereafter transmits the transmission wave A2. Furthermore, the device 2 transmits the transmission wave A2 following the transmission of the transmission wave A2 again. The device 1 receives the transmission wave A2 from the device 2, then executes carrier sensing, for, for example, 128 µS (sec) and thereafter transmits the transmission wave A1.

Subsequently, the device 1 executes carrier sensing for, for example, 128 µS (sec) following the transmission of the transmission wave A1 and thereafter transmits the transmission wave B1. After receiving the transmission wave B1, the device 2 executes carrier sensing for, for example, 128 µS (sec) and thereafter transmits the transmission wave B2. Furthermore, the device 2 transmits the transmission wave B2 again following the transmission of the transmission wave B2. After receiving the transmission wave B2 from the device 2, the device 1 executes carrier sensing for, for example, 128 µS (sec) and thereafter transmits the transmission wave B1.

On the other hand, in FIG. 20 showing a four-times repeated alternating sequence, the device 1 executes carrier sensing for, for example, 128 μS (sec) and thereafter transmits transmission wave A1. Note that the device 1 may transmit the transmission wave A1 so that the device 2 can receive the transmission wave A1 twice at timing of t=0 and t=$t_0$. After receiving the transmission wave A1 twice, the device 2 executes carrier sensing for, for example, 128 μS (sec) and thereafter transmits transmission wave A2.

Subsequently, the device 1 receives the transmission wave A2 from the device 2, thereafter executes carrier sensing for, for example, 128 μS (sec) and transmits the transmission wave B1. Note that the device 1 may transmit the transmission wave B1 so that the device 2 can receive the transmission wave B1 twice at timing of time t=T and t=$t_0$+T. After receiving the transmission wave B1 twice, the device 2 executes carrier sensing for, for example, 128 μS (sec) and transmits the transmission wave B2.

As is obvious from a comparison between FIG. 19 and FIG. 20, the time period required for communication in the four-times repeated alternating sequence is 6/8 times the time period required for communication of the eight-times repeated alternating sequence, and can thereby shorten the communication time period. Note that when carrier sensing is executed, the carrier sensing count in the four-times repeated alternating sequence is 4/6 times the carrier sensing count in the eight-times repeated alternating sequence.

Equation (98) described above showing the eight-times repeated alternating sequence holds in a system of residue in which a detected phase operation result is 2π, that is, a case where the detected phase is calculated in a range of 0 to 2π. When the left side of Equation (98) is assumed to be $S_{8A}$ and a certain integer is assumed to be $n_{8A}$, the following Equation (99) holds:

$$S_{8A}+n_{8A}\times 2\pi = 4(\omega_{B1}+\omega_{B2})\tau_1 \quad (99)$$

Equation (99) is modified into Equation (100) below:

$$(\omega_{B1}+\omega_{B2})\tau_1 = (S_{8A}/4)+(n_{8A}\times\pi/2) \quad (100)$$

Equation (100) described above shows that $(\omega_{B1}+\omega_{B2})\tau_1$ has uncertainty of a π/2 cycle. That is, $(\omega_{B1}+\omega_{B2})\tau_1$ is obtained in a system of residue of π/2.

Therefore, since $\tau_1$=(R/c), a maximum measurement distance that can be measured (hereinafter referred to as "maximum measurable distance") in the eight-times repeated alternating sequence is ½ in the case where four waves are simultaneously transmitted and a distance is calculated from Equation (61) described above.

On the other hand, Equation (116) described above showing the four-times repeated alternating sequence also holds in a system of residue, the detected phase operation result of which is 2π, that is, a case where the phase is calculated in a range of 0 to 2π. When the left side of Equation (116) is assumed to be $S_{4A}$ and a certain integer is assumed to be $n_{4A}$, the following Equation (117) holds:

$$(\omega_{B1}+\omega_{B2})\tau_1 = (S_{4A}/2)+(n_{4A}\times\pi) \quad (117)$$

Equation (117) described above shows that $(\omega_{B1}+\omega_{B2})\tau_1$ has uncertainty at a period of π. That is, $(\omega_{B1}+\omega_{B2})\tau_1$ is calculated as a system of residue of π.

Consequently, a maximum distance that can be measured (hereinafter referred to as "maximum measurable distance") in the four-times repeated alternating sequence is two times the maximum measurable distance of the eight-times repeated alternating sequence and it is clear that the same maximum measurable distance as the maximum measurable distance in the case where the distance is calculated by Equation (61) described above.

A measurement result of a distance equal to or larger than the maximum measurable distance is similar to a measurement result of a short distance and it is hard to make distinction between the distances, and so the four-times repeated alternating sequence having a larger maximum measurable distance is advantageous over the eight-times repeated alternating sequence. Furthermore, the smaller the $(\omega_{B1}+\omega_{B2})$, the greater the maximum measurable distance becomes, but even when the value doubles in the four-times repeated alternating sequence, a maximum measurable distance equal to the maximum measurable distance of the eight-times repeated alternating sequence can be obtained. That is, the four-times repeated alternating sequence has an advantage that the number of combinations of available frequencies (channels) can be increased and measurement with a free channel can be made easier when it is only required to achieve the same maximum measurable distance as the maximum measurable distance of the eight-times repeated alternating sequence.

In this way, the present embodiment can achieve accurate distance measurement by causing carrier signals from the first device and the second device to be repeatedly alternated. In this case, use of the four-times repeated alternating sequence can shorten a communication time period necessary for distance measurement compared to the eight-times repeated alternating sequence. Moreover, compared to the eight-times repeated alternating sequence, the four-times repeated alternating sequence can increase twofold the maximum measurable distance and increase a degree of freedom of the operating frequency.

Second Embodiment

Figure 21:
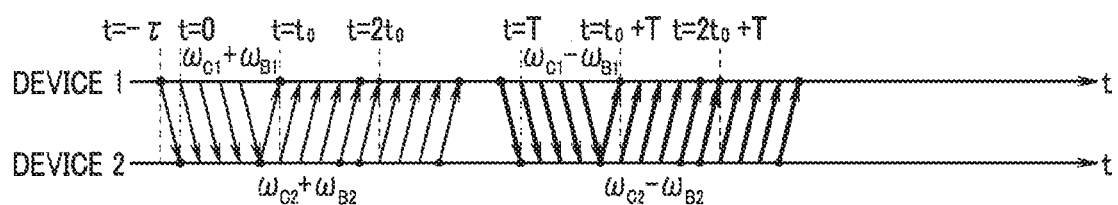
FIG. 21 is an explanatory diagram for explaining a second embodiment of the present invention.
Figure 22:
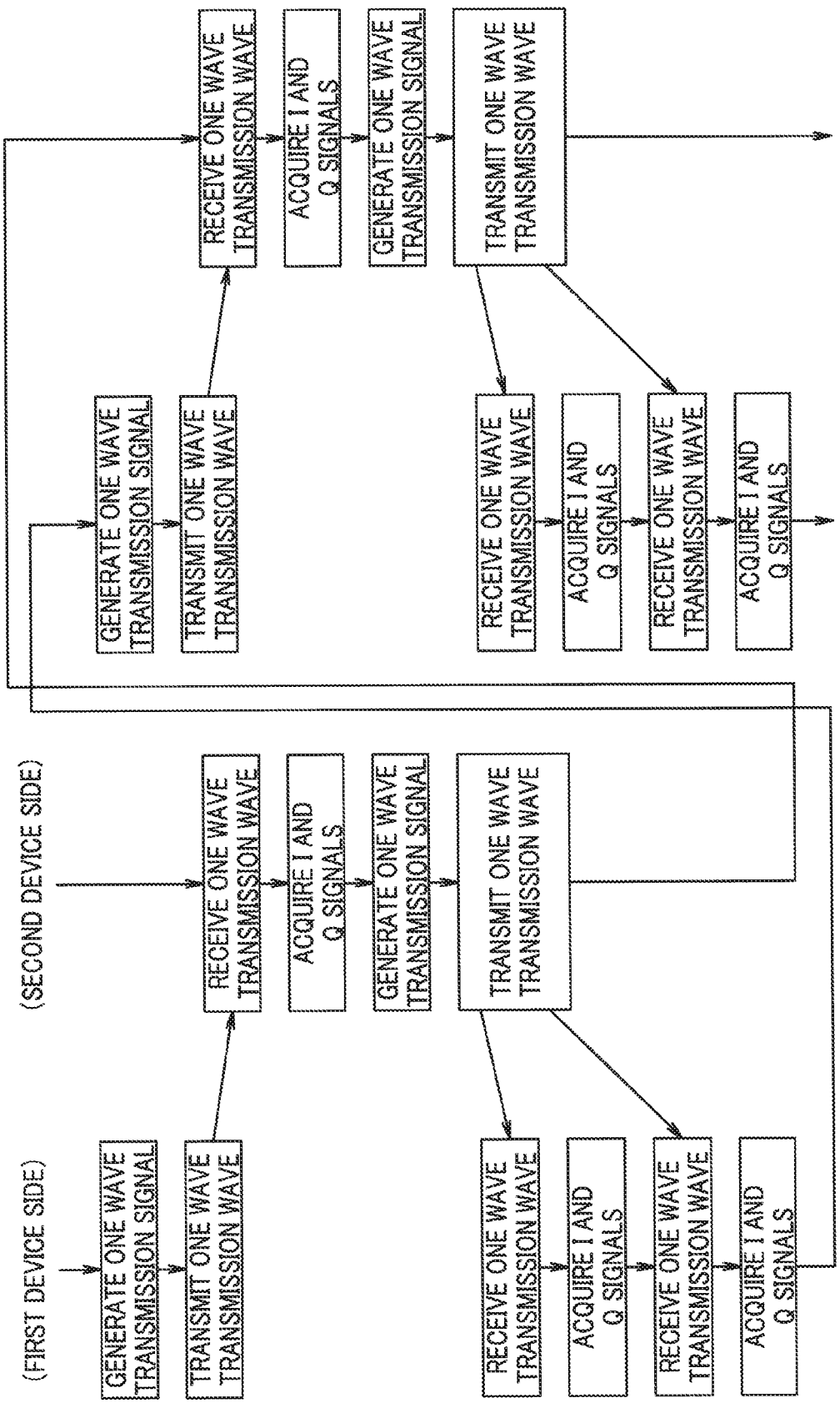
FIG. 22 is a timing chart corresponding to a sequence of FIG. 21.

FIG. 21 is an explanatory diagram for explaining a second embodiment of the present invention. FIG. 21 shows a transmission sequence for shortening a communication time period. FIG. 22 is a timing chart corresponding to the sequence of FIG. 21. A hardware configuration in the present embodiment is similar to the hardware configuration of the first embodiment. The present embodiment is different from the first embodiment only in that a four-times repeated alternating sequence has different transmission order compared to the four-times repeated alternating sequence of the first embodiment.

As shown in FIG. 16, the device 1 generates and transmits two transmission waves $\omega_{C1}+\omega_{B1}$ and $\omega_{C1}-\omega_{B1}$ and the device 2 generates and transmits two transmission waves $\omega_{C2}+\omega_{B2}$ and $\omega_{C2}-\omega_{B2}$ in the transmission sequence of the present embodiment as well.

In the four-times repeated alternating sequence of the first embodiment, a transmission time period of the device 1 is approximately twice the transmission time period of the device 2. Similarly, distance measurement can also be performed by making the transmission time period of the device 2 approximately twice the transmission time period of the device 1. The present embodiment shows an example in this case.

Equation (84) to Equation (87) described above obtained by taking into account time sequence transmission can be modified into the following Equations (118) to (121) respectively. That is, Equation (118) is the same equation as Equation (84).

Equation (119) is obtained by setting T to T=0 in Equation (85) and substituting $t_0$ by $2t_0$. Furthermore, Equation (120) is obtained by adding a predetermined delay T to the left side of Equation (86). Similarly, Equation (121) is obtained by substituting $t_0$ by $2t_0$ in Equation (87).

$$\theta_{H1}(t)+\theta_{H2}(t+t_0)=\theta_{\tau H1}+\theta_{\tau H2}+\{(\omega_{B1}-\omega_{B2})+ (\omega_{C1}-\omega_{C2})\}t_0 \qquad (118)$$

$$\theta_{H1}(t)+\theta_{H2}(t+2t_0)=\theta_{\tau H1}+\theta_{\tau H2}+2\{(\omega_{B1}-\omega_{B2})+(\omega_{C1}-\omega_{C2})\}t_0 \qquad (119)$$

$$\theta_{L1}(t+T)+\theta_{L2}(t+t_0+T)=\theta_{\tau L1}+\theta_{\tau L2}+\{-(\omega_{B1}-\omega_{B2})+ (\omega_{C1}-\omega_{C2})\}t_0 \qquad (120)$$

$$\theta_{L1}(t+T)+\theta_{L2}(t+2t_0+T)=\theta_{\tau L1}+\theta_{\tau L2}+2\{-(\omega_{B1}-\omega_{B2})+ (\omega_{C1}-\omega_{C2})\}t_0 \qquad (121)$$

Next, calculating 2×Equation (118)−Equation (119)−{2× Equation (120)−Equation (121)} gives the following Equation (122):

$$\theta_{H1}(t)+2\theta_{H2}(t+t_0)-\theta_{H2}(t+2t_0)-\{\theta_{L1}(t+T)+2\theta_{L2}(t+t_0+T)-\theta_{L2}(t+2t_0+T)\}=(\theta_{\tau H1}-\theta_{\tau L1})+(\theta_{\tau H2}-\theta_{\tau L2})=2\times (\omega_{B1}+\omega_{B2})\tau_1 \qquad (122)$$

From Equation (122), $\tau_1$ can be obtained. That is, Equation (122) shows that accurate distance measurement can be achieved by removing distance estimation error factors as in the case of the four-times repeated alternating sequence in the first embodiment.

Furthermore, Equation (122) shows that phase measurement is performed a total of 6 times. That is, Equation (122) shows that it is possible to sequentially measure detected phase $\theta_{H1}(t)$ of the device 2 when time t=0, detected phase $\theta_{H2}(t+t_0)$ of the device 1 when time $t=t_0$, detected phase $\theta_{H2}(t+2t_0)$ of the device 1 when time $t=2t_0$, detected phase $\theta_{L1}(t+T)$ of the device 2 when time t=T, detected phase $\theta_{L2}(t+t_0+T)$ of the device 1 when time $t=t_0+T$, and detected phase $\theta_{L2}(t+2t_0+T)$ of the device 1 when time $t=2t_0+T$.

In this case, phases $\theta_{H2}(t+t_0)$ and $\theta_{H2}(t+2t_0)$ can be measured by a single transmission sequence, and phases $\theta_{L2}(t+t_0+T)$ and $\theta_{L2}(t+2t_0+T)$ can be measured by a single transmission sequence.

FIG. 21 shows the sequence. Note that when implementing the sequence of FIG. 21, the part shown by the broken line in FIG. 6 is as shown, for example, in FIG. 22. In order to implement the sequence of FIG. 21, the control section 11 of the device 1 transmits a transmission wave having an angular frequency of $\omega_{C1}+\omega_{B1}$ to the device 2 at timing corresponding to t=0. The control section 21 of the device 2 transmits a transmission wave having an angular frequency of $\omega_{C2}+\omega_{B2}$ at timing corresponding to $t=t_0$ and $t=2t_0$ immediately after receiving the transmission wave.

Furthermore, the control section 11 of the device 1 transmits a transmission wave having an angular frequency of $\omega_{C1}-\omega_{B1}$ at timing corresponding to t=T. The control section 21 of the device 2 transmits a transmission wave having an angular frequency of $\omega_{C2}-\omega_{B2}$ at timing corresponding to $t=t_0+T$ and $t=2t_0+T$ immediately after receiving the transmission wave.

Thus, as shown in FIG. 21, the control section 21 of the device 2 acquires phase $\theta_{H1}(t)$ on a basis of the received signal at time t=0 and acquires phase $\theta_{L1}(t+T)$ on a basis of the received signal at time t=T.

Furthermore, the control section 11 of the device 1 acquires phases $\theta_{H2}(t+t_0)$ and $\theta_{H2}(t+2t_0)$ on a basis of the received signals at time $t=t_0$ and $t=2t_0$, and acquires phases $\theta_{L2}(t+t_0+T)$ and $\theta_{L2}(t+2t_0+T)$ on a basis of the received signals at time $t=t_0+T$ and $t=2t_0+T$.

One of the device 1 and the device 2 that have measured phases in the four-times repeated alternating sequence shown in FIG. 21 transmits phase information acquired by the own device to the other of the device 1 and the device 2. Of the device 1 and the device 2, the device that has received the phase information calculates a distance through the operation in Equation (122) described above. In this way, even when the four-times repeated alternating sequence of FIG. 21 is adopted, it is possible to extract only a propagation delay component and perform accurate distance measurement.

A communication sequence when distance measurement is performed by adopting the present embodiment corresponds to the length of an A1 period in FIG. 20 and the length of an A2 period switched around and the length of a B1 period and the length of a B2 period switched around. Therefore, it is possible to shorten a communication time period necessary for distance measurement in the present embodiment as well.

Furthermore, the maximum measurable distance in the four-times repeated alternating sequence according to the present embodiment is twice the maximum measurable distance in the eight-times repeated alternating sequence and it is obvious that the same maximum measurable distance as the maximum measurable distance in the case where the distance is calculated by Equation (61) described above.

In this way, the present embodiment can obtain effects similar to the effects in the first embodiment.

Note that wireless transmitting/receiving devices generally have greater transmission power consumption than reception power consumption. Therefore, according to the first embodiment, the device 1 has greater power consumption necessary for communication for distance measurement than the device 2, whereas according to the second embodiment, the device 2 has greater power consumption necessary for communication for distance measurement than the device 1. Therefore, it is possible to determine which of the first embodiment or the second embodiment should be adopted depending on which of the two devices 1 and 2 is the device, power consumption of which should be reduced. For example, when the device 1 is a fixed device and the device 2 is a battery-driven portable device or the like, the first embodiment in which power consumption of the device 2 is smaller is preferably adopted.

Third Embodiment

Figure 23:
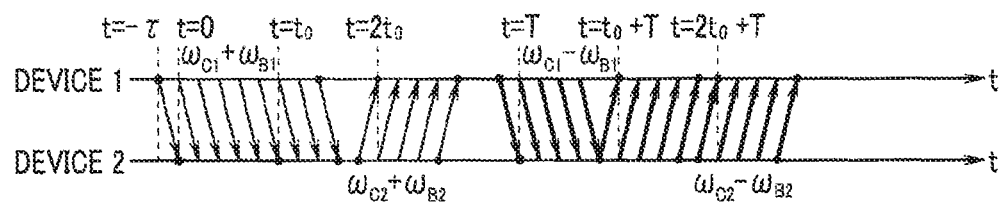
FIG. 23 is an explanatory diagram for explaining a third embodiment of the present invention.
Figure 24:
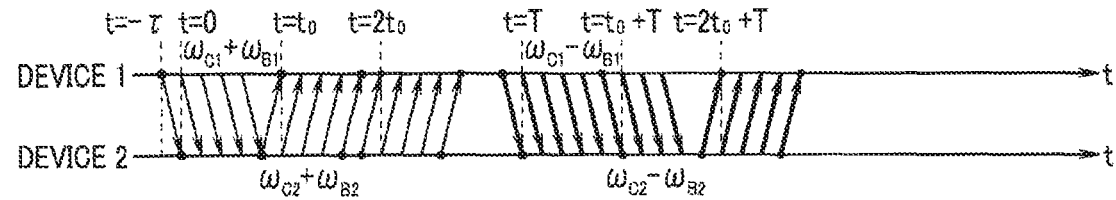
FIG. 24 is an explanatory diagram for explaining the third embodiment of the present invention.

FIG. 23 and FIG. 24 are explanatory diagrams for explaining a third embodiment of the present invention. FIG. 23 and FIG. 24 show a transmission sequence for shortening a communication time period. A hardware configuration in the present embodiment is similar to the hardware configuration of the first embodiment. The present embodiment is different from the first and second embodiments only in that a four-times repeated alternating sequence having different transmission order compared to the four-times repeated alternating sequence according to the first and second embodiments.

In the transmission sequence according to the present embodiment, as shown in FIG. 16, the device 1 generates and transmits two transmission waves $\omega_{C1}+\omega_{B1}$ and $\omega_{C1}-\omega_{B1}$, whereas the device 2 generates and transmits two transmission waves $\omega_{C2}+\omega_{B2}$ and $\omega_{C2}-\omega_{B2}$.

The value of 2×Equation (113)−Equation (112) obtained to obtain Equation (116) of the first embodiment and the value of 2×Equation (118)−Equation (119) obtained to obtain Equation (122) of the second embodiment have the same value ($\theta\tau_{H1}+\theta\tau_{H2}$).

Similarly, the value of 2×Equation (115)−Equation (114) obtained to obtain Equation (116) of the first embodiment and the value of 2×Equation (120)−Equation (121) obtained to obtain Equation (122) of the second embodiment have the same value ($\theta\tau_{L1}+\theta\tau_{L2}$).

Therefore, it is possible to obtain results similar to the results in Equation (116) and Equation (122) even by switching round {2×Equation (113)−Equation (112)} and {2×Equation (118)−Equation (119)} and using following Equation (116a) obtained using Equation (118), Equation (119), Equation (114) and Equation (115):

$$\theta_{H1}(t)+2\theta_{H2}(t+t_0)-\theta_{H2}(t+2t_0)-\{\theta_{L2}(t+2t_0+T)+2\theta_{L1}(t+t_0+T)-\theta_{L1}(t+T)\}=(\theta_{\tau H1}-\theta_{\tau L1})+(\theta_{\tau H2}-\theta_{\tau L2})=2\times(\omega_{B1}+\omega_{B2})\tau_1 \quad (116a)$$

Similarly, it is also possible to obtain results similar to the results in Equation (116) and Equation (122) also by switching round {2×Equation (115)−Equation (114)} and {2×Equation (120)−Equation (121)} and using the following Equation (116b) obtained using Equation (112), Equation (113), Equation (120) and Equation (121):

$$\theta_{H2}(t+2t_0)+2\theta_{H1}(t+t_0)-\theta_{H1}(t)-\{\theta_{L1}(t+T)+2\theta_{L2}(t+t_0+T)-\theta_{L2}(t+2t_0+T)\}=(\theta_{\tau H1}-\theta_{\tau L1})+(\theta_{\tau H2}-\theta_{\tau L2})=2\times(\omega_{B1}+\omega_{B2})\tau_1 \quad (116b)$$

FIG. 23 shows a four-times repeated alternating sequence when Equation (116b) is used. FIG. 24 shows a four-times repeated alternating sequence when Equation (116a) is used.

In the example in FIG. 23, the control section 11 of the device 1 transmits a transmission wave having an angular frequency of $\omega_{C1}+\omega_{B1}$ to the device 2 at timing corresponding to t=0 and t=$t_0$. The control section 21 of the device 2 transmits a transmission wave having an angular frequency of $\omega_{C2}+\omega_{B2}$ at timing corresponding to t=$2t_0$ immediately after receiving the transmission wave.

Furthermore, the control section 11 of the device 1 transmits a transmission wave having an angular frequency of $\omega_{C1}-\omega_{B1}$ at timing corresponding to t=T. The control section 21 of the device 2 transmits a transmission wave having an angular frequency of $\omega_{C2}-\omega_{B2}$ at timing corresponding to t=$t_0$+T and t=$2t_0$+T immediately after receiving the transmission wave.

In this way, as shown in FIG. 23, the control section 21 of the device 2 acquires phases $\theta_{H1}$(t) and $\theta_{H1}$(t+$t_0$) on a basis of the received signals at times t=0 and t=$t_0$ and acquires phase $\theta_{L1}$(t+T) on a basis of the received signal at time t=T.

Furthermore, the control section 11 of the device 1 acquires phase $\theta_{H2}$(t+$2t_0$) on a basis of the received signal at time t=$2t_0$ and acquires phases $\theta_{L2}$(t+$t_0$+T) and $\theta_{L2}$(t+$2t_0$+T) on a basis of the received signals at time t=$t_0$+T and t=$2t_0$+T.

It is possible to calculate a distance using Equation (116b) on a basis of these phases obtained at the devices 1 and 2.

In the example in FIG. 24, the control section 11 of the device 1 transmits a transmission wave having an angular frequency of $\omega_{C1}+\omega_{B1}$ to the device 2 at timing corresponding to t=0. The control section 21 of the device 2 transmits a transmission wave having an angular frequency of $\omega_{C2}+\omega_{H2}$ at timing corresponding to t=$t_0$ and t=$2t_0$ immediately after receiving the transmission wave.

Furthermore, the control section 11 of the device 1 transmits a transmission wave having an angular frequency of $\omega_{C1}-\omega_{B1}$ at timing corresponding to t=T and t=$t_0$+T. The control section 21 of the device 2 transmits a transmission wave having an angular frequency of $\omega_{C2}-\omega_{B2}$ at timing corresponding to t=$2t_0$+T immediately after receiving the transmission wave.

In this way, as shown in FIG. 24, the control section 21 of the device 2 acquires phase $\theta_{H1}$ (t) on a basis of the received signal at time t=0 and acquires phase $\theta_{L1}$ (t+T) and $\theta_{L1}$ (t+$t_0$+T) on a basis of the received signals at time t=T and t=$t_0$+T.

Furthermore, the control section 11 of the device 1 acquires phases $\theta_{H2}$(t+$t_0$) and $\theta_{H2}$(t+$2t_0$) on a basis of the received signals at time t=$t_0$ and t=$2t_0$ and acquires phase $\theta_{L2}$(t+$2t_0$+T) on a basis of the received signal at time t=$2t_0$+T.

It is possible to calculate a distance using Equation (116a) on a basis of the phases obtained at the devices 1 and 2.

Other components and operations are similar to the components and operations of the first and second embodiments.

Thus, the present embodiment can also obtain effects similar to the effects in the first and second embodiments.

(Fourth Embodiment) (Six-Times Repeated Alternating Sequence)

Figure 25:
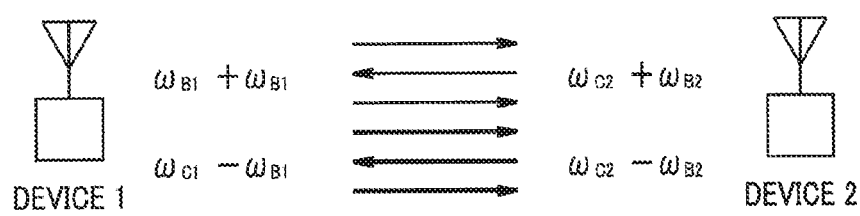
FIG. 25 is an explanatory diagram for explaining a fourth embodiment of the present invention.
Figure 26:
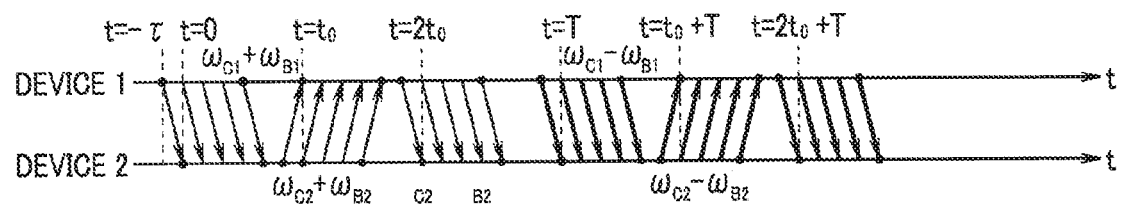
FIG. 26 is an explanatory diagram for explaining the fourth embodiment of the present invention.

FIG. 25 and FIG. 26 are explanatory diagrams for explaining a fourth embodiment of the present invention. FIG. 25 and FIG. 26 show a transmission sequence for shortening a communication time period. A hardware configuration in the present embodiment is similar to the hardware configuration in the first embodiment. The present embodiment is different from the first to third embodiments in that a six-times repeated alternating sequence is adopted in which distance measurement is possible in a communication time period substantially similar to the communication time period in the four-times repeated alternating sequence.

As shown in FIG. 25, in the transmission sequence, the device 1 generates and transmits a transmission wave $\omega_{C1}$+$\omega_{B1}$ and the device 2 generates and transmits a transmission wave $\omega_{C2}$+$\omega_{B2}$ and the device 1 generates and transmits the transmission wave $\omega_{C1}$+$\omega_{B1}$ again. Subsequently, the device 1 generates and transmits $\omega_{C1}$−$\omega_{B1}$, the device 2 generates and transmits $\omega_{C2}$−$\omega_{B2}$ and the device 1 generates and transmits the transmission wave $\omega_{C1}$−$\omega_{B1}$ again. In this way, in the transmission sequences in FIG. 25 and FIG. 26, transmission is performed six times alternately, and so the transmission sequence is assumed to be referred to as a "six-times repeated alternating sequence."

In Equation (98) showing the transmission sequence of FIG. 15, the device 2 performs transmission to the device 1 a total of four times, but the transmission waves at time t=$t_0$ and t=D are identical signals with only the difference in a phase measurement time in the device 1. Similarly, the transmission waves from the device 2 at times t=$t_0$+T and t=D+T are identical signals with only the difference in a phase measurement time in the device 1. Thus, in the present embodiment, the transmission waves are collectively transmitted one time to thereby shorten the transmission time period. That is, when D=$t_0$ is assumed in Equation (98), the following Equation (98') is derived:

$$\theta_{H1}(t)+2\theta_{H2}(t+t_0)+\theta_{H1}(t+2t_0)-\{\theta_{L1}(t+T)+2\theta_{L2}(t+t_0+T)+\theta_{L1}(t+2t_0+T)\}=2\{(2\theta_{\tau H1}-\theta_{\tau L1})+(\theta_{\tau H2}-\theta_{\tau L2})\}=4\times(\omega_{B1}+\omega_{B2})\tau_1 \quad (98')$$

Equation (98') shows that in the six-times repeated alternating sequence, it is also possible to accurately measure a delay time $\tau_1$, that is, the distance between the devices 1 and 2 by adding up the phase differences obtained in the devices 1 and 2 as in the case of Equation (98) showing the aforementioned eight-times repeated alternating sequence.

FIG. 26 shows the sequence. In order to implement the sequence of FIG. 26, the control section 11 of the device 1 transmits a transmission wave having an angular frequency of $\omega_{C1}$+$\omega_{B1}$ to the device 2 at timing corresponding to t=0. The control section 21 of the device 2 transmits a transmission wave having an angular frequency of $\omega_{C2}$+$\omega_{B2}$ at timing corresponding to $t=t_0$ immediately after receiving the transmission wave. The control section 11 of the device 1 retransmits the transmission wave having an angular frequency of $\omega_{C1}+\omega_{B1}$ at timing corresponding to $t=2t_0$ immediately after receiving the transmission wave.

Furthermore, the control section 11 of the device 1 transmits a transmission wave having an angular frequency of $\omega_{C1}-\omega_{B1}$ at timing corresponding to $t=T$. The control section 21 of the device 2 transmits a transmission wave having an angular frequency of $\omega_{C2}-\omega_{B2}$ at timing corresponding to $t=t_0+T$ immediately after receiving the transmission wave. The control section 11 of the device 1 transmits the transmission wave having an angular frequency of $\omega_{C1}-\omega_{B1}$ again at timing corresponding to $t=2t_0+T$ immediately after receiving the transmission wave.

As shown in FIG. 26, the control section 21 of the device 2 thus acquires phases $\theta_{H1}(t)$ and $\theta_{H1}(t+2t_0)$ on a basis of the received signals at times $t=0$ and $t=2t_0$ and acquires phases $\theta_{L1}(t+T)$ and $\theta_{L1}(t+2t_0+T)$ on a basis of the received signals at times $t=T$ and $t=2t_0+T$.

Furthermore, the control section 11 of the device 1 acquires phase $\theta_{H2}(t+t_0)$ on a basis of the received signal at time $t=t_0$ and acquires phase $\theta_{L2}(t+t_0+T)$ on a basis of the received signal at time $t=t_0+T$.

One of the device 1 and the device 2 that have measured phases in the six-times repeated alternating sequence transmits phase information acquired at the own device to the other of the device 1 and the device 2. Of the device 1 and the device 2, the device that has received the phase information calculates the distance through the operation in Equation (98') described above. In this way, when the six-times repeated alternating sequence is adopted, it is also possible to extract only the propagation delay component and perform accurate distance measurement.

Note that the communication time period necessary for distance measurement in the six-times repeated alternating sequence is substantially the same as the communication time period necessary for distance measurement in the four-times repeated alternating sequence.

(Doubling of Maximum Measurable Distance)

In Equation (98') showing the six-times repeated alternating sequence, equations similar to Equations (99) and (100) described above hold and a detectable maximum measurable distance becomes ½ of the detectable maximum measurable distance of the four-times repeated alternating sequence. However, it is possible to extend the maximum measurable distance to the same distance as the distance of the four-times repeated alternating sequence through a modification of the equation. Hereinafter, the method is described.

Calculating a difference between Equation (84) described above showing a case where after receiving a transmission wave from the device 1, the device 2 transmits the transmission wave to the device 1 and Equation (90) described above used for removing a distance estimation error factor gives the following Equation (101):

$$\theta_{H1}(t)+\theta_{H2}(t+t_0)-\theta_{H1}(t+t_0+D)-\theta_{H2}(t+D)+2\{(\omega_{B1}-\omega_{B2})+(\omega_{C1}-\omega_{C2})\}t_0 \quad (101)$$

Similarly, calculating Equation (86)–Equation (94) gives the following Equation (102):

$$\theta_{L1}(t)+\theta_{L2}(t+t_0)-\theta_{L1}(t+t_0+D)-\theta_{L2}(t+D)+2\{-(\omega_{B1}-\omega_{B2})+(\omega_{C1}-\omega_{C2})\}t_0 \quad (102)$$

Even when a fixed delay T is added to t on the left side of Equation (102), the right side remains constant, and so Equation (103) is obtained.

$$\theta_{L1}(t+T)+\theta_{L2}(t+t_0+T)-\theta_{L1}(t+t_0+D+T)-\theta_{L2}(t+D+T)=2\{-(\omega_{B1}-\omega_{B2})+(\omega_{C1}-\omega_{C2})\}t_0 \quad (103)$$

Calculating Equation (101)–Equation (103) gives the following Equation (104):

$$\theta_{H1}(t)+\theta_{H2}(t+t_0)-\theta_{H1}(t+t_0+D)-\theta_{H2}(t+D)--\theta_{L1}(t+T)-\theta_{L2}(t+t_0+T)+\theta_{L1}(t+t_0+D+T)+\theta_{L2}(t+D+T)=4(\omega_{B1}-\omega_{B2})t_0 \quad (104)$$

Assuming $D=t_0$ in Equation (104) gives the following Equation (110):

$$\theta_{H1}(t)-\theta_{H1}(t+2t_0)-\theta_{L1}(t+T)+\theta_{L1}(t+2t_0+T)=4(\omega_{B1}-\omega_{B2})t_0 \quad (110)$$

The result of Equation (110) is obtained in a system of residue of $2\pi$. Substituting the left side of Equation (110) by $S_4$ gives the following Equation (105) using an integer $n_4$:

$$(\omega_{B1}-\omega_{B2})t_0=(S_4/4)+(n_4\pi/1) \quad (103)$$

$(\omega_{B1}-\omega_{B2})t_0$ in Equation (105) has uncertainty at a period of $\pi/2$.

As design values of the device, if a local frequency for baseband is set to 5 [MHz], a frequency error between transmission and reception is set to maximum ±40 [ppm], and a delay $t_0$ is set to 0.1 [ms], $360°\times(5\times10^6\times\pm40 [\text{ppm}])=\pm7.2°$ is satisfied. That is, it is obvious that the left side of Equation (105) described above falls within a range of $\pi/4$ to $\pi/4$ [rad]=45 to 45° and it is thereby possible to exclude uncertainty. Therefore, the following Equation (111) is obtained using $S_4$ calculated within a range of $-\pi$ to $\pi$ [rad]:

$$(\omega_{B1}-\omega_{B2})t_0=S_4/4 \quad (111)$$

In this way, it is possible to uniquely determine $(\omega_{B1}-\omega_{B2})t_0$ by Equation (111).

Substituting Equation (20), Equation (30), Equation (40) and Equation (50) into Equation (88) and assuming $\tau_1=\tau_2$ gives the following Equation (107):

$$\theta_{H1}(t)+\theta_{H2}(t+t_0)-\{\theta_{L1}(t+T)+\theta_{L2}(t+t_0+T)\}=2(\omega_{B1}+\omega_{B2})\tau_1+2(\omega_{B1}-\omega_{B2})t_0 \quad (107)$$

Since Equation (107) is obtained in a system of residue of $2\pi$, assuming the value of the left side to be $S_6$ gives the following Equation (108) using the integer $n_6$:

$$(\omega_{B1}+\omega_{B2})\tau_1=S_6/2+(\omega_{B1}-\omega_{B2})t_0+n_6\pi \quad (108)$$

Since $(\omega_{B1}-\omega_{B2})t_0$ can be uniquely calculated from Equation (111), $(\omega_{B1}+\omega_{B2})\tau_1$ can be calculated with uncertainty at a period of $\pi$ by substituting Equation (111) into Equation (108).

That is, since $\tau_1=(R/c)$, by calculating $(\omega_{B1}-\omega_{B2})t_0$ from Equation (110) and Equation (111) instead of directly calculating Equation (98') and substituting $(\omega_{B1}-\omega_{B2})t_0$ into Equation (107) and calculating $(\omega_{B1}+\omega_{B2})\tau_1$, it is possible to extend the maximum measurable distance up to twice the eight-times repeated alternating sequence, that is, the same maximum measurable distance as in the case where the distance is calculated by Equation (61) described above in the same way as in the four-times repeated alternating sequence.

Obtaining Equation (110) requires $\theta_{H1}(t)$, $\theta_{H1}(t+2t_0)$, $\theta_{L1}(t+T)$ and $\theta_{L1}(t+2t_0+T)$ to be detected and obtaining Equation (107) requires $\theta_{H1}(t)$, $\theta_{H2}(t+t_0)$, $\theta_{L1}(t+T)$ and $\theta_{L2}(t+t_0+T)$ to be detected. That is, the equations show that it is possible to extend the measurable distance up to the maximum measurable distance of the four-times repeated alternating sequence by measuring phases in the six-times repeated alternating sequence shown in FIG. 26.

In this way, the present embodiment adopts the six-times repeated alternating sequence, and can also perform accurate distance measurement and shorten a communication time period to approximately 6/8 times compared to the eight-times repeated alternating sequence. In the six-times repeated alternating sequence, it is also possible to extend the maximum measurable distance up to the same maximum measurable distance when a distance is calculated by Equation (61) described above.

(Generalizing of Transmission/Reception Frequency)

An example of generalizing of transmission/reception frequency is described.

(Generalizing of Frequency when Calculating Phases in Eight-Times Repeated Alternating Sequence at a Time)

When a transmission wave is $\omega_c+\omega_B$ or $\omega_c-\omega_B$, Equation (84), Equation (20) and Equation (30) described above are obtained.

$$\theta_{H1}(t)+\theta_{H2}(t+t_0)=\theta_{\tau H1}+\theta_{\tau H2}+\{(\omega_{B1}-\omega_{B2})+(\omega_{C1}-\omega_{C2})\}t_0 \tag{84}$$

$$\theta_{\tau H1}=(\omega_{C1}+\omega_{B1})\tau_1 \tag{20}$$

$$\theta_{\tau H2}=(\omega_{C2}+\omega_{B2})\tau_2 \tag{30}$$

When angular frequencies are generalized, transmission waves of the device 1 are assumed to be $\omega_{C1}+\omega_{H1}$ and $\omega_{C1}+\omega_{L1}$, angular frequencies of transmission waves of the device 2 are substituted by $\omega_{C2}+\omega_{H2}$ and $\omega_{C2}+\omega_{L2}$, the following Equations (123) to (130) hold. Note that a detected phase at the above generalized angular frequency is represented by $\Theta(t)$:

$$\Theta_{H1}(t)+\Theta_{H2}(t+t_0)=\theta_{\tau H1}+\theta_{\tau H2}+(\omega_{H1}-\omega_{H2})t_0+(\omega_{C1}-\omega_{C2})t_0 \tag{123}$$

$$\Theta_{H1}(t+t_0+D)+\Theta_{H2}(t+D)=\theta_{\tau H1}+\theta_{\tau H2}-(\omega_{H1}-\omega_{H2})t_0-(\omega_{C1}-\omega_{C2})t_0 \tag{124}$$

$$\Theta_{L1}(t+T)+\Theta_{L2}(t+t_0+T)=\theta_{\tau L1}+\theta_{\tau L2}+(\omega_{L1}-\omega_{L2})t_0+(\omega_{C1}-\omega_{C2})t_0 \tag{125}$$

$$\Theta_{L1}(t+t_0+D+T)+\Theta_{L2}(t+D+T)=\theta_{\tau L1}+\theta_{\tau L2}-(\omega_{L1}-\omega_{L2})t_0+(\omega_{C1}-\omega_{C2})t_0 \tag{126}$$

$$\theta_{\tau H1}=(\omega_{C1}+\omega_{H1})\tau_1 \tag{127}$$

$$\theta_{\tau H2}=(\omega_{C2}+\omega_{H2})\tau_2 \tag{128}$$

$$\theta_{\tau L1}=(\omega_{C1}+\omega_{L1})\tau_1 \tag{129}$$

$$\theta_{\tau L2}=(\omega_{C2}+\omega_{L2})\tau_2 \tag{130}$$

Therefore, an equation equivalent to Equation (98) is given by the following Equation (131):

$$\Theta_{H1}(t)+\Theta_{H2}(t+t_0)+\Theta_{H1}(t+t_0+D)+\Theta_{H2}(t+D)-\{\Theta_{L1}(t+T)+\Theta_{L2}(t+t_0+T)+\Theta_{L1}(t+t_0+D+T)+\Theta_{L2}(t+D+T)\}=2(\theta_{\tau H1}-\theta_{\tau L1})+2(\theta_{\tau H2}-\theta_{\tau L2})=2(\omega_{H1}-\omega_{L1})\tau_1+2(\omega_{H2}-\omega_{L2})\tau_2 \tag{131}$$

Here, a design value of $\omega_{H1}$ and $\omega_{H2}$ is set to $\omega_H$ and a design value of $\omega_{L1}$ and $\omega_{L2}$ is set to $\omega_L$. When a target specification of the distance measuring system is taken into consideration, errors of coin $\omega_{H1}$ and $\omega_{H2}$ relative to $\omega_H$, and errors of $\omega_{L1}$ and $\omega_{L2}$ relative to $\omega_L$ are on the order of several tens of [ppm], and using the design values poses no problem as long as the resolution is on the order of 1 m. The following Equation (134) is obtained by modifying Equation (131), assuming $\tau_1=\tau_2$, using $\omega_H$ instead of $\omega_{H1}$ and $\omega_{H2}$ and using $\omega_L$ instead of $\omega_{L1}$ and $\omega_{L2}$:

$$\Theta_{H1}(t)+\Theta_{H2}(t+t_0)+\Theta_{H1}(t+t_0+D)+\Theta_{H2}(t+D)-\{\Theta_{L1}(t+T)+\Theta_{L2}(t+t_0+T)+\Theta_{L1}(t+t_0+D+T)+\Theta_{L2}(t+D+T)\}\approx 4(\omega_H-\omega_L)\tau_1 \tag{134}$$

It is possible to calculate $\tau_1$ by Equation (134) and calculate a distance using $R=c\tau_1$.

(Generalizing of Frequency when Dividing Phase Calculation in Eight-Times Repeated Alternating Sequence)

It has been described that in the eight-times repeated alternating sequence, the maximum measurable distance becomes ½ of the maximum measurable distance in the case where a distance is calculated by Equation (61), but it is possible to extend the maximum measurable distance up to the same distance in the case where the distance is calculated by Equation (61) by dividing phase calculation as in the case of the six-times repeated alternating sequence.

Equation (104) can be expressed using a generalized angular frequency as the following Equation (135):

$$\Theta_{H1}(t)+\Theta_{H2}(t+t_0)-\Theta_{H1}(t+t_0+D)-\Theta_{H2}(t+D)-\Theta_{L1}(t+T)-\Theta_{L2}(t+t_0+T)+\Theta_{L1}(t+t_0+D+T)+\Theta_{L2}(t+D+T)=2\{(\omega_{H1}-\omega_{L1})-(\omega_{H2}-\omega_{L2})\}t_0 \tag{135}$$

Since Equation (135) described above is calculated in a system of residue of $2\pi$, the following Equation (136) is obtained using an integer $m_8$ if the left side is substituted by $\Sigma_8$:

$$\{(\omega_{H1}-\omega_{L1})-(\omega_{H2}-\omega_{L2})\}t_0=(\Sigma_9/2)+m_8\pi \tag{135}$$

Here, as design values of the device, if an angular frequency difference between $\omega_{H1}$ and $\omega_{L1}$, and an angular frequency difference between $\omega_{H2}$ and $\omega_{L2}$ are set to $2\pi\times10$ [MHz], a frequency error between transmission and reception is set to maximum $\pm40$ [ppm], and a delay $t_0$ is set to 0.1 [ms], $360°\times(10\times10^6\times\pm40$ [ppm])$=\pm14.4°$ is satisfied, and so it is obvious that the left side of Equation (136) falls within a range of $\pi/2$ to $\pi/2$ [rad]=90 to 90° and it is thereby possible to exclude uncertainty. That is, the following Equation (137) is given using $\Sigma_8$ calculated in a range of $\pi$ to $\pi$ [rad]:

$$\{(\omega_{H1}-\omega_{L1})-(\omega_{H2}-\omega_{L2})\}t_0=\Sigma_9/2 \tag{137}$$

In this way, $\{(\omega_{H1}-\omega_{L1})-(\omega_{H2}-\omega_{L2})\}t_0$ can be uniquely calculated from Equation (137).

The equation corresponding to Equation (107) described above can be obtained as the following Equation (138) in the same way as when Equation (134) is derived:

$$\Theta_{H1}(t)+\Theta_{H2}(t+t_0)-\{\Theta_{L1}(t+T)+\Theta_{L2}(t+t_0+T)\}= (\theta_{\tau H1}-\theta_{\tau L1})+(\theta_{\tau H2}-\theta_{\tau L2})+\{(\omega_{H1}-\omega_{L1})-(\omega_{H2}-\omega_{L2})\}t_0= 2(\omega_H-\omega_L)\tau_1+\{(\omega_{H1}-\omega_{L1})-(\omega_{H2}-\omega_{L2})\}t_0 \tag{138}$$

It is possible to determine $\tau_1$ by substituting the result of Equation (137) into Equation (138) and calculate the distance from a distance $R=c\tau_1$. In this case, it is possible to obtain a maximum measurable distance twice the maximum measurable distance calculated by Equation (134) and extend the distance to the same maximum measurable distance calculated by Equation (61).

(Generalizing of Frequency when Dividing and Performing Phase Calculation in Six-Times Repeated Alternating Sequence)

When $D=t_0$ is assumed in Equation (135) described above, the following Equation (139) is obtained:

$$\Theta_{H1}(t)-\Theta_{H2}(t+2t_0)-\Theta_{L1}(t+T)-+\Theta_{L1}(t+2t_0+T)= 2\{(\omega_{H1}-\omega_{L1})-(\omega_{H1}-\omega_{L2})\}t_0 \quad (139)$$

When the result of calculating the left side of Equation (139) in a range of $-\pi$ to $\pi$ [rad] is substituted by $\tau_6$, it is possible to remove uncertainty in the same way as in the description when Equation (137) described above is derived and the following Equation (140) is obtained:

$$\{(\omega_{H1}-\omega_{L1})-(\omega_{H1}-\omega_{L2})\}t_0=\Sigma_6 2 \quad (140)$$

It is possible to determine $\tau_1$ by substituting Equation (140) into Equation (138) and calculate the distance from the distance $R=c\tau_1$.

(Generalizing of Frequency when Performing Phase Calculation in Four-Times Repeated Alternating Sequence at One Time)

Similarly, Equation (116) and Equation (122) described above can be expressed by the following Equation (141) and Equation (142) using the design values of angular frequencies $\omega_H$ and $\omega_L$ respectively:

$$\Theta_{H2}(t+2t_0)+2\Theta_{H1}(t+t_0)-\Theta_{H1}(t)-\{\Theta_L(t+2t_0+T)+ 2\Theta_{L1}(t+t_0+T)-\Theta_{L1}(t+T)\}\approx 2(\omega_H-\omega_L)\tau_1 \quad (141)$$

$$\Theta_{H1}(t)+2\Theta_{H2}(t+t_0)-\Theta_{H2}(t+2t_0)-\{\Theta_{L1}(t+T)+2\Theta_{L2}(t+ t_0+T)-\Theta_{L2}(t+2t_0+T)\}\approx 2(\omega_H-\omega_L)\tau_1 \quad (142)$$

$(\omega_H-\omega_L)\tau_1$ can be calculated with uncertainty at a period of $\pi$ in the same way as in Equation (117). Therefore, by using Equation (141) or Equation (142), the four-times repeated alternating sequence is also applicable to distance measurement using arbitrary two, three or more waves.

(Fifth Embodiment) (Three Frequencies Shortened Alternating Sequence)

Figure 27:
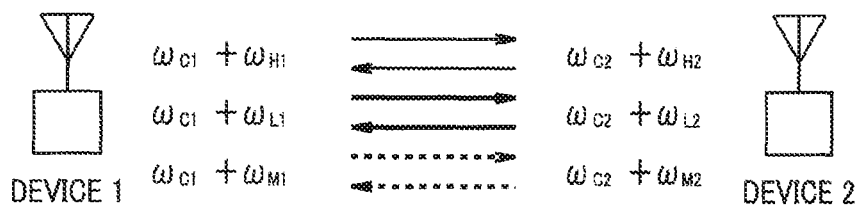
FIG. 27 is an explanatory diagram for explaining a fifth embodiment of the present invention.
Figure 28:
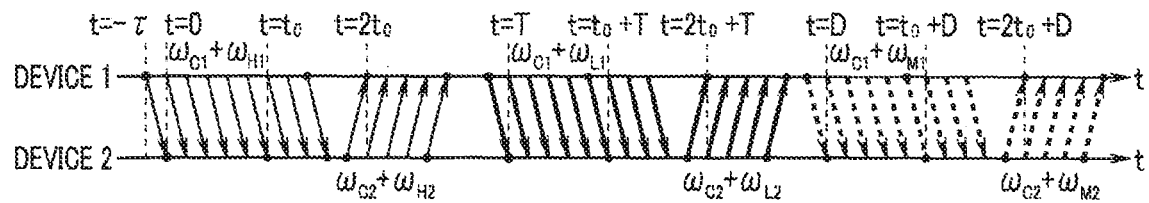
FIG. 28 is an explanatory diagram for explaining the fifth embodiment of the present invention.
Figure 29:
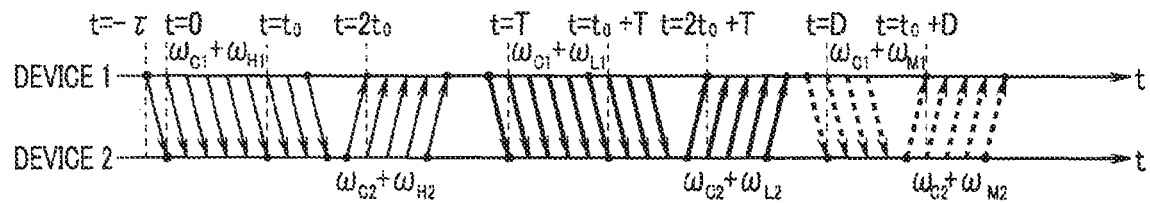
FIG. 29 is an explanatory diagram for explaining the fifth embodiment of the present invention.

FIG. 27 to FIG. 29 are explanatory diagrams for explaining a fifth embodiment of the present invention. FIG. 27 to FIG. 29 show a three frequencies six-times repeated alternating sequence. A hardware configuration in the present embodiment is similar to the hardware configuration in the first embodiment. An example has been described in FIG. 9 described above where the measurable distance is extended through distance measurement using three transmission waves. These transmission waves with three frequencies may be transmitted using a method similar to the method of the four-times repeated alternating sequence. FIG. 27 shows transmission signals transmitted from the devices 1 and 2 in the transmission sequence of the case and FIG. 28 shows phase detection in the transmission sequence of FIG. 27.

In the present embodiment, as shown in FIG. 27, the device 1 generates and transmits a transmission wave $\omega_{C1}+\omega_{H1}$, the device 2 generates and transmits a transmission wave $\omega_{C2}+\omega_{H2}$, the device 1 generates and transmits a transmission wave $\omega_{C1}+\omega_{L1}$ and the device 2 generates and transmits a transmission wave $\omega_{C2}+\omega_{L2}$. Furthermore, as a third wave, the device 1 generates and transmits a transmission wave $\omega_{C1}+\omega_{M1}$ and the device 2 generates and transmits a transmission wave $\omega_{C2}+\omega_{M2}$. Since transmission waves with three frequencies are transmitted six times alternately, the sequence of FIG. 28 is referred to as a "three frequencies six-times repeated alternating sequence" hereinafter.

The following Equation (143) is obtained from Equation (141) described above using $\tau_1=(R/c)$:

$$(\tfrac{1}{2})\times\Theta_{H2}(t+2t_0)+2\Theta_{H1}(t+t_0)-\Theta_{H1}(t)-\{\Theta_{L2}(t+2t_0+T)+ 2\Theta_{L1}(t+t_0+T)-\Theta_{L1}(t+T)\}\approx (\omega_H-\omega_L)\times(R/c) \quad (143)$$

It is obvious that Equation (144) can be obtained through calculations in the same way as described so far.

$$(\tfrac{1}{4})\times\Theta_{M2}(t+2t_0+D)+2\Theta_{M1}(t+t_0+D)-\Theta_{M1}(t+D)- \{\Theta_{L2}(t+2t_0+T)+2\Theta_{L1}(t+t_0+T)-\Theta_{L1}(t+T)\}\approx (\omega_M-\omega_L)\times(R/c) \quad (144)$$

In the three frequencies six-times repeated alternating sequence shown in FIG. 28, the left side of Equation (143) can be calculated from the phase obtained in the "part after the device 1 generates and transmits a transmission wave $\omega_{C1}+\omega_{H1}$ until the device 1 receives a transmission wave $\omega_{C2}+\omega_{H2}$ transmitted from the device 2" and the value is written as Θdet. Similarly, the left side of Equation (144) can be calculated from the phase obtained in the "part after the device 1 generates and transmits a transmission wave $\omega_{C1}+\omega_{L1}$ until the device 1 receives a transmission wave $\omega_{C2}+\omega_{M2}$ transmitted from the device 2" and the value is written as Θdet1. Using Θdet and Θdet1, it is possible to extend the measurable distance in the same way as described using FIG. 9.

Furthermore, in the present embodiment, as shown in FIG. 29, the transmission/reception timing of the third wave is different from the transmission/reception timing of the sequence of FIG. 28, and this is intended to enable accurate distance measurement through a three frequencies six-times repeated alternating sequence (hereinafter also referred to as "three frequencies shortened alternating sequence") in which the transmission time period of the third transmission wave $\omega_{C1}+\omega_{M1}$ is shortened and omitted once. That is, in FIG. 29, the control section 11 of the device 1 transmits a transmission wave having an angular frequency of $\omega_{C1}+\omega_{M1}$ to the device 2 at timing corresponding to t=D. The control section 21 of the device 2 transmits a transmission wave having an angular frequency of $\omega_{C2}+\omega_{M2}$ at timing corresponding to $t=t_0+D$ immediately after receiving the transmission wave. The control section 11 of the device 1 acquires phase $\Theta_{M2}(t+t_0+D)$ on a basis of the received signal at time $t=t_0+D$ and the control section 21 of the device 2 acquires phase $\Theta_{M1}(t+D)$ on a basis of the received signal at time t=D.

Hereinafter, the reason that accurate distance measurement is possible by the three frequencies shortened alternating sequence of FIG. 29 is descried.

The following four equations show Equation (27), Equation (37), Equation (47) and Equation (57) described above:

$$\theta_{H1}(t)=-\{(\omega_{C1}-\omega_{C2})t+(\omega_{B1}-\omega_{B2})t+\theta_{C1}-\theta_{C2}+\theta_{B1}- \theta_{B2}-\theta_{\tau H1}\} \quad (27)$$

$$\theta_{H2}(t)=(\omega_{C1}-\omega_{C2})t+(\omega_{B1}-\omega_{B2})t+\theta_{C1}-\theta_{C2}+\theta_{B1}-\theta_{B2}+ \theta_{\tau H2} \quad (37)$$

$$\theta_{L1}(t)=-\{(\omega_{C1}-\omega_{C2})t-(\omega_{B1}-\omega_{B2})t+\theta_{C1}-\theta_{C2}-(\theta_{B1}- \theta_{B2})-\theta_{\tau L1}\} \quad (47)$$

$$\theta_{L2}(t)=(\omega_{C1}-\omega_{C2})t-(\omega_{B1}-\omega_{B2})t+\theta_{C1}-\theta_{C2}-(\theta_{B1}-\theta_{B2})+ \theta_{\tau L2} \quad (57)$$

In Equation (27), Equation (37), Equation (47) and Equation (57), if the angular frequency of the transmission wave of the device 1 is substituted by $\omega_{C1}+\omega_{H1}$ and $\omega_{C1}+\omega_{L1}$, and the angular frequency of the transmission wave of the device 2 is substituted by $\omega_{C2}+\omega_{H2}$ and $\omega_{C2}+\omega_{L2}$ and the angular frequencies are generalized, the following Equations (201) to (204) hold using Equations (127) to (130):

$$\Theta_{H1}(t)=-\{(\omega_{C1}-\omega_{C2})t+(\omega_{H1}-\omega_{H2})t+(\Theta_{C1}-\Theta_{C2})+(\Theta_{H1}-\Theta_{H2})-\Theta_{\tau H1}\} \quad (201)$$

$$\Theta_{H2}(t)=(\omega_{C1}-\omega_{C2})t+(\omega_{H1}-\omega_{H2})t+(\Theta_{C1}-\Theta_{C2})+(\Theta_{H1}-\Theta_{H2})+\Theta_{\tau H2} \quad (202)$$

$$\Theta_{L1}(t)=-\{(\omega_{C1}-\omega_{C2})t+(\omega_{L1}-\omega_{L2})t+(\Theta_{C1}-\Theta_{C2})+(\Theta_{L1}-\Theta_{L2})-\Theta_{\tau L1}\} \quad (203)$$

$$\Theta_{L2}(t)=(\omega_{C1}-\omega_{C2})t+(\omega_{L1}-\omega_{L2})t+(\Theta_{C1}-\Theta_{C2})+(\Theta_{L1}-\Theta_{L2})+\Theta_{\tau L2} \quad (204)$$

Similarly, when the third angular frequencies $\omega_{C1}+\omega_{M1}$ and $\omega_{C2}+\omega_{M2}$ are used, it is obvious that the following Equation (205) and Equation (206) hold:

$$\Theta_{M1}(t)=-\{(\omega_{C1}-\omega_{C2})t+(\omega_{M1}-\omega_{M2})t+(\Theta_{C1}-\Theta_{C2})+(\Theta_{M1}(t)-\Theta_{M2})-\Theta_{\tau M1}\} \quad (205)$$

$$\Theta_{M2}(t)=(\omega_{C1}-\omega_{C2})t+(\omega_{M1}-\omega_{M2})t+(\Theta_{C1}-\Theta_{C2})+(\Theta_{M1}-\Theta_{M2})+\Theta_{\tau M2} \quad (206)$$

where $$\Theta_{\tau M1}=(\omega_{C1}+\omega_{M1})\tau_1 \quad (129a)$$

$$\Theta_{\tau M2}=(\omega_{C2}+\omega_{M2})\tau_2 \quad (130a)$$

From the relationship among Equation (201) to Equation (206) described above, the following Equation (207) to Equation (211) hold:

$$\Theta_{H1}(t)+\Theta_{H2}(t+2t_0)+\Theta_{\tau H1}+\Theta_{\tau H2}+2\{(\omega_{C1}-\omega_{C2})+(\omega_{H1}-\omega_{H2})\}t_0 \quad (207)$$

$$\Theta_{H1}(t+t_0)+\Theta_{H2}(t+2t_0)=\Theta_{\tau H1}+\Theta_{\tau H2}+\{(\omega_{C1}-\omega_{C2})+(\omega_{H1}-\omega_{H2})\}t_0 \quad (208)$$

$$\Theta_{L1}(t+T)+\Theta_{L2}(t+2t_0+T)=\Theta_{\tau L1}+\Theta_{\tau L2}+2\{(\omega_{C1}-\omega_{C2})+(\omega_{L1}-\omega_{L2})\}t_0 \quad (209)$$

$$\Theta_{L1}(t+t_0+T)+\Theta_{L2}(t+2t_0+T)=\Theta_{\tau L1}+\Theta_{\tau L2}+\{(\omega_{C1}-\omega_{C2})+(\omega_{L1}-\omega_{L2})\}t_0 \quad (210)$$

$$\Theta_{M1}(t+D)+\Theta_{M2}(t+t_0+D)=\Theta_{\tau M1}+\Theta_{\tau H2}+\{(\omega_{C1}-\omega_{C2})+(\omega_{M1}-\omega_{M2})\}t_0 \quad (211)$$

Note that as described above, it is assumed that a plurality of oscillators in the device 1 are oscillating in synchronization with a common reference oscillating source and a plurality of oscillators in the device 2 are also oscillating in synchronization with a common reference oscillating source. In this case, ideal angular frequencies designated as design values are assumed to be $\omega_H$, $\omega_L$ and $\omega_M$ and a frequency error between transmission and reception is assumed to be k, the following Equation (212) holds:

$$k=(\omega_{H1}-\omega_{H2})/\omega_H=(\omega_{L1}-\omega_{L2})/\omega_L=(\omega_{M1}-\omega_{M2})/\omega_M \quad (212)$$

Using the k, the following Equation (213) and Equation (214) hold from Equation (207) to Equation (211):

$$\Theta_{H1}(t)-\Theta_{H1}(t+t_0)-\Theta_{L1}(t+T)+\Theta_{L1}(t+t_0+T)= \\ \{(\omega_{H1}-\omega_{H2})-(\omega_{L1}-\omega_{L2})\}t_0=k(\omega_H-\omega_L)t_0 \quad (213)$$

$$\Theta_{H1}(t+t_0)+\Theta_{H2}(t+2t_0)-\{\Theta_{M1}(t+D)+\Theta_{M2}(t+t_0+D)\}= \\ \Theta_{\tau H1}+\Theta_{\tau H2}-\Theta_{\tau M1}+\Theta_{\tau M2}+\{(\omega_{H1}-\omega_{H2})-(\omega_{M1}-\omega_{M2})\}t_0= \\ \Theta_{\tau H1}+\Theta_{\tau H2}-\Theta_{\tau M1}+\Theta_{\tau M2}+k(\omega_H-\omega_M)t_0 \quad (214)$$

As design values of the device, when k is set to maximum ±40 [ppm], $\omega_H-\omega_L$ is set to $2\pi\times10$ [MHz] and delay $t_0$ is set to 0.1 [ms], if the right side of Equation (213) is calculated, ±40 [ppm]×$2\pi\times10$ [MHz]×0.1 [ms])=±$0.08\pi$ is satisfied, and so the left side of Equation (213) can be uniquely determined without uncertainty of $2\pi$. That is, even when k is on the order of ±40 [ppm], if transmission/reception parameters are appropriately selected, it is obvious that the uncertainty of $2\pi$ on the left side of Equation (213) can be excluded.

Thus, the following Equation (215) holds from Equation (213) and Equation (214):

$$\Theta_{H1}(t+t_0)+\Theta_{H2}(t+2t_0)-\Theta_{M1}(t+D)-\Theta_{M2}(t+t_0+D)-(\omega_H-\omega_M)/(\omega_H-\omega_L)\{\Theta_{H1}(t)-\Theta_{H1}(t+t_0)-\Theta_{L1}(t+T)+\Theta_{L1}(t+t_0+T)\}=(\Theta_{\tau H1}-\Theta_{\tau M1})+(\Theta_{\tau H2}-\Theta_{\tau M2})\approx(\omega_H-\omega_M)\tau_1 \quad (215)$$

Similarly, the following Equation (216) holds from Equation (207) to Equation (211):

$$\Theta_{L1}(t+t_0+T)+\Theta_{L2}(t+2t_0+T)-\Theta_{M1}(t+D)-\Theta_{M2}(t+t_0+D)- \\ (\omega_L-\omega_M)/(\omega_H-\omega_L)\{\Theta_{H1}(t)-\Theta_{H1}(t+t_0)-\Theta_{L1}(t+T)+ \\ \Theta_{L1}(t+t_0+T)\}=(\Theta_{\tau L1}-\Theta_{\tau M1})+(\Theta_{\tau L2}-\Theta_{\tau M2})\approx(\omega_L-\omega_M)\tau_1 \quad (216)$$

Furthermore, the following Equation (217) holds from the relationship among Equation (201) to Equation (204):

$$\Theta_{H2}(t+2t_0)+2\Theta_{H1}(t+t_0)-\Theta_{H1}(t)-\{\Theta_{L2}(t+2t_0+T)+2\Theta_{L1}(t+t_0+T)-\Theta_{L1}(t+T)\}=(\Theta_{\tau H1}-\Theta_{\tau L1})+(\Theta_{\tau H2}-\Theta_{\tau L2})\approx 2(\omega_H-\omega_L)\tau_1 \quad (217)$$

That is, using Equation (215), Equation (216) and Equation (217), it is obvious that distance measurement is also possible by a combination of any two of the three angular frequencies $\omega_H$, $\omega_L$ and $\omega_M$.

Thus, in the present embodiment, distance measurement using three frequencies is possible using the method similar to the four-times repeated alternating sequence. Three ways of distance measurement are possible using the three frequencies six-times repeated alternating sequence. In the three frequencies shortened alternating sequence, a phase needs to be acquired only one time by the device 2 at the third frequency and the transmission time period of the device 1 can be shortened. Similarly, in the case of four or more waves, the transmission time period can be shortened likewise. Furthermore, Equation (213) can be obtained from the frequencies at which reception is performed twice each time and the frequencies need not be the initial two frequencies. One device (e.g., device 1) may "transmit/receive" with one of the two frequencies among three or more frequencies used. Since these can be easily analogized from above, and so description is omitted.

(Sixth Embodiment) (Specific Example of Method for Transmitting Phase Information)

A sixth embodiment of the present invention is described. A hardware configuration in the present embodiment is similar to the hardware configuration of the first embodiment.

Each embodiment described above has described a method in which one of the device 1 and the device 2 transmits phase information on a basis of acquired I or Q signals to the other device, the other device synthesizes the phase information obtained at the devices 1 and 2 and calculates a distance. In this case, if the one of the devices 1 and 2 carries out data communication separately to acquire phase information measured by the other, a time period until completion of distance measurement may be extended to establish data communication or a protocol may become complicated. The present embodiment shows a specific example of enabling transmission of phase information from which such data communication is omitted.

As shown in FIG. 4 and FIG. 5 described above, the device 1 can input $I_{Tx1}$ and $Q_{Tx1}$, and the device 2 can input $I_{TX2}$ and $Q_{TX2}$. In (transmission/reception of a transmission wave having an angular frequency of $\omega_{C2}+\omega_{B2}$ from the device 2) described above, when transmitting the transmission wave, description has been given assuming that the device 2 gives IQ signals with $I_{Tx2}=1$ and $Q_{Tx2}=0$, that is, with a radius of 1 and a phase of 0 degrees.

The device 2 is assumed to perform transmission by giving $\theta_{D2H}$ or $\theta_{D2L}$ as a phase offset without changing the radius 1 of the input. This corresponds to shifting the phase of the carrier signal to be transmitted. That is, when the device 2 performs transmission with an angular frequency of $\omega_{C2}+\omega_{B2}$, $I_{TX2}=\cos(\theta_{D2H})$ and $Q_{Tx2}=\sin(\theta_{D2H})$ are input and when the device 2 performs transmission with an angular frequency of $\omega_{C2}-\omega_{B2}$, $I_{Tx2}=\cos(\theta_{D2L})$ and $Q_{Tx2}=\sin(\theta_{D2L})$ are input. Hereinafter, transmission/reception signals in the case is described.

First, phase detection with a transmission wave having a high angular frequency of $\omega_{C2}+\omega_{B2}$ is described. When initial phases of the angular frequencies $\omega_{C2}$ and $\omega_{B2}$ are assumed to be $\theta_{C2}$ and $\theta_{B2}$ respectively, a signal $tx2(t)$ having an angular frequency of $\omega_{C2}+\omega_{B2}$ transmitted from the device 2 is expressed by the following Equation (301):

$$tx2(t) = \cos(\omega_{C2}t + \theta_{C2}) \quad (301)$$
$$\{\cos(\omega_{B2}t + \theta_{B2})\cos(\theta_{D2H}) + \sin(\omega_{B2}t + \theta_{B2})\sin(\theta_{D2H})\} -$$
$$\sin(\omega_{C2}t + \theta_{C2})$$
$$\{\sin(\omega_{B2}t + \theta_{B2})\cos(\theta_{D2H}) - \cos(\omega_{B2}t + \theta_{B2})\sin(\theta_{D2H})\} =$$
$$\cos(\omega_{C2}t + \theta_{C2})\cos\{\omega_{B2}t + \theta_{B2} - \theta_{D2H}\} -$$
$$\sin(\omega_{C2}t + \theta_{C2})\sin\{\omega_{B2}t + \theta_{B2} - \theta_{D2H}\} =$$
$$\cos\{(\omega_{C2}+\omega_{B2})t + \theta_{C2} + \theta_{B2} - \theta_{D2H}\}$$

When the distance between the device 2 and the device 1 is set to R and a transmission wave from the device 2 is assumed to be received by the device 1 after a delay time $\tau_2$, the received signal $rx1(t)$ is expressed by the following Equation (302):

$$rx1(t) = \cos\{(\omega_{C2}+\omega_{B2})(t-\tau_2)+\theta_{C2}+\theta_{B2}-\theta_{D2H}\} = \cos\{(\omega_{C2}+\omega_{B2})t+\theta_{C2}+\theta_{B2}-\theta_{D2H}-\theta_{\tau H2}\} \quad (302)$$

Note that $\theta_{\tau H2}=(\omega_{C2}+\omega_{B2})\tau_2$ (303)

Therefore, it can be easily analogized from a comparison between Equation (29) and Equation (30) described above and Equation (302) and Equation (303) that a phase $\theta_{H2}(t)$ detected by the device 1 is given by the following Equation (304) similar to Equation (37) described above:

$$\theta_{H2}(t)=(\omega_{C1}-\omega_{C2})t+(\omega_{B1}-\omega_{B2})t+\theta_{C1}-\theta_{C2}+\theta_{B1}-\theta_{B2}+\theta_{D2H}+\theta_{\tau H2} \quad (304)$$

Phase detection with a transmission wave having a low angular frequency of $\omega_{C2}-\omega_{B2}$ is described. A phase $\theta_{L2}(t)$ detected by the device 1 can be calculated by the following Equation (305) in the same way as in the case of derivation of Equation (304) described above:

$$\theta_{L2}(t)=(\omega_{C1}-\omega_{C2})t-(\omega_{B1}-\omega_{B2})t+\theta_{C1}-\theta_{C2}-\theta_{C2}-(\theta_{B1}-\theta_{B2})+\theta_{D2L}+\theta_{\tau L2} \quad (305)$$

where $$\theta_{\tau L2}=(\omega_{C2}-\omega_{B2})\tau_2 \quad (306)$$

Here, a case is considered where distance measurement is performed using the four-times repeated alternating sequence shown in FIG. 17 described above.

Assume that the distance between the device 1 and the device 2 is R and the delay time until the transmission wave of the device 1 arrives at the device 2 is $\tau_1$. If $I_{Tx1}=1$ and $Q_{Tx1}=0$, detected phases $\theta_{H1}(t)$ and $\theta_{L1}(t)$ at the device 2 are given by Equation (20), Equation (27), Equations (40) and (47) described above. These equations are shown again:

$$\theta_{\tau H1}=(\omega_{C1}+\omega_{B1})\tau_1 \quad (20)$$

$$\theta_{H1}(t)=-\{(\omega_{C1}-\omega_{C2})t+(\omega_{B1}-\omega_{B2})t+\theta_{C1}-\theta_{C2}-\theta_{B1}-\theta_{B2}-\theta_{\tau H1}\} \quad (305)$$

$$\theta_{\tau L1}=(\omega_{C1}-\omega_{B1})\tau_1 \quad (40)$$

$$\theta_{L1}(t)=-\{(\omega_{C1}-\omega_{C2})t-(\omega_{B1}-\omega_{B2})t+\theta_{C1}-\theta_{C2}-(\theta_{B1}-\theta_{B2})-\theta_{\tau L1}\} \quad (47)$$

Here, it is analogized from Equation (116) described above that when the device 2 transmits phase information obtained from the received signal in addition to the initial phase to the device 1 and the device 1 can perform distance measurement with the phase information obtained from the received signal. Hereinafter, the analogy is examined.

The device 2 is assumed to set phase offsets $\theta_{D2H}$ and $\theta_{D2L}$ shown in the following Equation (307) and Equation (308) from the detected phase of the received signal:

$$\theta_{D2H}=2\theta_{H1}(t+t_0)-\theta_{H1}(t) \quad (307)$$

$$\theta_{D2L}=2\theta_{L1}(t+t_0+T)-\theta_{L1}(t+T) \quad (308)$$

The device 2 performs transmission using $\theta_{D2H}$ and $\theta_{D2L}$ calculated on a basis of the phase information obtained from the received signal. The device 1 adds up the two pieces of phase information obtained by the received signals at timings of $t=2t_0$ and $t=2t_0+T$ in FIG. 17 and obtains the following Equation (309):

$$\theta_{H2}(t+2t_0) - \theta_{L2}(t+2t_0+T) = \quad (309)$$
$$(\omega_{C1}-\omega_{C2})(t+2t_0) + (\omega_{B1}-\omega_{B2})(t+2t_0) +$$
$$\theta_{C1}-\theta_{C2}+\theta_{B1}-\theta_{B2}+\theta_{D2H}+\theta_{\tau H2} -$$
$$\{(\omega_{C1}-\omega_{C2})(t+2t_0+T) - (\omega_{B1}-\omega_{B2})(t+2t_0+T) +$$
$$\theta_{C1}-\theta_{C2}-(\theta_{B1}-\theta_{B2})+\theta_{D2L}+\theta_{\tau L2}\} =$$
$$-(\omega_{C1}-\omega_{C2})T + (\omega_{B1}-\omega_{B2})T + 2(\omega_{B1}-\omega_{B2})(t+2t_0) +$$
$$2(\theta_{B1}-\theta_{B2}) + (\theta_{\tau H2}-\theta_{\tau L2}) + \theta_{D2H}-\theta_{D2L}$$

Here, $\theta_{D2H}-\theta_{D2L}$ is given by the following Equation (310):

$$\theta_{D2H}-\theta_{D2L} = 2\theta_{H1}(t+t_0)-\theta_{H1}(t) - \{2\theta_{L1}(t+t_0+T)-\theta_{L1}(t+T)\} = \quad (310)$$
$$-2\{(\omega_{C1}-\omega_{C2})(t+t_0) + (\omega_{B1}-\omega_{B2})(t+t_0) + \theta_{C1} -$$

-continued $$\theta_{C2} + \theta_{B1} - \theta_{B2} - \theta_{\tau H1}\} + \{(\omega_{C1} - \omega_{C2})t +$$

$$(\omega_{B1} - \omega_{B2})t + \theta_{C1} - \theta_{C2} + \theta_{B1} - \theta_{B2} - \theta_{\tau H1}\} +$$

$$2\{(\omega_{C1} - \omega_{C2})(t + t_0 + T) - (\omega_{B1} - \omega_{B2})(t + t_0 + T) +$$

$$\theta_{C1} - \theta_{C2} - (\theta_{B1} - \theta_{B2}) - \theta_{\tau L1}\} -$$

$$\{(\omega_{C1} - \omega_{C2})(t + T) - (\omega_{B1} - \omega_{B2})(t + T) +$$

$$\theta_{C1} - \theta_{C2} - (\theta_{B1} - \theta_{B2}) - \theta_{\tau L1}\} =$$

$$(\omega_{C1} - \omega_{C2})T - (\omega_{B1} - \omega_{B2})T - 2(\omega_{B1} - \omega_{B2})(t + 2t_0) -$$

$$2(\theta_{B1} - \theta_{B2}) - (\theta_{\tau H1} - \theta_{\tau L1})$$

Since a delay of the radio wave between the device 1 and the device 2 does not depend on the propagating direction of the radio wave, that is, $\tau_1 = \tau_2$, the following Equation (311) holds from Equation (309) and Equation (310) described above:

$$\theta_{H2}(t+2t_0) - \theta_{L2}(t+2t_0+T) = (\theta_{\tau H1} - \theta_{\tau L1}) + (\theta_{\tau H2} - \theta_{\tau L2}) = 2(\omega_{B1} + \omega_{B2})\tau_1 \quad (311)$$

Equation (311) means that distance measurement can be performed using only the phase information measured by the device 1. That is, it is clear that when the device 2 performs transmission using $\theta_{D2H}$ and $\theta_{D2L}$ given by Equation (307) and Equation (308) on a basis of the measured phase information, the device 1 can perform distance measurement using only the phase information measured by the device 1.

Thus, in the present embodiment, one of the devices 1 and 2 transmits to the other device a transmission wave by shifting the phase of a carrier signal to be transmitted with a phase obtained on a basis of measured phase information, and the other device can thereby perform distance measurement. In the present embodiment, this eliminates the necessity for separately communicating phase information and can prevent the time period until completion of distance measurement from lengthening or prevent the protocol from becoming complicated.

(Modification)

A modification of the sixth embodiment is described.

Equation (310) described above shows that Equation (310) also holds when the device 2 sets the phase offsets $\theta_{D2H}$ and $\theta_{D2L}$ shown by the following Equation (312) and Equation (313) from the detected phase of the received signal:

$$\theta_{D2H} = 0 \quad (312)$$

$$\theta_{D2L} = 2\theta_{L1}(t+t_0+T) - \theta_{L1}(t+T) - \{2\theta_{H1}(t+t_0) - \theta_{H1}(t)\} \quad (313)$$

Even when the device 2 transmits the transmission wave generated using $\theta_{D2H}$ and $\theta_{D2L}$ to the device 1, the device 1 can perform distance measurement using only the measured phase information.

In this way, what phases should be given at the time of transmission by the device 2 is a design item and even when the phases are modified in various ways, effects of the present embodiment can be obtained.

Furthermore, as is clear from Equation (102), similar effects can be obtained even when similar phase changes are given to $\theta_{C2}$ or $\theta_{B2}$. Here, the method for shifting the phase of a carrier signal to be transmitted has been described as phase information to be given to $I_{TX2}$ and $Q_{TX2}$ on a basis of the configuration of the radio section shown in FIG. 4 and FIG. 5, but other configurations can also be used.

Furthermore, using a similar approach, it is also possible to perform distance measurement in other transmission/ reception sequences with only the phase information measured by the device 1. That is, the final phase of the transmission/reception sequence may be designated as transmission from the device 2 to the device 1, and when the device 2 performs transmission, the device 2 may carry out predetermined operation on a basis of the received phase information and transmit the result by shifting the phase of the device 2.

(Seventh Embodiment) (Example of Method for Transmitting Phase Information in Three Frequencies Six-Times Repeated Alternating Sequence)

A seventh embodiment of the present invention is described. A hardware configuration of the present embodiment is similar to the hardware configuration of the first embodiment.

As described above, since it is not possible to detect a detected phase difference exceeding $2\pi$, a plurality of distance candidates exist for the calculated detected phase difference. The aforementioned three frequencies six-times repeated alternating sequence of FIG. 28 has been described as a method for selecting a correct distance from among a plurality of distance candidates. The present embodiment is intended to show an example of dispensing with separate data communication of phase information in distance measurement using three or more waves as in the case of the three frequencies six-times repeated alternating sequence.

When the transmission waves are $\omega_C + \omega_B$ and $\omega_C - \omega_B$, if the device 2 transmits the transmission waves at an angular frequency of $\omega_{C2} + \omega_{B2}$, $I_{TX2} = \cos(\theta_{D2H})$ and $Q_{TX2} = \sin(\theta_{D2H})$ are input as phase offsets and if the device 2 transmits the transmission waves at an angular frequency of $\omega_{C2} - \omega_{B2}$, $I_{Tx2} = \cos(\theta_{D2L})$ and $Q_{Tx2} = \sin(\theta_{D2L})$ are input. The transmission/reception signal in the case is expressed by the equations described above which are shown again below:

$$\theta_{H1}(t) = -\{(\omega_{C1} - \omega_{C2})t + (\omega_{B1} - \omega_{B2})t + \theta_{C1} - \theta_{C2} + \theta_{B1} - \theta_{B2} - \theta_{\tau H1}\} \quad (27)$$

$$\theta_{H2}(t) = (\omega_{C1} - \omega_{C2})t + (\omega_{B1} - \omega_{B2})t + \theta_{C1} - \theta_{C2} + \theta_{B1} - \theta_{B2} + \theta_{D2H} + \theta_{\tau H2} \quad (304)$$

$$\theta_{L1}(t) = -\{(\omega_{C1} - \omega_{C2})t - (\omega_{B1} - \omega_{B2})t + \theta_{C1} - \theta_{C2} - (\theta_{B1} - \theta_{B2}) - \theta_{\tau L1}\} \quad (47)$$

$$\theta_{L2}(t) = (\omega_{C1} - \omega_{C2})t - (\omega_{B1} - \omega_{B2})t + \theta_{C1} - \theta_{C2} - (\theta_{B1} - \theta_{B2}) + \theta_{D2L} + \theta_{\tau L2} \quad (305)$$

$$\theta_{\tau H1} = (\omega_{C1} + \omega_{B1})\tau_1 \quad (20)$$

$$\theta_{\tau H2} = (\omega_{C2} + \omega_{B2})\tau_2 \quad (303)$$

$$\theta_{\tau L2} = (\omega_{C2} + \omega_{B2})\tau_2 \quad (306)$$

$$\theta_{\tau L1} = (\omega_{C1} - \omega_{B1})\tau_1 \quad (40)$$

In order to explain that distance measurement is possible at two arbitrary frequencies among three frequencies, an equation of distance measurement in a case where angular frequencies are generalized is described first.

When the angular frequencies of transmission waves of the device 1 are assumed to be $\omega_{C1} + \omega_{H1}$, $\omega_{C1} + \omega_{L1}$ and $\omega_{C1} + \omega_{M1}$, the angular frequencies of transmission waves of the device 2 are assumed to be $\omega_{C2} + \omega_{H2}$, $\omega_{C2} + \omega_{L2}$ and $\omega_{C2} + \omega_{M2}$, and when the device 2 performs transmission at an angular frequency of $\omega_{C2} + \omega_{H2}$, $I_{Tx2} = \cos(\Theta_{D2H})$ and $Q_{Tx2} = \sin(\Theta_{D2H})$ are input, and when the device 2 performs transmission at an angular frequency of $\omega_{C2} + \omega_{L2}$, $I_{Tx2} = \cos$ ($\Theta_{D2L}$) and $Q_{Tx2}=\sin(\Theta_{D2L})$ are input and when the device 2 performs transmission at an angular frequency of $\omega_{C2}+\omega_{M2}$, $I_{Tx2}=\cos(\Theta_{D2M})$ and $Q_{Tx2}=\sin(\Theta_{D2M})$ are input. If calculations are performed in the same way as described so far, the following Equation (320) to Equation (332) hold. Note that $\omega_{H1}>\omega_{M1}>\omega_{L1}$ is assumed and the notation of the detected phase at the generalized angular frequency described above is assumed to be $\Theta(t)$:

$$\Theta_{H1}(t)+\Theta_{H2}(t+2t_0)=\Theta_{\tau H1}+\Theta_{\tau H2}+\Theta_{D2H}+2\{(\omega_{H1}-\omega_{H2})+(\omega_{C1}-\omega_{C2})\}t_0 \quad (320)$$

$$\Theta_{H1}(t+t_0)+\Theta_{H2}(t+2t_0)=\Theta_{\tau H1}+\Theta_{\tau H2}+\Theta_{D2H}+\{(\omega_{H1}-\omega_{H2})+(\omega_{C1}-\omega_{C2})\}t_0 \quad (321)$$

$$\Theta_{L1}(t+T)+\Theta_{L2}(t+2t_0+T)=\Theta_{\tau L1}+\Theta_{\tau L2}+\Theta_{D2L}+2\{(\omega_{L1}-\omega_{L2})+(\omega_{C1}-\omega_{C2})\}t_0 \quad (322)$$

$$\Theta_{L1}(t+t_0+T)+\Theta_{L2}(t+2t_0+T)=\Theta_{\tau L1}+\Theta_{\tau L2}+\Theta_{D2H}+\{(\omega_{L1}-\omega_{L2})+(\omega_{C1}-\omega_{C2})\}t_0 \quad (323)$$

$$\Theta_{M1}(t+D)+\Theta_{M2}(t+2t_0+D)=\Theta_{\tau M1}+\Theta_{\tau M2}+\Theta_{D2M}+2\{(\omega_{M1}-\omega_{M2})+(\omega_{C1}-\omega_{C2})\}t_0 \quad (324)$$

$$\Theta_{M1}(t+t_0+D)+\Theta_{M2}(t+2t_0+D)=\Theta_{\tau M1}+\Theta_{\tau M2}+\Theta_{D2M}+\{(\omega_{M1}-\omega_{M2})+(\omega_{C1}-\omega_{C2})\}t_0 \quad (325)$$

$$\Theta_{\tau H1}=(\omega_{C1}+\omega_{H1})\tau_1 \quad (326)$$

$$\Theta_{\tau H2}=(\omega_{C2}+\omega_{H2})\tau_2 \quad (327)$$

$$\Theta_{\tau L1}=(\omega_{C1}+\omega_{L1})\tau_1 \quad (328)$$

$$\Theta_{\tau L2}=(\omega_{C2}+\omega_{L2})\tau_2 \quad (329)$$

$$\Theta_{\tau M1}=(\omega_{C1}+\omega_{M1})\tau_1 \quad (330)$$

$$\Theta_{\tau M2}=(\omega_{C2}+\omega_{M2})\tau_2 \quad (331)$$

Here, the device 2 sets phase offsets shown in the following Equation (332) to Equation (334) on a basis of the acquired phase information:

$$\Theta_{D2H}=2\Theta_{H1}(t+t_0)-\Theta_{H1}(t) \quad (332)$$

$$\Theta_{D2L}=2\Theta_{L1}(t+t_0+T)-\Theta_{L1}(t+T) \quad (333)$$

$$\Theta_{D2M}=2\Theta_{M1}(t+t_0+D)-\Theta_{M1}(t+D) \quad (334)$$

When the device 2 transmits transmission waves having the set phase offsets, calculating and organizing Equation (221)×2 Equation (220)−{Equation (223)×2−Equation (222)} described above gives the following Equation (335):

$$\Theta_{H2}(t+2t_0) - \Theta_{L2}(t+2t_0+T) = (\Theta_{\tau H1} - \Theta_{\tau L1}) + (\Theta_{\tau H2} - \Theta_{\tau L2}) \quad (335)$$
$$= (\omega_{H1} - \omega_{L1})\tau_1 + (\omega_{H2} - \omega_{L2})\tau_2$$

Here, even when the angular frequencies $\omega_{H1}$ and $\omega_{L1}$ and $\omega_{L2}$ are substituted by their respective design values $\omega_H$ and $\omega_L$, if a target specification of the distance measuring system is taken into consideration, errors of $\omega_{H1}$ and $\omega_{H2}$ with respect to $\omega_H$ and errors of $\omega_{L1}$ and $\omega_{L2}$ with respect to $\omega_L$ are on the order of several tens of [ppm], and the substitution has no practical problem. Thus, assuming $\tau_1=\tau_2$, using $\omega_H$ instead of $\omega_{H1}$ or $\omega_{H2}$, using $\omega_L$ instead of $\omega_{L1}$ or $\omega_{L2}$ and modifying Equation (335) gives the following Equation (336):

$$\Theta_{H2}(t+2t_0)-\Theta_{L2}(t+2t_0+T) \approx 2(\omega_H-\omega_L)\tau_1 \quad (336)$$

From Equation (336), Ti is determined and the distance can be calculated from $R=c\tau_1$.

Similarly, calculating and organizing Equation (321)×2−Equation (320)−{Equation (325)×2−Equation (324)} and Equation (325)×2−Equation (324)−{Equation (323)×2−Equation (322)} gives the following Equation (337) and Equation (338):

$$\Theta_{H2}(t+2t_0) - \Theta_{M2}(t+2t_0+D) = (\Theta_{\tau H1} - \Theta_{\tau M1}) + \quad (337)$$
$$(\Theta_{\tau H2} - \Theta_{\tau M2})$$
$$= (\omega_{H1} - \omega_{M1})\tau_1 +$$
$$(\omega_{H2} - \omega_{M2})\tau_2$$
$$\doteq 2(\omega_H - \omega_M)\tau_1$$

$$\Theta_{M2}(t+2t_0+D) - \Theta_{L2}(t+2t_0+T) = (\Theta_{\tau M1} - \Theta_{\tau L1}) + \quad (338)$$
$$(\Theta_{\tau M2} - \Theta_{\tau L2})$$
$$= (\omega_{M1} - \omega_{L1})\tau_1 +$$
$$(\omega_{M2} - \omega_{L2})\tau_2$$
$$\doteq 2(\omega_M - \omega_L)\tau_1$$

where the angular frequency $\omega_M$ are design values of angular frequencies $\omega_{M1}$ and $\omega_{M2}$.

Equation (336) to Equation (338) described above mean that the device 1 can perform distance measurement using only the phase information measured by the own device. That is, it is obvious that if the device 2 transmits a transmission wave using $\Theta_{D2H}$, $\Theta_{D2L}$ and $\Theta_{D2M}$ given by Equation (332) to Equation (334) on a basis of the measured phase information, the device 1 can perform distance measurement using only the phase information measured by the device 1.

In this way, according to the present embodiment, in the three frequencies six-times repeated alternating sequence, one of the devices 1 and 2 transmits to the other device, a transmission wave by shifting the phase of a carrier signal to be transmitted with a phase obtained on a basis of measured phase information, and the other device can thereby perform distance measurement without separately communicating the phase information, and it is possible to prevent a time period until completion of distance measurement from lengthening or prevent a protocol from becoming complicated.

(Eighth Embodiment) (Example of Method for Transmitting Phase Information in Three Frequencies Shortened Alternating Sequence)

Next, an eighth embodiment of the present invention is described. A hardware configuration of the present embodiment is similar to the hardware configuration of the first embodiment.

As described above, in the three frequencies six-times repeated alternating sequence, a three frequencies shortened alternating sequence shown in FIG. 29 in which one-time transmission/reception of the third wave is omitted can be adopted. The present embodiment shows an example in the three frequencies shortened alternating sequence where separate data communication of phase information is unnecessary.

Even when the three frequencies shortened alternating sequence is adopted, Equations (320) to (323) and Equations (326) to (329) described above hold. Moreover, the following Equation (339) also holds by using Equation (330) and Equation (331):

$$\Theta_{M1}(t+D)+\Theta_{M2}(t+t_0+D)=\Theta_{\tau M1}+\Theta_{\tau M2}+\Theta_{D2M}+\{(\omega_{M1}-\omega_{M2})+(\omega_{C1}-\omega_{C2})\}t_0 \quad (339)$$

Note that as described above, a plurality of oscillators in the device 1 are assumed to be oscillating in synchronization with a common reference oscillating source and a plurality of oscillators in the device 2 are also assumed to be oscillating in synchronization with a common reference oscillating source. In this case, if ideal angular frequencies are assumed to be $\omega_H$, $\omega_L$ and $\omega_M$, and a frequency error between transmission and reception is assumed to be k, the following Equation (340) holds:

$$k=(\omega_{H1}-\omega_{H2})/\omega_H=(\omega_{L1}-\omega_{L2})/\omega_L=(\omega_{M1}-\omega_{M2})/\omega_M \quad (340)$$

Here, the device 2 sets phase offsets shown in the following Equation (341) to Equation (343) on a basis of the acquired phase information:

$$\Theta_{D2H}=2\Theta_{H1}(t+t_0)-\Theta_{H1}(t) \quad (341)$$

$$\Theta_{D2L}=2\Theta_{L1}(t+t_0+T)-\Theta_{L1}(t+T) \quad (342)$$

$$\Theta_{D2M}=2\Theta_{M1}(t+D)-\{(\omega_M-\omega_L)/(\omega_H-\omega_L)\}\{\Theta_{H1}(t)-\Theta_{H1}(t+t_0)\}-\{(\omega_H-\omega_M)/(\omega_H-\omega_L)\}\{\Theta_{L1}(t+T)-\Theta_{L1}(t+t_0+T)\} \quad (343)$$

When the device 2 transmits a transmission wave having the set phase offset, it is obvious from a comparison between FIG. 28 and FIG. 29 described above that Equation (336) described above holds. Furthermore, calculating Equation (321)–Equation (339)–$\{(\omega_H-\omega_M)/(\omega_H-\omega_L)\}$ {Equation (320)–Equation (321)–Equation (322)+Equation (323)} gives the following Equation (344):

$$\Theta_{H1}(t+t_0)+\Theta_{H2}(t+2t_0)-\Theta_{H1}(t+D)-\Theta_{M2}(t+t_0+D)-\{(\omega_H-\omega_M)/(\omega_H-\omega_L)\}\{\Theta_{H1}(t)-\Theta_{H1}(t+t_0)-\Theta_{L1}(t+T)+\Theta_{L1}(t+t_0+t)\}=\Theta_{\tau H1}+\Theta_{\tau H2}+\Theta_{D2F}-\{\Theta_{\tau M1}+\Theta_{\tau M2}+\Theta_{D2M}\}+\{(\omega_{H1}-\omega_{H2})-(\omega_{M1}-\omega_{M2})\}t_0-\{(\omega_H-\omega_M)/(\omega_H-\omega_L)\}\{(\omega_{H1}-\omega_{H2})-(\omega_{L1}-\omega_{L2})\}t_0 \quad (343)$$

Substituting Equation (340), Equation (341) and Equation (343) into Equation (344) described above gives the following Equation (345):

$$\Theta_{H1}(t+t_0)+\Theta_{H2}(t+2t_0)-\Theta_{M1}(t+D)-\Theta_{M2}(t+t_0+D)-\{(\omega_H-\omega_M)/(\omega_H-\omega_L)\}\{\Theta_{H1}(t)-\Theta_{H1}(t+t_0)-\Theta_{L1}(t+T)+\Theta_{L1}(t+t_0+t)\}=\Theta_{\tau H1}+\Theta_{\tau H2}-(\Theta_{\tau M1}+\Theta_{\tau M2})+\{(\omega_{H1}-\omega_{H2})-(\omega_{M1}-\omega_{M2})\}t_0-\{(\omega_H-\omega_M)/(\omega_H-\omega_L)\}\{(\omega_{H1}-\omega_{H2})-(\omega_{L1}-\omega_{L2})\}t_0+2\Theta_{H1}(t+t_0)-\Theta_{H1}(t)+\{(\omega_M-\omega_L)/(\omega_H-\omega_L)\}\{\Theta_{H1}(t)-\Theta_{H1}(t+t_0)\}+\{(\omega_H-\omega_M)/(\omega_H-\omega_L)\}\{\Theta_{L1}(t+T)-\Theta_{L1}(t+t_0+T)\}-\Theta_{M1}(t+D) \quad (345)$$

Organizing the above equation using $\tau_1=\tau_2$ gives the following Equation (346):

$$\Theta_{H2}(t+2t_0)-\Theta_{M2}(t+t_0+D)=(\Theta_{\tau H1}-\Theta_{\tau M1})+(\Theta_{\tau H2}-\Theta_{\tau M2})\approx 2(\omega_H-\omega_M)\tau_1 \quad (346)$$

Calculating Equation (339)–Equation (323)–$\{(\omega_M-\omega_L)/(\omega_H-\omega_L)\}$ {Equation (320)–Equation (321)–Equation (322)+Equation (323)} gives the following Equation (347):

$$\Theta_{M1}(t+D)+\Theta_{M2}(t+t_0+D)-\Theta_{L1}(t+t_0+T)-\Theta_{L2}(t+2t_0+T)-\{(\omega_{M1}-\omega_{M2})-(\omega_{L1}-\omega_{L2})\}t_0-\{(\omega_M-\omega_L)/(\omega_H-\omega_L)\}\{(\omega_{M1}-\omega_{M2})-(\omega_{L1}-\omega_{L2})\}t_0 \quad (347)$$

Substituting Equation (340), Equation (342) and Equation (343) into Equation (347) described above gives the following Equation (348):

$$\Theta_{M1}(t+D)+\Theta_{M2}(t+t_0+D)-\Theta_{L1}(t+t_0+T)-\Theta_{L2}(t+2t_0+T)-\{(\omega_M-\omega_L)/(\omega_H-\omega_L)\}\{\Theta_{H1}(t)-\Theta_{H1}(t+t_0)-\Theta_{L1}(t+T)+\Theta_{L1}(t+t_0+T)\}=\Theta_{\tau M1}+\Theta_{\tau M2}-(\Theta_{\tau L1}+\Theta_{\tau L2})+\{(\omega_{M1}-\omega_{M2})-(\omega_{L1}-\omega_{L2})\}t_0-\{(\omega_M-\omega_L)/(\omega_H-\omega_L)\}\{(\omega_{M1}-\omega_{M2})-(\omega_{L1}-\omega_{L2})\}t_0+\{(\omega_M-\omega_L)/(\omega_H-\omega_L)\}\{\Theta_{H1}(t)+\Theta_{H1}(t+t_0)\}-\{(\omega_H-\omega_M)/(\omega_H-\omega_L)\}\{\Theta_{L1}(t+T)-\Theta_{L1}(t+t_0+T)\}+\Theta_{M1}(t+D)-2\Theta_{L1}(t+t_0+T)+\Theta_{L1}(t+T) \quad (348)$$

Organizing the above equation using $\tau_1=\tau_2$ gives the following Equation (349):

$$\Theta_{M2}(t+t_0+D)-\Theta_{L2}(t+2t_0+T)=(\Theta_{\tau M1}-\Theta_{\tau L1})+(\Theta_{\tau M2}-\Theta_{\tau L2})\approx 2(\omega_M-\omega_L)\tau_1 \quad (349)$$

Equation (336), Equation (346) and Equation (349) described above mean that the device 1 can perform distance measurement using only the phase information measured by the own device. That is, it is obvious that if the device 2 transmits a transmission wave using $\Theta_{D2H}$, $\Theta_{D2L}$ and $\Theta_{D2M}$ given by Equation (341) to Equation (343) on a basis of the measured phase information, the device 1 can perform distance measurement using only the phase information measured by the device 1.

Thus, according to the present embodiment, in the three frequencies shortened alternating sequence, one of the devices 1 and 2 transmits to the other device a transmission wave by shifting the phase of a carrier signal to be transmitted with a phase obtained on a basis of measured phase information, and the other device can thereby perform distance measurement without separately communicating the phase information, and it is possible to prevent a time period until completion of distance measurement from lengthening or prevent a protocol from becoming complicated.

Ninth Embodiment

Figure 30:
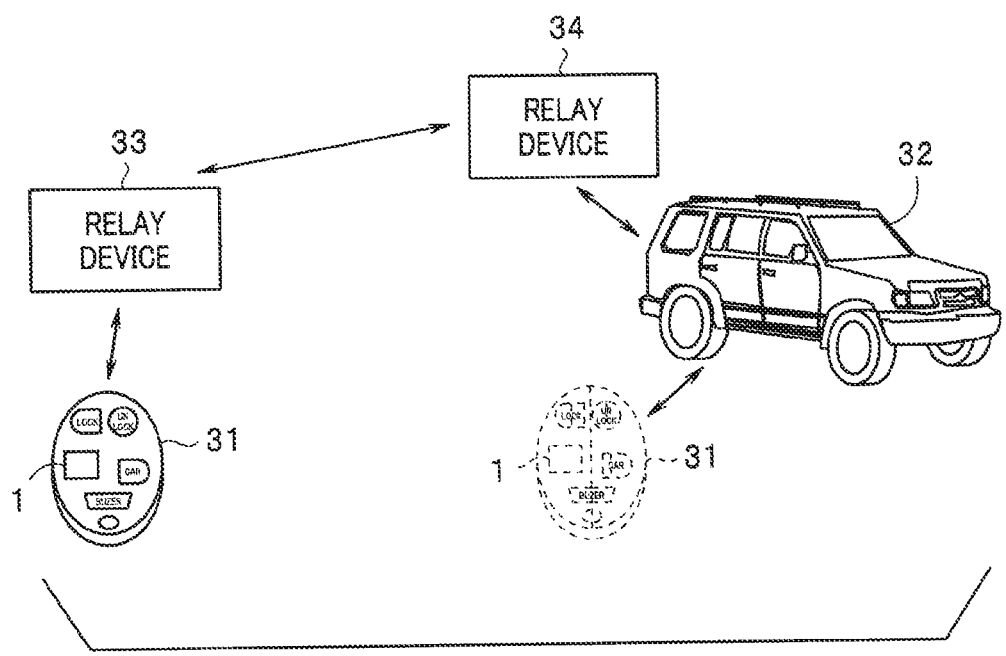
FIG. 30 is an explanatory diagram showing a ninth embodiment of the present invention.
Figure 31:
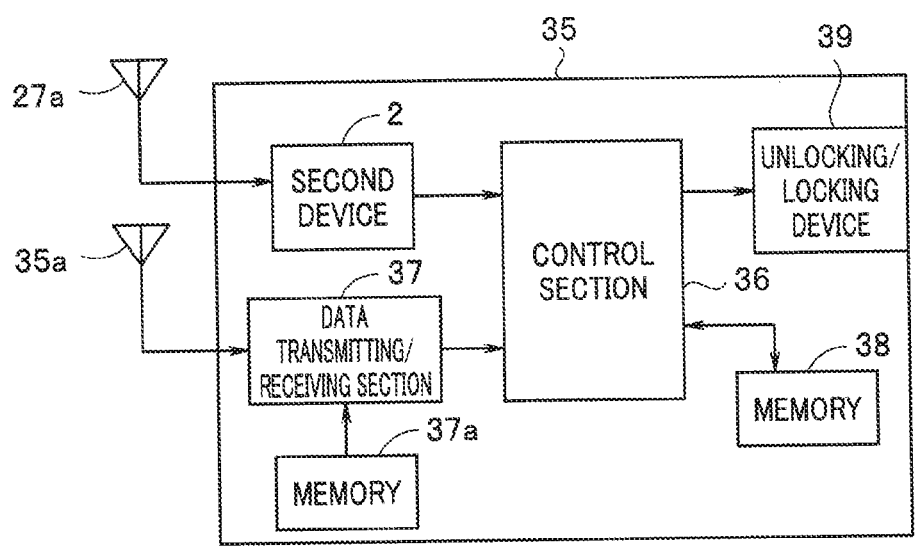
FIG. 31 is an explanatory diagram showing the ninth embodiment of the present invention.

FIG. 30 and FIG. 31 are explanatory diagrams showing a ninth embodiment of the present invention. The present embodiment indicates an example in which the respective distance measuring systems are applied to a smart entry system.

In FIG. 30, a key 31 can transmit, by radio, a signal for enabling unlocking and locking of a door of an automobile 32 and a start of an engine of the automobile 32. That is, the key 31 includes a not-shown data transmitting/receiving section and can transmit encrypted peculiar data for authentication with the data transmitting/receiving section. A radio wave from the data transmitting/receiving section of the key 31 is received in a not-shown vehicle control device 35 mounted on the automobile 32.

As shown in FIG. 31, a control section 36 is provided in the vehicle control device 35. The control section 36 controls respective sections of the vehicle control device 35. The control section 36 is configured of a processor including a CPU. The control section 36 may operate a computer program stored in a memory 38 and control the respective sections.

A data transmitting/receiving section 37 is provided in the vehicle control device 35. The data transmitting/receiving section 37 can perform wireless communication with the data transmitting/receiving section of the key 31 via an antenna 35a. The data transmitting/receiving section 37 receives the peculiar data transmitted from the key 31 and transmits predetermined response data to the key 31 and perform authentication with the key 31 and the automobile 32.

The data transmitting/receiving section 37 can finely set electric field intensity. The authentication is not performed unless the key 31 is located in a relatively close position where the key 31 is capable of receiving transmission data of the data transmitting/receiving section 37, that is, near the automobile 32.

For example, as indicated by a broken line in FIG. 30, it is assumed that the key 31 is located sufficiently close to the automobile 32. In this case, the data transmitting/receiving section 37 is capable of communicating with the key 31. The data transmitting/receiving section 37 authenticates the key 31 through collation with peculiar data recorded in the memory 37a. The data transmitting/receiving section 37 outputs a signal indicating that the key 31 is authenticated to the control section 36. Consequently, the control section 36 controls an unlocking/locking device 39 to give permission for locking or unlocking.

In FIG. 30, attackers of relay attack carry relay devices 33 and 34. The relay device 33 is capable of communicating with the key 31. The relay device 34 is capable of communicating with the data transmitting/receiving section 37 in the automobile 32. The relay devices 33 and 34 relay communication between the key 31 and the data transmitting/receiving section 37. Consequently, even when the key 31 is sufficiently separated from the automobile 32 as shown in FIG. 30 and direct communication between the key 31 and the data transmitting/receiving section 37 cannot be performed, the data transmitting/receiving section 37 can authenticate the key 31 through the relay devices 33 and 34.

Therefore, in the present embodiment, the control section 36 determines on a basis of the authentication result of the data transmitting/receiving section 37 and a distance measurement result from the second device 2 whether unlocking and locking, a start of the engine, and the like are permitted.

The first device 1 in the respective embodiments is incorporated in the key 31. On the other hand, the second device 2 in the respective embodiments is mounted on the vehicle control device 35. A transmission wave from the device 1 is received in the device 2 via an antenna 27a. A transmission wave from the device 2 is received in the device 1 via the antenna 27a. The transmission wave from the device 1 is directly received by the antenna 27a in some case and is received by the antenna 27a through the relay devices 33 and 34 in other cases. Similarly, the transmission wave from the device 2 is directly received by the device 1 from the antenna 27a in some cases and is received by the device 1 from the antenna 27a through the relay devices 33 and 34.

When it is assumed that phases of the transmission waves from the device 1 and the device 2 do not change in the relay devices 33 and 34, the device 2 can calculate a distance from the key 31 on a basis of the phases calculated in the devices 1 and 2. The device 2 outputs the calculated distance to the control section 36. A distance threshold for permitting authentication of the key 31 is stored in the memory 38. When the distance calculated by the device 2 is within the distance threshold read out from the memory 38, the control section 36 assumes that the key 31 is authenticated and permits unlocking and locking, a start of the engine, and the like. When the distance calculated by the device 2 is greater than the distance threshold read out from the memory 38, the control section 36 does not permit the authentication of the key 31. Therefore, in this case, the control section 36 does not permit unlocking and locking, a start of the engine, and the like.

Note that the relay devices 33 and 34 can change the phases of the transmission waves from the device 1 and the device 2. Even in this case, since initial phases of the devices 1 and 2 are unknown, the relay devices 33 and 34 cannot calculate a phase shift amount necessary for keeping the distance calculated by the device 2 within the distance threshold read out from the memory 38. Therefore, even if the relay devices 33 and 34 are used, possibility that the authentication of the key 31 is permitted is sufficiently small.

As explained above, in the present embodiment, by using the distance measuring system in the respective embodiments, it is possible to prevent unlocking and the like of the vehicle from being performed by relay attack to the smart entry system.

Note that the present invention is not limited to the above-described embodiments, but can be modified in various ways without departing from the spirit and scope of the present invention in an implementation phase. For example, in FIG. 17, although the device 2 is described as receiving a transmission wave having the same frequency as the frequency of the transmission wave transmitted from the device 1 twice at a time, it goes without saying that the device 2 can receive the transmission wave more than twice. When a signal on which noise or impulse interference is superimposed is received, it is a general practice that signal processing such as an increase of a reception count, removal of abnormal values is performed, and the present invention is also applicable to such cases. Furthermore, focusing on the fact that equations of phase calculation for calculating a distance are dependent on a reception interval to, modifications and combinations of various equations according to a variation of the reception interval are possible, and it is easily understandable that if the reception interval is known (a so-called predetermined interval), transmission/reception need not always be performed at equal intervals.

Furthermore, the above-described embodiments include inventions in various phases and various inventions can be extracted according to appropriate combinations in a plurality of disclosed configuration requirements. For example, even when some configuration requirements are deleted from all the configuration requirements shown in the embodiments, configurations from which the configuration requirements are deleted can be extracted as inventions when the effects described in the field of the effects of the invention can be achieved.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A smart entry system that enables at least one of locking, unlocking, and start of an engine using communication between a car and a key, with the key being apart from the car, wherein
the car comprises an execution apparatus configured to execute at least one of locking, unlocking, and start of the engine, and a controller configured to control the execution apparatus,
the controller is configured to permit execution of the execution apparatus according to a measurement result obtained by a distance measuring device configured to calculate a distance between the car and the key, when the communication between the car and the key is enabled,
the distance measuring apparatus calculates the distance between the car and the key on a basis of phases of first to fourth known signals transmitted at a plurality of carrier frequencies, and the distance measuring apparatus comprises:
  a first reference signal source provided in the car;
  a first transceiver provided in the car and configured to transmit the first known signal corresponding to a first carrier frequency and the second known signal corresponding to a second carrier frequency different from the first carrier frequency, and receive the third known signal corresponding to the first carrier frequency and the fourth known signal corresponding to the second carrier frequency, using an output of the first reference signal source;
  a second reference signal source provided in the key and configured to operate independently from the first reference signal source; and
  a second transceiver provided in the key and configured to transmit the third known signal corresponding to the first carrier frequency and the fourth known signal corresponding to the second carrier frequency and receive the first known signal and the second known signal, using an output of the second reference signal source,
wherein the car or the key includes a first phase detector configured to detect phases of the third and fourth known signals received by the first transceiver,
the car or the key includes a second phase detector configured to detect phases of the first and second known signals received by the second transceiver,
the car or the key includes a calculating section configured to calculate a distance between the car and the key, and
the first transceiver and the second transceiver transmit/receive the first known signal and the third known signal corresponding to the first known signal one time each and transmit/receive the second known signal and the fourth known signal corresponding to the second known signal one time each, performing transmission/reception a total of four times,
wherein, when the first phase detector detects a first phase for the third known signal, the second phase detector detects a second phase and a third phase of the first known signal, and when the second phase detector detects a first phase for the first known signal, the first phase detector detects a second phase and a third phase of the third known signal,
when the first phase detector detects a fourth phase for the fourth known signal, the second phase detector detects a fifth phase and a sixth phase of the second known signal, and when the second phase detector detects a fourth phase for the second known signal, the first phase detector detects a fifth phase and a six phase of the fourth known signal, and
the calculating section uses the detected first to sixth phases to calculate the distance between the car and the key by a calculation including a difference calculation between the second phase and the third phase and a difference calculation between the fifth phase and the six phase.

* * * * *